United States Patent
Iida et al.

(10) Patent No.: US 10,999,267 B2
(45) Date of Patent: May 4, 2021

(54) INFORMATION PROCESSING APPARATUS, INFORMATION PROCESSING METHOD, PROGRAM, INFORMATION PROCESSING SYSTEM, AND COMMUNICATION APPARATUS

(71) Applicant: SONY CORPORATION, Tokyo (JP)

(72) Inventors: Tatsuhiro Iida, Tokyo (JP); Koichi Sakumoto, Tokyo (JP); Taizo Shirai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 15/572,684

(22) PCT Filed: May 19, 2016

(86) PCT No.: PCT/JP2016/064836
§ 371 (c)(1),
(2) Date: Nov. 8, 2017

(87) PCT Pub. No.: WO2017/006630
PCT Pub. Date: Jan. 12, 2017

(65) Prior Publication Data
US 2018/0159835 A1    Jun. 7, 2018

(30) Foreign Application Priority Data

Jul. 7, 2015 (JP) .............................. JP2015-136205
Jan. 15, 2016 (JP) .............................. JP2016-006281

(51) Int. Cl.
*H04L 29/06* (2006.01)
*E05B 49/00* (2006.01)
(Continued)

(52) U.S. Cl.
CPC ............ *H04L 63/062* (2013.01); *E05B 49/00* (2013.01); *G06F 21/31* (2013.01); *G06F 21/60* (2013.01);
(Continued)

(58) Field of Classification Search
CPC . H04L 63/062; H04L 9/08; H04L 9/32; H04L 63/067; H04L 63/0846; G06F 21/31
(Continued)

(56) References Cited

U.S. PATENT DOCUMENTS

| 7,260,719 B1* | 8/2007 | Asano .................. G06F 21/445 |
| | | 348/E7.056 |
| 2004/0003241 A1* | 1/2004 | Sengodan ............... H04L 63/08 |
| | | 713/168 |

(Continued)

FOREIGN PATENT DOCUMENTS

| EP | 2725823 A1 | 4/2014 |
| JP | 2007-239347 A | 9/2007 |

(Continued)

OTHER PUBLICATIONS

Das, "A Secure and Efficient Uniqueness-and-Anonymity-Preserving Remote User Authentication Scheme for Connected Health Care", May 10, 2013, Springer, pp. 1-16 (Year: 2013).*

(Continued)

*Primary Examiner* — Taghi T Arani
*Assistant Examiner* — Gregory A Lane
(74) *Attorney, Agent, or Firm* — Paratas Law Group, PLLC

(57) ABSTRACT

There is provided an information processing apparatus, an information processing method, a program, an information processing system, and a communication apparatus that are capable of enhancing authentication safety, the information processing apparatus including: a communication section (Continued)

configured to receive authentication information and a processing request from a first communication apparatus; an authentication information generation section configured to generate authentication information on the basis of first key information associated with a second communication apparatus; and a processing control section configured to control execution of a process corresponding to the processing request on the basis of the authentication information received by the communication section and the authentication information generated by the authentication information generation section.

21 Claims, 41 Drawing Sheets

(51) Int. Cl.
| | | |
|---|---|---|
| *G06F 21/60* | (2013.01) | |
| *H04L 9/08* | (2006.01) | |
| *G06F 21/31* | (2013.01) | |
| *H04L 9/32* | (2006.01) | |
| *G07C 9/00* | (2020.01) | |
| *H04W 12/041* | (2021.01) | |

(52) U.S. Cl.
CPC ..... *G07C 9/00174* (2013.01); *G07C 9/00571* (2013.01); *H04L 9/08* (2013.01); *H04L 9/32* (2013.01); *H04L 9/3242* (2013.01); *H04L 63/067* (2013.01); *H04L 63/0846* (2013.01); *H04W 12/041* (2021.01); *G07C 9/0069* (2013.01); *G07C 2009/00412* (2013.01); *G07C 2009/00769* (2013.01)

(58) Field of Classification Search
USPC .................................................. 713/168, 169
See application file for complete search history.

(56) References Cited

U.S. PATENT DOCUMENTS

| | | | |
|---|---|---|---|
| 2006/0034457 A1* | 2/2006 | Damgaard | H04L 9/0861 380/44 |
| 2010/0275010 A1* | 10/2010 | Ghirardi | H04L 63/0853 713/155 |
| 2010/0293378 A1* | 11/2010 | Xiao | H04L 63/205 713/168 |
| 2011/0128119 A1* | 6/2011 | Rao | G06F 21/31 340/5.6 |
| 2013/0073852 A1* | 3/2013 | Oba | H04L 63/061 713/168 |
| 2014/0375422 A1 | 12/2014 | Huber et al. | |
| 2015/0024769 A1* | 1/2015 | Chen | H04W 48/20 455/452.2 |
| 2015/0222632 A1* | 8/2015 | Ichijo | H04L 63/0876 726/7 |

FOREIGN PATENT DOCUMENTS

| | | |
|---|---|---|
| JP | 2008-186321 A | 8/2008 |
| JP | 2011-097292 A | 5/2011 |
| JP | 2014-072843 A | 4/2014 |
| JP | 2015-090540 A | 5/2015 |

OTHER PUBLICATIONS

Jan. 25, 2019, European Search Report issued for related EP Application No. 16821101.9.

Comaneci et al., Electronic ID: Services and Applications for Context-Aware Integrated Mobile Services, 2011 Developments in E-systems Engineering, Dec. 6-8, 2011, pp. 502-507, IEEE, Dubai, UAE.

Mar. 10, 2020, Japanese Office Action issued for related JP Application No. 2017-527112.

* cited by examiner

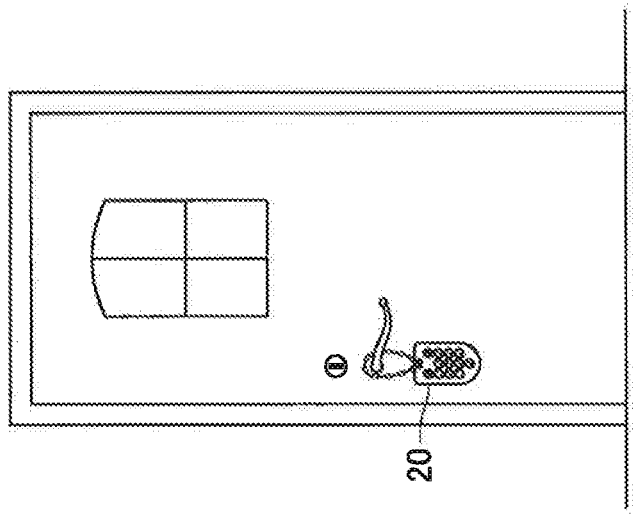
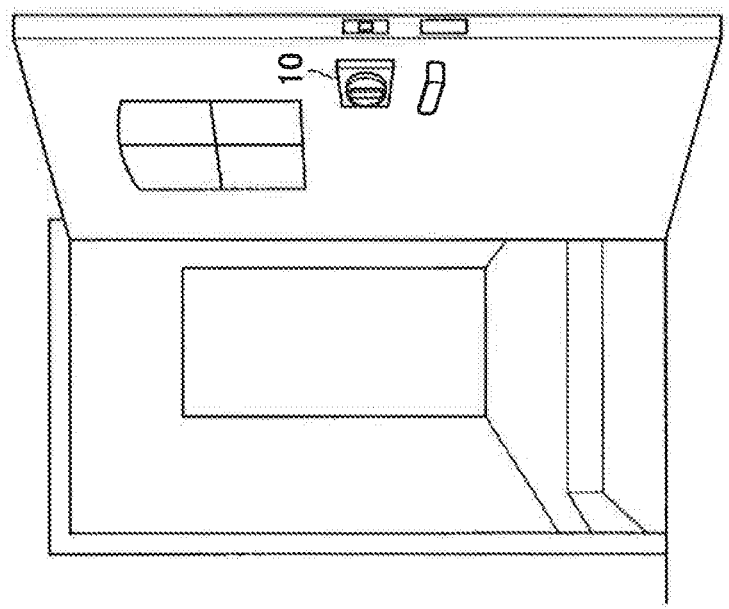
FIG. 1

FIG. 5

| No | VALIDITY PERIOD | PASSCODE GENERATION KEY | PASSCODE |
|---|---|---|---|
| 01 | PERMANENT | K1 = SHA (1 || MASTER KEY) | EP = Mod ( SHA(0000000000 || K1), 1000000 ) |
| 02 | ONE WEEK | K2 = SHA (2 || MASTER KEY) | WP = Mod ( SHA(YYYYMMDD00 || K2), 1000000 ) |
| 03 | ONE DAY | K3 = SHA (3 || MASTER KEY) | DP = Mod ( SHA(YYYYMMDD00 || K3), 1000000 ) |
| 04 | ONE HOUR | K4 = SHA (4 || MASTER KEY) | HP = Mod ( SHA(YYYYMMDDHH || K4), 1000000 ) |

FIG. 6

| No | VALIDITY PERIOD | PASSCODE GENERATION KEY | PASSCODE |
|---|---|---|---|
| 01 | PERMANENT | K1 = SHA (1 ‖ MASTER KEY) | EP = Mod ( SHA(00000000000000 ‖ K1), 1000000 ) |
| 02 | ONE WEEK | K2 = SHA (2 ‖ MASTER KEY) | WP = Mod ( SHA(YYYYMMDD000 ‖ K2), 1000000 ) |
| 03 | ONE DAY | K3 = SHA (3 ‖ MASTER KEY) | DP = Mod ( SHA(YYYYMMDD000 ‖ K3), 1000000 ) |
| 04 | ONE HOUR | K4 = SHA (4 ‖ MASTER KEY) | HP = Mod ( SHA(YYYYMMDDHH0 ‖ K4), 1000000 ) |
| 05 | SPECIFIC DAY OF THE WEEK | K5 = SHA (5 ‖ MASTER KEY) | CP = Mod ( SHA(000000000000W ‖ K5), 1000000 ) |

FIG. 26

| No | VALIDITY PERIOD | PASSCODE |
|---|---|---|
| 01 | PERMANENT | EP = Mod ( SHA(0000000000) || MASTER KEY AFTER RESETTING), 1000000 ) |
| 02 | ONE WEEK | WP = Mod ( SHA(YYYYMMDD00) || MASTER KEY AFTER RESETTING), 1000000 ) |
| 03 | ONE DAY | DP = Mod ( SHA(YYYYMMDD00) || MASTER KEY AFTER RESETTING), 1000000 ) |
| 04 | ONE HOUR | HP = Mod ( SHA(YYYYMMDDHH) || MASTER KEY AFTER RESETTING), 1000000 ) |

INFORMATION PROCESSING APPARATUS, INFORMATION PROCESSING METHOD, PROGRAM, INFORMATION PROCESSING SYSTEM, AND COMMUNICATION APPARATUS

CROSS REFERENCE TO PRIOR APPLICATION

This application is a National Stage Patent Application of PCT International Patent Application No. PCT/JP2016/064836 (filed on May 19, 2016) under 35 U.S.C. §371, which claims priority to Japanese Patent Application Nos. 2016-006281 (filed on Jan. 15, 2016) and 2015-136205 (filed on Jul. 7, 2015), which are all hereby incorporated by reference in their entirety.

TECHNICAL FIELD

The present disclosure relates to an information processing apparatus, an information processing method, a program, an information processing system, and a communication apparatus.

BACKGROUND ART

In the past, lock control devices capable of electrically locking and unlocking doors have been developed. For example, Patent Literature 1 discloses a technique of performing unlocking control by, if a portable device is placed over an electrical lock, causing the electrical lock to read key data from the portable device and then compare the read key data with authentication key data.

CITATION LIST

Patent Literature

Patent Literature 1: JP 2007-239347A

DISCLOSURE OF INVENTION

Technical Problem

The technique described in Patent Literature 1 is, however, low in authentication safety. For example, the electrical lock described in Patent Literature 1 performs authentication by comparing key data read from a portable device with key data for authentication which is stored in advance. The door can be therefore unlocked illegally, for example, if the electrical lock is illegally accessed and the key data for authentication is stolen from the electric lock.

The present disclosure then proposes an information processing apparatus, an information processing method, a program, an information processing system, and a communication apparatus that are novel and improved, and are capable of enhancing authentication safety.

Solution to Problem

According to the present disclosure, there is provided an information processing apparatus including: a communication section configured to receive authentication information and a processing request from a first communication apparatus; an authentication information generation section configured to generate authentication information on the basis of first key information associated with a second communication apparatus; and a processing control section configured to control execution of a process corresponding to the processing request on the basis of the authentication information received by the communication section and the authentication information generated by the authentication information generation section.

Further, according to the present disclosure, there is provided an information processing method including: receiving authentication information and a processing request from a first communication apparatus; generating authentication information on the basis of first key information associated with a second communication apparatus; and controlling, by a processor, execution of a process corresponding to the processing request on the basis of the received authentication information and the generated authentication information.

Further, according to the present disclosure, there is provided a program for causing a computer to function as: a communication section configured to receive authentication information and a processing request from a first communication apparatus; an authentication information generation section configured to generate authentication information on the basis of first key information associated with a second communication apparatus; and a processing control section configured to control execution of a process corresponding to the processing request on the basis of the authentication information received by the communication section and the authentication information generated by the authentication information generation section.

According to the present disclosure, there is provided an information processing system including: an information processing apparatus; a first communication apparatus; and a second communication apparatus. The information processing apparatus includes a communication section configured to receive authentication information and a processing request from the first communication apparatus, a storage section configured to store first key information associated with the second communication apparatus, an authentication information generation section configured to generate authentication information on the basis of the first key information stored in the storage section, and a processing control section configured to control execution of a process corresponding to the processing request on the basis of the authentication information received by the communication section and the authentication information generated by the authentication information generation section.

Further, according to the present disclosure, there is provided a communication apparatus including: an input section configured to receive inputs of authentication information and a processing request; a transmission control section configured to control transmission of signals to information processing apparatuses; and an acquisition section configured to acquire strength values of the signals received by the respective information processing apparatuses. The transmission control section causes a communication section to transmit the input authentication information and processing request to the respective information processing apparatuses in order from the information processing apparatus whose acquired strength value of the signal is largest.

Advantageous Effects of Invention

As described above, according to the present disclosure, it is possible to enhance authentication safety. Note that the advantageous effects described herein are not necessarily limitative, but any of the advantageous effects described in embodiments of the present disclosure may be attained.

BRIEF DESCRIPTION OF DRAWINGS

FIG. 1 is an explanatory diagram illustrating an example in which a lock control device 10 and a button unit 20 according to a first embodiment of the present disclosure are attached to a door.

FIG. 5 is an explanatory diagram illustrating a passcode generation example according to the embodiment.

FIG. 6 is an explanatory diagram illustrating a modification of a passcode generation example according to the embodiment.

FIG. 26 is an explanatory diagram illustrating a passcode generation example according to a modification of the embodiment.

MODE(S) FOR CARRYING OUT THE INVENTION

Figure 2:
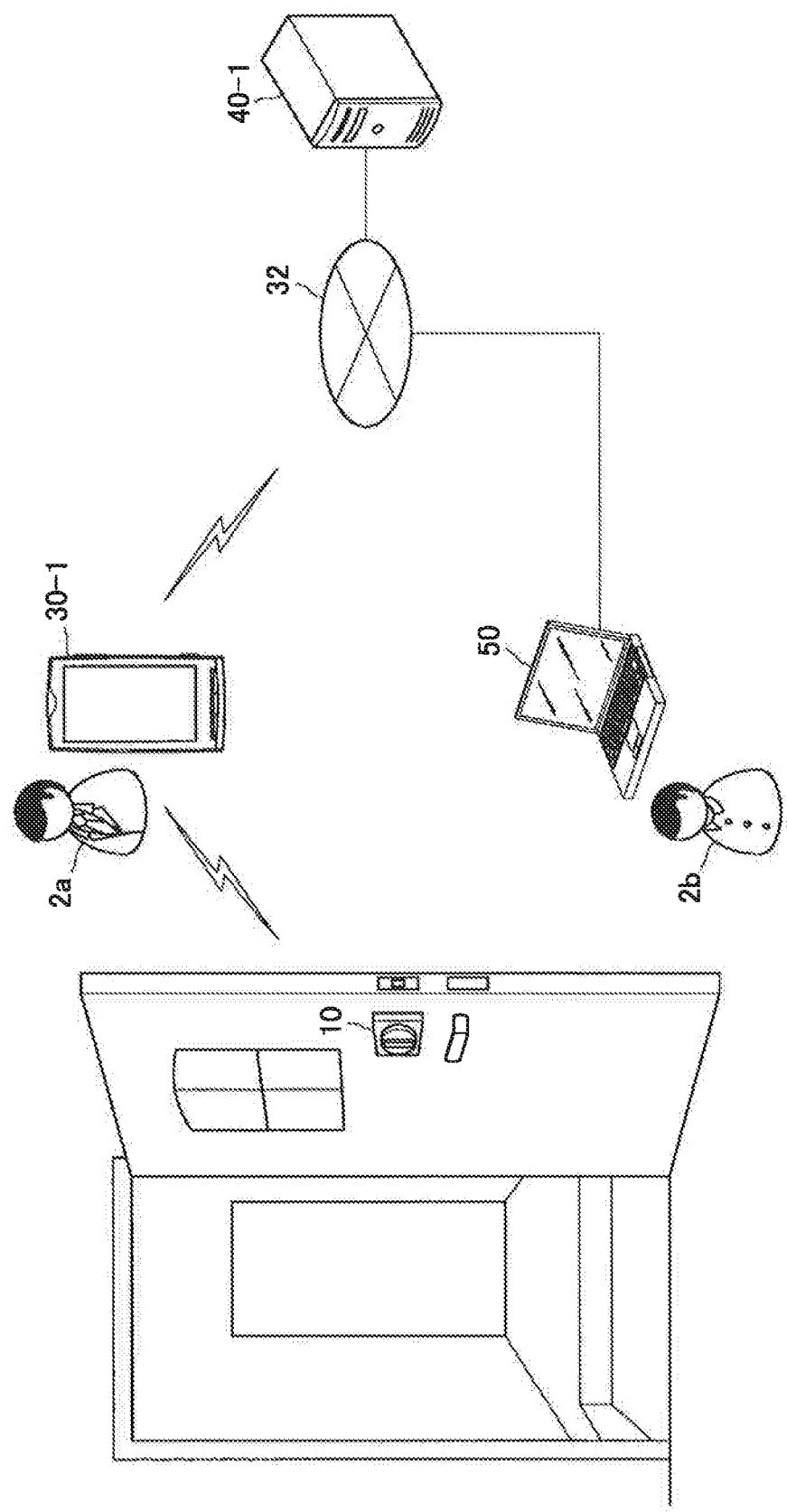
FIG. 2 is an explanatory diagram illustrating a configuration example of an information processing system according to the embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in the present specification and drawings, components that have substantially the same function and structure are sometimes distinguished by adding different alphabets after the same reference numeral. For example, components having substantially the same function and structure are distinguished as needed like a portable terminal 30-1*a* and a portable terminal 30-1*b*. However, in a case where there is no need to distinguish components that have substantially the same function and structure from each other, only the same reference sign is assigned. For example, in a case where there is no need to particularly distinguish the portable terminal 30-1*a* and the portable terminal 30-1*b* from each other, they are referred to simply as portable terminal 30-1.

Further, "Mode(s) for Carrying Out the Invention" will be described in accordance with the following item order.
1. First Embodiment
2. Second Embodiment
3. Third Embodiment
4. Modifications

1. First Embodiment

<1-1. System Configuration>

The present disclosure can be embodied in various forms, as described in detail in "1. First Embodiment" to "3. Third Embodiment" as an example. First, the basic configuration of an information processing system according to a first embodiment will be described with reference to FIGS. 1 and 2. As illustrated in FIG. 1, the information processing system according to the first embodiment includes a lock control device 10 and a button unit 20. As illustrated in FIG. 1, the lock control device 10 and the button unit 20 can be attached, for example, to a door or the like of a building. For example, as illustrated in FIG. 1, the lock control device 10 is installed on the indoor side, and the button unit 20 is installed on the outdoor side.

Moreover, as illustrated in FIG. 2, the information processing system according to the first embodiment further includes a portable terminal 30-1, a communication network 32, a server 40-1, and a communication terminal 50 in addition to the lock control device 10 and the button unit 20.

[1-1-1. Lock Control Device 10]

The lock control device 10 is an example of an information processing apparatus in the present disclosure. The lock control device 10 is an apparatus that is attached, for example, to a door of a building, and used to control the unlocking and locking of the door. For example, the lock control device 10 can control the unlocking and locking of a thumb turn (not illustrated) installed on the indoor side. Alternatively, in a case where no thumb turn is installed on the door, the lock control device 10 may serve in itself as a lock mechanism for the door of the building.

Further, the lock control device 10 performs various processing such as an unlocking process and a locking process on the basis of a processing request received from the button unit 20 or the portable terminal 30-1 which will be described below.

[1-1-2. Button Unit 20]

The button unit 20 is each of examples of a first communication apparatus and a communication apparatus in the present disclosure. The button unit 20 is an input device that allows a user to input a processing request to another apparatus such as the lock control device 10. For example, the button unit 20 can be used to allow a user (who will be referred to as "unauthorized user 2*b*" in some cases) who has no authority to unlock the lock control device 10 to input unlocking and locking requests. Additionally, examples of the unauthorized user 2*b* include brokers who arrange a building or a room where the lock control device 10 is installed or those who would like to view the inside of the building or the room.

Further, the button unit 20 can transmit and receive information to and from another apparatus through wireless communication that is compliant with Bluetooth such as Bluetooth (registered trademark) Low Energy (BLE), (registered trademark), Near Field Communication (NFC), or the like. For example, in a case where an unlocking request to the lock control device 10 is input by a user, the button unit 20 transmits the input unlocking request to the lock control device 10 through wireless communication.

Basically, the one button unit 20 communicates with only the one lock control device 10 that is associated in advance. This example is not, however, limitative, but the one button unit 20 may also communicate with the multiple lock control devices 10. For example, the button unit 20 may concurrently transmit unlocking requests to the multiple lock control devices 10.

Figure 3:
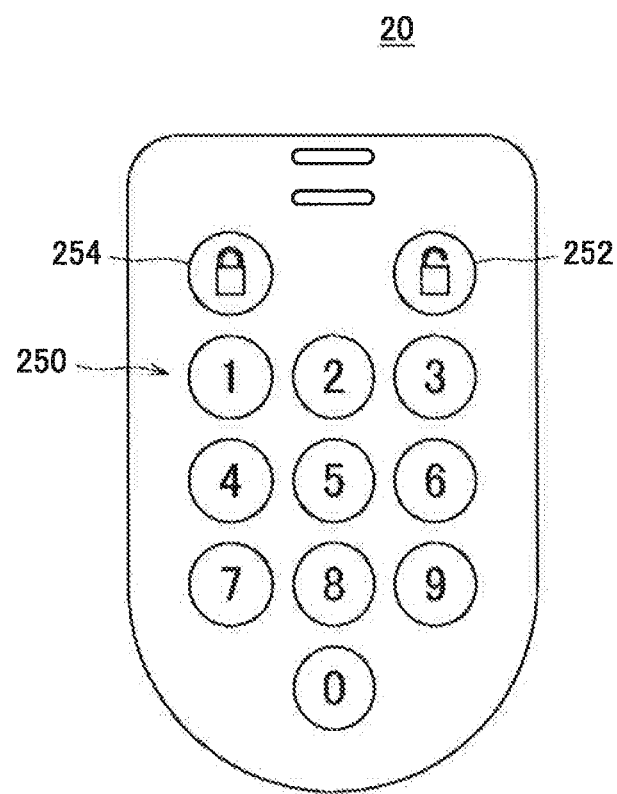
FIG. 3 is an explanatory diagram illustrating an example of appearance of the button unit 20 according to the embodiment.

Here, an example of the appearance of the button unit 20 will be described with reference to FIG. 3. As illustrated in FIG. 3, the button unit 20 includes a numeric keypad 250, an unlock button 252, and a lock button 254. Here, the numeric keypad 250 includes keys used to input the respective numbers from "0" to "9." Additionally, although the details will be described below, the numeric keypad 250 is used, for example, by a user to input a passcode that is used for an authentication process performed by the lock control device 10. Here, the passcode is an example of authentication information in the present disclosure.

The unlock button 252 is a key that allows a user, for example, to input an unlocking request to the lock control device 10. Further, the unlock button 252 is also a key that allows a user to switch the internal state of the button unit 20. For example, in a case where the button unit 20 is in a normal mode, and a user holds down the unlock button 252, that is, a user keeps pushing down the unlock button 252 for a predetermined time or more, the button unit 20 switches the internal state from the normal mode to a registration mode for changing the setting information of the button unit 20. Further, the lock button 254 is a key that allows a user, for example, to input a locking request to the lock control device 10.

[1-1-3. Portable Terminal 30-1]

The portable terminal 30-1 is an example of a second communication apparatus in the present disclosure. The portable terminal 30-1 is a terminal owned by a user 2. For example, the portable terminal 30-1 is used by a user (who will be referred to as owner user 2*a* in some cases) who has authority to manage the lock control device 10, a user who is granted by the owner user 2*a* the right to unlock the lock control device 10, or the like. Additionally, examples of the owner user 2*a* include those who has the ownership of a building or a room where the lock control device 10 is installed, or employees of a management company that manages a building or a room where the lock control device 10 is installed.

This portable terminal 30-1 can implement a key sharing service application. This key sharing service application is an application, for example, for allowing a display screen to display a passcode used for an authentication process (of the button unit 20) which is performed by the lock control device 10, making various processing requests such as an unlocking request to the lock control device 10, issuing the right to unlock the lock control device 10 for another portable terminal 30-1*b,* or the like. Further, the portable terminal 30-1 can communicate with the server 40-1, for example, through wireless communication via the communication network 32 described below.

Additionally, examples of the portable terminal 30-1 may include mobile phones such as smartphones, tablet terminals, watch-type devices, glasses-type devices, or headphones having communication functions that are compliant, for example, with Bluetooth or the like.

[1-1-4. Communication Network 32]

The communication network 32 is a wired or wireless transmission path of information transmitted from an apparatus connected to the communication network 32. For example, the communication network 32 may include a public line network such as a telephone line network, the Internet, and a satellite communication network, various types of local area networks (LAN) including Ethernet (registered trademark), and a wide area network (WAN). Further, the communication network 32 may include a dedicated line network such as an internet protocol-virtual private network (IP-VPN).

[1-1-5. Server 40-1]

The server 40-1 is an example of the second communication apparatus in the present disclosure. The server 40-1 is an apparatus for managing a key sharing service including, for example, a web system. For example, the server 40-1 registers the portable terminal 30-1 as an owner terminal on the basis of a request from the portable terminal 30-1 registered in the lock control device 10 as an owner terminal. Further, the server 40-1 transfers the unlocking right issued by the portable terminal 30-1*a* serving as an owner terminal for another portable terminal 30-1*b* (other than the owner terminal) to the portable terminal 30-1*b*.

[1-1-6. Communication Terminal 50]

The communication terminal 50 is a terminal that is, for example, used by the unauthorized user 2*b*. This communication terminal 50 can communicate with the portable terminal 30-1 or the server 40-1 via the communication network 32. For example, the communication terminal 50 receives a passcode issued by the portable terminal 30-1 of the owner user 2*a* from the portable terminal 30-1.

The basic configuration of the information processing system according to the first embodiment has been described above. The above-described lock control device 10 can execute an unlocking process by comparing a passcode received from the button unit 20 with a passcode generated by the lock control device 10 on the basis of a master key associated with the portable terminal 30-1.

<1-2. Configuration>

[1-2-1. Lock Control Device 10]

Figure 4:
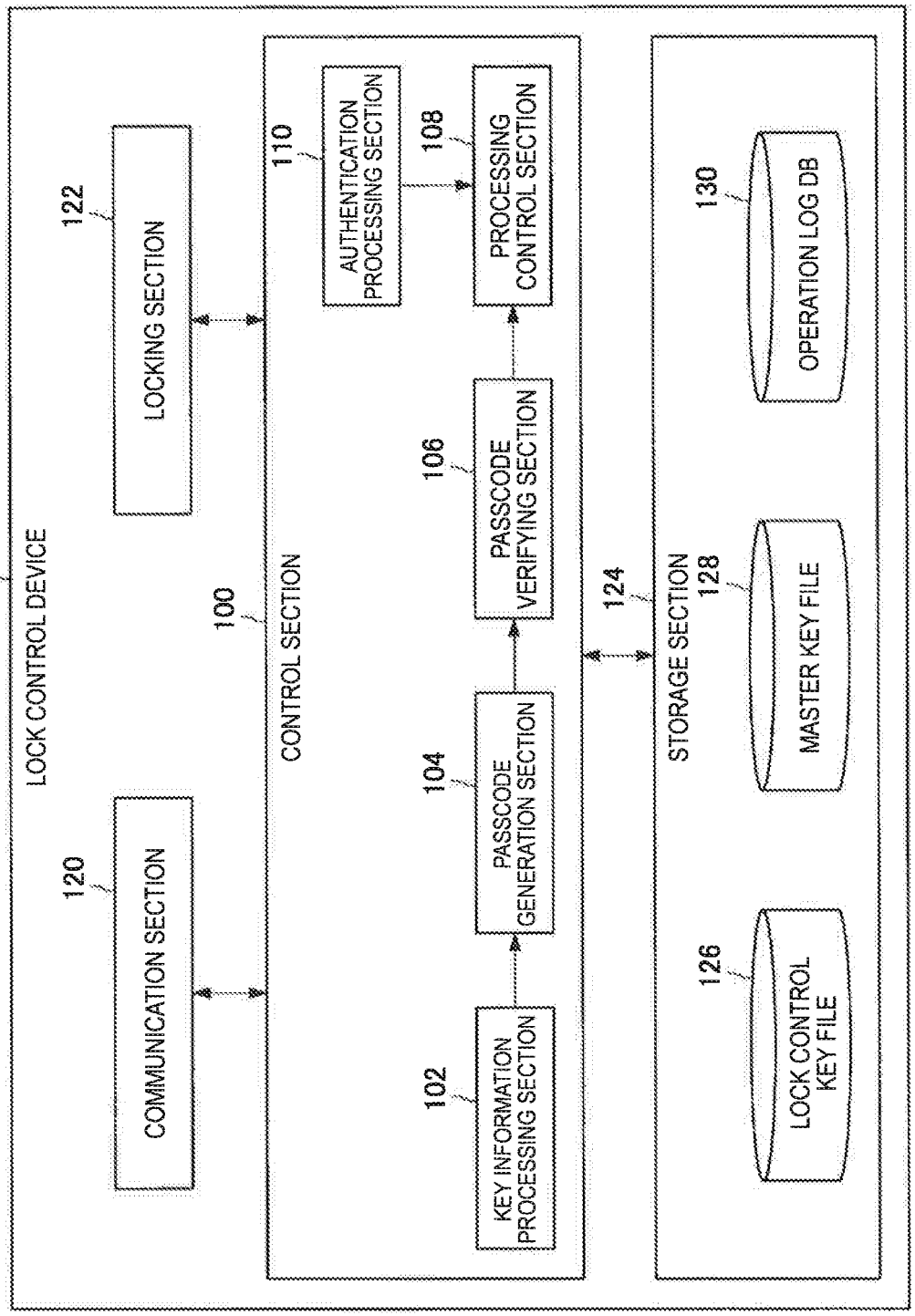
FIG. 4 is a functional block diagram illustrating a configuration example of a lock control device 10-1 according to the embodiment.

Next, the configuration according to the first embodiment will be described in detail. FIG. 4 is a functional block diagram illustrating the configuration of the lock control device 10 according to the first embodiment. As illustrated in FIG. 4, the lock control device 10 includes a control section 100, a communication section 120, a locking section 122, and a storage section 124.

(1-2-1-1. Control Section 100)

The control section 100 generally controls the operation of the lock control device 10 with hardware such as a central processing unit (CPU) and a random access memory (RAM) that are built in the lock control device 10. Further, as illustrated in FIG. 4, the control section 100 includes a key information processing section 102, a passcode generation section 104, a passcode verifying section 106, a processing control section 108, and an authentication processing section 110.

(1-2-1-2. Key Information Processing Section 102)

Acquisition of Master Key

The key information processing section 102 acquires a master key on the basis of information received from the portable terminal 30-1. For example, the key information processing section 102 acquires a master key, for example, by decoding an encrypted master key received from the portable terminal 30-1 on the basis of a security code and a predetermined encryption algorithm stored in the storage section 124 in advance.

Here, the master key is an example of the first key information in the present disclosure. Further, the master key is information used to generate a passcode, and is generated by the portable terminal 30-1, for example, in association with the portable terminal 30-1. Further, the security code is a common key of the lock control device 10. Further, the predetermined encryption algorithm is a common key encryption algorithm such as the advanced encryption standard (AES).

Additionally, the key information processing section 102 stores the acquired master key in a master key file 128. For example, the key information processing section 102 associates the acquired master key with the terminal ID of the portable terminal 30-1 serving as the transmission source of the master key, and stores them in the master key file 128.

Update of Master Key

Further, the key information processing section 102 updates the master key stored in the master key file 128, for example, on the basis of information received from the portable terminal 30-1. For example, in a case where a new master key that is encrypted is received from the portable terminal 30-1, the key information processing section 102 acquires the new master key by decoding information received from the portable terminal 30-1 in the first place on the basis of the current master key stored in the master key file 128 and a predetermined encryption algorithm. The key information processing section 102 then updates the current master key stored in the master key file 128 by replacing the current master key with the new master key that is acquired. Additionally, the new master key is an example of second key information in the present disclosure.

Master Key File 128

The master key file 128 is a file in which the master key acquired by the key information processing section 102 is stored. For example, the master key and the terminal ID of the portable terminal 30-1 serving as the transmission source of the master key are stored in the master key file 128 in association with each other.

(1-2-1-3. Passcode Generation Section 104)

The passcode generation section 104 is an example of an authentication information generation section in the present disclosure. The passcode generation section 104 generates a predetermined number of passcodes on the basis of the master key stored in the master key file 128.

For example, the passcode generation section 104 generates a predetermined number of pieces of passcode generation key information that are different on the basis of the master key, and then generates as many passcodes as the predetermined number of pieces of passcode generation key information that are generated, on the basis of the respective pieces of passcode generation key information. Additionally, the passcode generation key information is an example of authentication information generation key information in the present disclosure.

More specifically, the passcode generation section 104 first generates as many pieces of passcode generation key information as validity period types on the basis of a master key, each of a predetermined number of types of validity periods decided in advance, and a predetermined hash function. The passcode generation section 104 then generates as many passcodes as validity period types on the basis of each of the predetermined number of pieces of passcode generation key information that are generated, each of a predetermined number of types of validity periods that are based on the current date and time, and the predetermined hash function.

Here, the above-described function will be described in more detail with reference to FIGS. 5 and 6. Additionally, FIG. 5 illustrates an example in which four types including "permanent," "one week," "one day," and "one hour" are decided in advance as validity periods. In the example illustrated in FIG. 5, the passcode generation section 104 first converts the values obtained by combining validity period numbers (such as "1") with a master key for the respective validity period types by using a secure hash algorithm (SHA), thereby generating passcode generation keys K1 to K4. Additionally, K1 is the passcode generation key in a case where a validity period is "permanent." K2 is the passcode generation key in a case where a validity period is "one week." K3 is the passcode generation key in a case where a validity period is "one day." Further, K4 is the passcode generation key in a case where a validity period is "one hour."

The passcode generation section 104 then uses a SHA to convert, for each validity period type, each of the values obtained by combining the converted value of the current date and time corresponding to the validity period type with the generated passcode generation keys. For example, in a case of K1, the passcode generation section 104 uses a SHA to convert the value obtained by combining "0" with K1. In a case of K2, the passcode generation section 104 uses the SHA to convert the value obtained by combining the "date of a predetermined day of the week corresponding to the current date" (e.g., "June 1, 2015") with K2. In a case of K3, the passcode generation section 104 uses the SHA to convert the value obtained by combining the "current date" (e.g., "June 3, 2015") with K3. In a case of K4, the passcode generation section 104 uses the SHA to convert the value obtained by combining the "current date and time period" (e.g., "10 o'clock on June 3, 2015") with K4.

The passcode generation section 104 then applies mod in a manner that the four converted values are each converted into a predetermined-digit value (such as a six-digit value), and generates four passcodes (EP, WP, DP, and HP).

Modification

Further, FIG. 6 is an explanatory diagram illustrating a modification of the passcode generation example illustrated in FIG. 5. Additionally, FIG. 6 illustrates an example in which a "specific day of the week" is further defined as a validity period type in addition to the four types illustrated in FIG. 5. This "specific day of the week" is a type of period for a passcode that is, for example, valid on only a specific day of every week.

For example, as illustrated in FIG. 6, the passcode generation section 104 first converts the value obtained by combining the number (such as "5") corresponding to a "specific day of the week" with a master key by using a SHA, thereby generating a passcode generation key K5. Next, the passcode generation section 104 uses the SHA to convert the value obtained by combining the numerical value (e.g., "1" for Monday, "2" for Tuesday, and the like) associated with the "day of the week of the current date" with K5. The passcode generation section 104 then applies mod to the converted values, thereby generating the passcode (CP) corresponding to the "specific day of the week."

Additionally, validity period types are not limited to the above-described five types, but any number of types can be set.

(1-2-1-4. Passcode Verifying Section 106)

In a case where a passcode is received from the button unit 20, the passcode verifying section 106 compares the received passcode with each of the predetermined number of passcodes generated by the passcode generation section 104, thereby verifying the validity of the received passcode.

For example, in a case where the received passcode agrees with any of the predetermined number of passcodes generated by the passcode generation section 104, the passcode verifying section 106 determines that the received passcode is valid. In contrast, in a case where the received passcode does not agree with any of the predetermined number of passcodes generated by the passcode generation section 104, the passcode verifying section 106 determines that the received passcode is not valid.

Modification

Additionally, as a modification, in a case where the number of times it is successively determined that passcodes received from the button unit 20 are not valid reaches a predetermined number of times, the passcode verifying section 106 can reject the reception of passcodes from the button unit 20 for a predetermined time. This configuration makes it possible to eliminate a brute force attach performed on the passcodes by a malicious user who uses the button unit 20.

Moreover, the lock control device 10 may output a buzzer in the above-described case. This can notify a user that the reception of passcodes is rejected.

Moreover, in the above-described case, the passcode verifying section 106 may also store a verification result in an operation log DB 130. This allows the owner user 2a to know that a passcode has been illegally input in the past if the portable terminal 30-1 acquires an operation log from the lock control device 10, for example, when the owner user 2a carries the portable terminal 30-1 and visits the door.

(1-2-1-5. Processing Control Section 108)

The processing control section 108 executes a process corresponding to a processing request received from the button unit 20 on the basis of a verification result of the passcode verifying section 106. For example, in a case where the passcode verifying section 106 determines that a received passcode is valid, the processing control section 108 executes a process corresponding to a received processing request. As an example, in a case where the received processing request is an unlocking request to the locking section 122, and the passcode verifying section 106 determines that the received passcode is valid, the processing control section 108 causes the locking section 122 to unlock.

In contrast, in a case where the passcode verifying section 106 determines that a received passcode is not valid, the processing control section 108 does not execute a process corresponding to a received processing request.

(1-2-1-6. Authentication Processing Section 110)

Determination of eKey

In a case where an eKey is received from the portable terminal 30-1, the authentication processing section 110 determines the validity of the received eKey. Here, the eKey is information used to authenticate the portable terminal 30-1. Additionally, only the portable terminal 30-1a that is registered in advance in the lock control device 10 and the server 40-1 as an owner terminal of the lock control device 10 can issue the eKey corresponding to the lock control device 10 for an own terminal or another portable terminal 30-1b.

For example, the authentication processing section 110 verifies signature information for the public key of the portable terminal 30-1 which is included in a received eKey, thereby verifying the validity of the eKey. As an example, the authentication processing section 110 first verifies the signature information for the public key of the portable terminal 30-1b which is included in an eKey received from the portable terminal 30-1b by using the public key of the portable terminal 30-1a (that is an owner terminal) which is stored in advance in the storage section 124. The authentication processing section 110 then determines on the basis of a verification result of the signature information for the public key of the portable terminal 30-1 whether the public key of the portable terminal 30-1 which is included in the eKey is valid. Additionally, the same applies to a case where the portable terminal 30-1a and the portable terminal 30-1b are the same.

eKey

Figure 7:
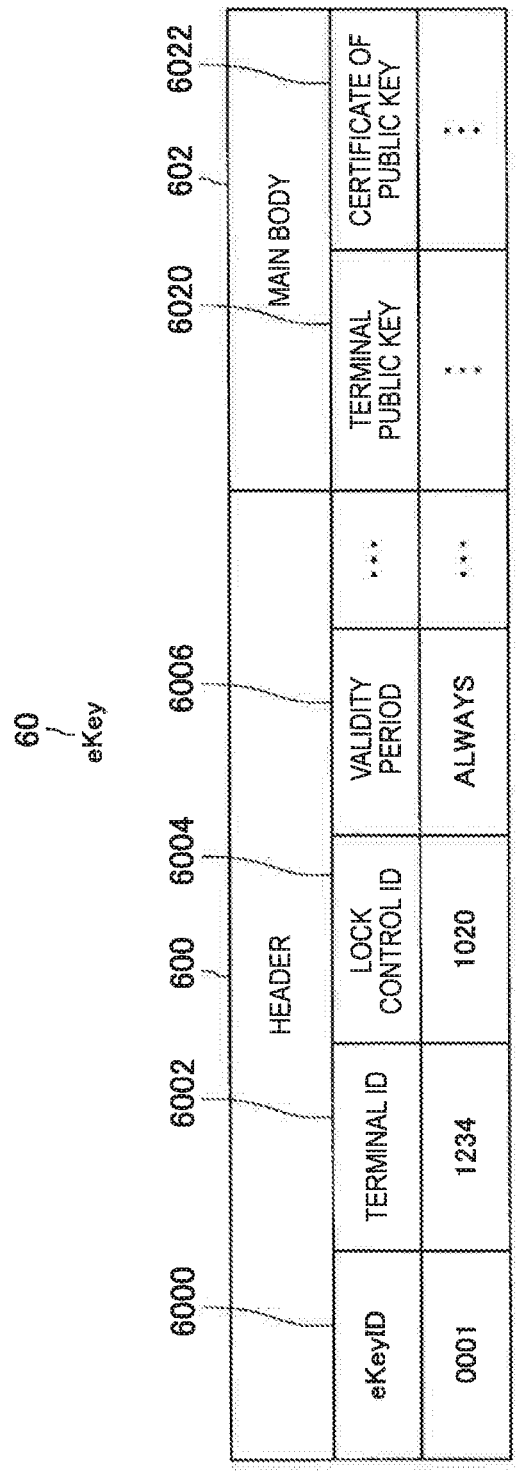
FIG. 7 is an explanatory diagram illustrating a configuration example of an eKey according to the embodiment.

Here, a configuration example of an eKey (eKey 60) will be described with reference to FIG. 7. As illustrated in FIG. 7, the eKey 60 includes, for example, a header 600 and a main body 602. Further, the header 600 includes an eKey ID 6000, a terminal ID 6002, a lock control ID 6004, and a validity period 6006. Further, the main body 602 includes a terminal public key 6020 and a certificate 6022 of the public key.

Here, the eKey ID corresponding to the eKey 60 is recorded in the eKey ID 6000. Additionally, the eKey II) is an ID that is, for example, decided for the eKey 60 by an owner terminal. Further, the terminal II) of the portable terminal 30-1 for which the eKey 60 is issued is recorded in the terminal ID 6002. Further, the ID of the lock control device 10 to be used is recorded in the lock control ID 6004 (in association with the eKey 60). Further, the validity period set for the eKey 60 is recorded as the validity period 6006. Additionally, FIG. 7 illustrates an example in which "ALWAYS" meaning no limitation on the validity period is registered as the validity period 6006.

Further, the public key of the portable terminal 30-1 for which the eKey 60 is issued is stored in the terminal public key 6020. Further, the signature information of the portable terminal 30-1 (i.e., owner terminal) that, for example, issues the eKey 60 for the public key stored in the terminal public key 6020 is stored in the certificate 6022 of the public key.

Public Key Authentication Process

Further, in a case where information (which will also be referred to as response data) generated with a secret key of the portable terminal 30-1 is received, the authentication processing section 110 verifies the validity of the received response data on the basis of the public key of the portable terminal 30-1, and a predetermined public key authentication algorithm. For example, the authentication processing section 110 first generates, for example, a challenge that is a pseudorandom number. In a case where the response data is received from the portable terminal 30-1 after the generated challenge is transmitted to the portable terminal 30-1 by the communication section 120, the authentication processing section 110 then verifies the validity of the received response data on the basis of the public key of the portable terminal 30-1, the original challenge, and the predetermined public key authentication algorithm.

(1-2-1-7. Communication Section 120)

The communication section 120 transmits and receives information to and from another apparatus through wireless communication that is compliant with Bluetooth such as BLE, Wi-Fi, NFC, or the like. For example, the communication section 120 receives a passcode and an unlocking request from the button unit 20.

(1-2-1-8. Locking Section 122)

The locking section 122 performs an unlocking process or a locking process in accordance with the control of the processing control section 108.

(1-2-1-9. Storage Section 124)

The storage section 124 can, for example, store various kinds of data and various kinds of software such as the master key file 128, a lock control key file 126 described below, and the operation log DB 130 described below.

Lock Control Key File 126

The lock control key file 126 is a file in which information of the authentication key specific to the lock control device 10 is stored. For example, the lock control ID of the lock control device 10, the common key of the lock control device 10, the secret key of the lock control device 10, and the public key of the lock control device 10 are stored in association with each other in the lock control key file 126.

Operation Log DB 130

The operation log DB 130 is a database in which an operation log of a user for the lock control device 10 is stored. For example, the unit ID of the button unit 20 (with which an operation is performed on the lock control device 10) or the terminal ID of the portable terminal 30-1, the operation date and time, and the operation details are stored in association with each other in the operation log DB 130.

[1-2-2. Button Unit 20]

Figure 8:
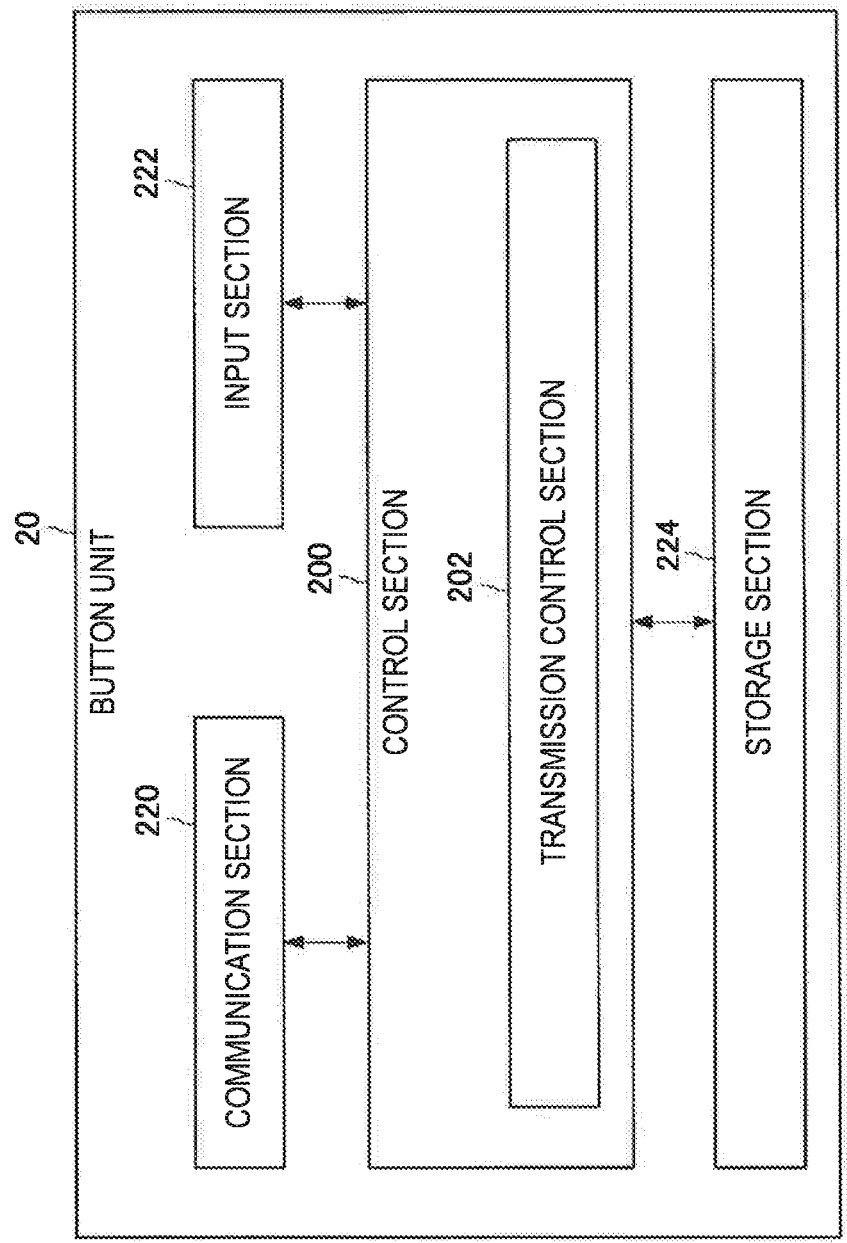
FIG. 8 is a functional block diagram illustrating a configuration example of the button unit 20 according to the embodiment.

FIG. 8 is a functional block diagram illustrating the configuration of the button unit 20 according to the first embodiment. As illustrated in FIG. 8, the button unit 20 includes a control section 200, a communication section 220, an input section 222, and a storage section 224.

(1-2-2-1. Control Section 200)

The control section 200 generally controls the operation of the button unit 20 with hardware such as a CPU and a RAM that is built in the button 20. Further, as illustrated in FIG. 8, the control section 200 includes a transmission control section 202.

(1-2-2-2. Transmission Control Section 202)

The transmission control section 202 controls the transmission of information input by a user into the input section 222 to another apparatus. For example, the transmission control section 202 causes the communication section 220 to transmit a passcode and a processing request input into the input section 222 to the lock control device 10.

(1-2-2-3. Communication Section 220)

The communication section 220 transmits and receives information to and from another apparatus through wireless communication that is compliant with Bluetooth, Wi-Fi, NFC, or the like. For example, the communication section 220 transmits an unlocking request and a passcode to the lock control device 10 under the control of the transmission control section 202.

(1-2-2-4. Input Section 222)

The input section 222 receives an input from a user. This input section 222 includes the numeric keypad 250, the unlock button 252, and the lock button 254, for example, as illustrated in FIG. 3. For example, in a case where the unlock button 252 is pushed down by a user, the input section 222 receives the input of an unlocking request.

(1-2-2-5. Storage Section 224)

The storage section 224, for example, stores the lock control ID of the lock control device 10 and the like which are received from the portable terminal 30-1 as described below.

[1-2-3. Portable Terminal 30-1]

Figure 9:
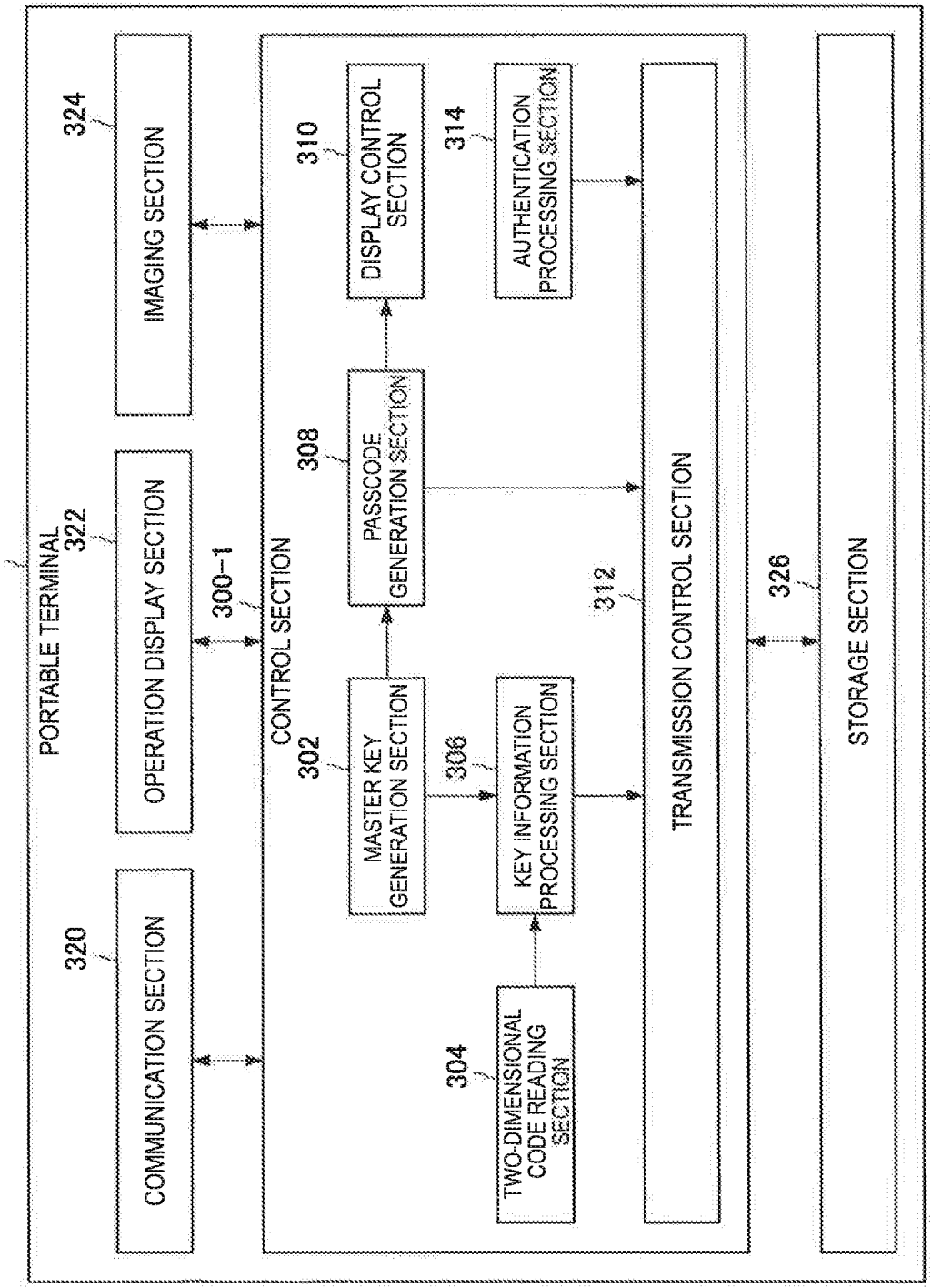
FIG. 9 is a functional block diagram illustrating an exemplary configuration of a portable terminal 30-1 according to the embodiment.

FIG. 9 is a functional block diagram illustrating the configuration of the portable terminal 30-1 according to the first embodiment. As illustrated in FIG. 9, the portable terminal 30-1 includes a control section 300-1, a communication section 320, an operation display section 322, an imaging section 324, and a storage section 326.

(1-2-3-1. Control Section 300-1)

The control section 300-1 generally controls the operation of the portable terminal 30-1 with hardware such as a CPU and a RAM that is built in the portable terminal 30-1. Further, as illustrated in FIG. 9, the control section 300-1 includes a master key generation section 302, a two-dimensional code reading section 304, a key information processing section 306, a passcode generation section 308, a display control section 310, a transmission control section 312, and an authentication processing section 314.

(1-2-3-2. Master Key Generation Section 302)

The master key generation section 302 generates, for example, a master key that is a pseudorandom number. For example, when the key sharing service application is installed, the master key generation section 302 generates a master key.

(1-2-3-3. Two-Dimensional Code Reading Section 304)

The two-dimensional code reading section 304 analyzes an image of a two-dimensional code captured by the imaging section 324 described below, thereby acquiring the information stored in the two-dimensional code. For example, the two-dimensional code reading section 304 analyzes an image of a two-dimensional code that is printed on an owner registration card provided to a specific user and captured by the imaging section 324, and then acquires information such as the security code stored in the two-dimensional code.

Here, the specific user is a user who is permitted in advance to register, for example, for his or her own portable terminal 30-1 as an owner terminal in the lock control device 10, and examples thereof include those who purchase the lock control device 10. Additionally, the owner registration card can be, for example, packed with the lock control device 10 and delivered to the specific user.

(1-2-3-4. Key Information Processing Section 306)

The key information processing section 306 encrypts a master key generated by the master key generation section 302. For example, the key information processing section 306 encrypts the generated master key on the basis of a security code acquired by the two-dimensional code reading section 304 and a predetermined encryption algorithm. Here, the predetermined encryption algorithm is a common key encryption algorithm such as the AES.

(1-2-3-5. Passcode Generation Section 308)

The passcode generation section 308 is an example of a second authentication information generation section in the present disclosure. The passcode generation section 308 generates a passcode on the basis of a master key generated by the master key generation section 302.

For example, the passcode generation section 308 first generates passcode generation key information on the basis of a master key generated by the master key generation section 302, the type of validity period designated by a user from a predetermined number of types of validity periods decided in advance, and a predetermined hash function. The passcode generation section 308 then generates a passcode on the basis of the generated passcode generation key information, period designating information input by the user, and the predetermined hash function.

(1-2-3-6. Display Control Section 310)

The display control section 310 causes the operation display section 322 to display various kinds of display information. The operation display section 322 will be described below. For example, the display control section 310 causes the operation display section 322 to display a passcode generated by the passcode generation section 308. This allows a user of the portable terminal 30-1 to confirm the generated passcode.

(1-2-3-7. Transmission Control Section 312)

The transmission control section 312 causes the communication section 320 to transmit various kinds of information to another apparatus. For example, the transmission control section 312 causes the communication section 320 to transmit a master key encrypted by the key information processing section 306 to the lock control device 10. Further, the transmission control section 312 causes the communication section 320 to transmit a passcode generated by the passcode generation section 308 to the communication terminal 50, for example, as electronic mail or the like, for example, on the basis of an input made by a user into the operation display section 322. Further, the transmission control section 312 causes the communication section 320 to transmit response data generated by the authentication processing section 314 described below to the lock control device 10, for example, after a challenge is received from the lock control device 10.

(1-2-3-8. Authentication Processing Section 314)

The authentication processing section 314 generates response data, for example, on the basis of a challenge received from the lock control device 10 and a predetermined public key authentication algorithm. For example, the authentication processing section 314 generates response data on the basis of a received challenge, the secret key of the portable terminal 30-1 stored in the storage section 326 described below, and a predetermined public key authentication algorithm. Additionally, the predetermined public key authentication algorithm is basically the same type of algorithm as a public key authentication algorithm implemented in the lock control device 10.

(1-2-3-9. Communication Section 320)

The communication section 320 transmits and receives information to and from another apparatus. For example, the communication section 320 transmits an encrypted master key to the lock control device 10 under the control of the transmission control section 312.

(1-2-3-10. Operation Display Section 322)

The operation display section 322 includes, for example, a touch panel display. This operation display section 322 is controlled by the display control section 310 to display various display screens. Further, the operation display section 322 receives various inputs from a user such as selecting a select button displayed on the display screen.

(1-2-3-11. Imaging Section 324)

The imaging section 324 forms an outside image on an image sensor such as a charge coupled device (CCD) or a complementary metal oxide semiconductor (CMOS) through a lens, thereby recording the image as a digital image.

(1-2-3-12. Storage Section 326)

The storage section 326 stores various kinds of data such as the public key of the portable terminal 30-1, the secret key of the portable terminal 30-1, an issued eKey and a generated master key, and various kinds of software such as a key sharing service application.

[1-2-4. Server 40-1]

Figure 10:
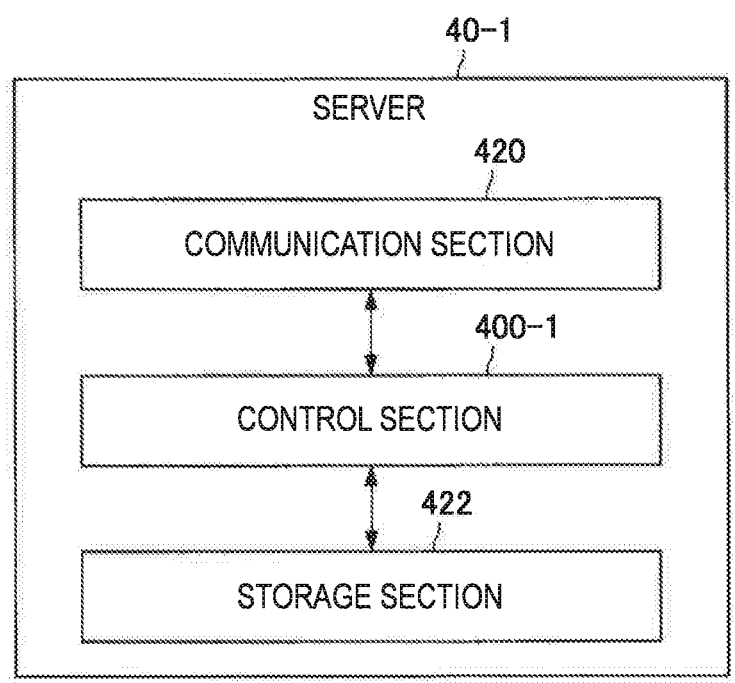
FIG. 10 is a functional block diagram illustrating a configuration example of a server 40-1 according to the embodiment.

FIG. 10 is a functional block diagram illustrating the configuration of the server 40-1 according to the first embodiment. As illustrated in FIG. 10, the server 40-1 includes a control section 400-1, a communication section 420, and a storage section 422.

(1-2-4-1. Control Section 400-1)

The control section 400-1 generally controls the operation of the server 40-1 with hardware such as a CPU and a RAM that is built in the server 40-1.

(1-2-4-2. Communication Section 420)

The communication section 420 transmits and receives information to and from another apparatus connected to the communication network 32. For example, the communication section 420 receives an operation log of the lock control device 10 acquired by the portable terminal 30-1 from the portable terminal 30-1.

(1-2-4-3. Storage Section 422)

The storage section 422 stores various kinds of data and software. For example, the storage section 422 stores the lock control IDs of the individual lock control devices 10, and the terminal IDs of the portable terminals 30-1 registered as owner terminals of the individual lock control devices 10 in association with each other.

<1-3. Operation>

The configuration according to the first embodiment has been described above, Next, the operation according to the first embodiment will be described in the following order with reference to FIGS. 11 to 25.

1. Overview of Entire Operation
2. Master Key Registration Process
3. Process of Setting Up Button Unit 20
4. Passcode Generation Process
5. Unlocking Process A
6. Locking Process
7. Operation Log Request Process
8. Master Key Update Process

[1-3-1. Overview of Entire Operation]

Figure 11:
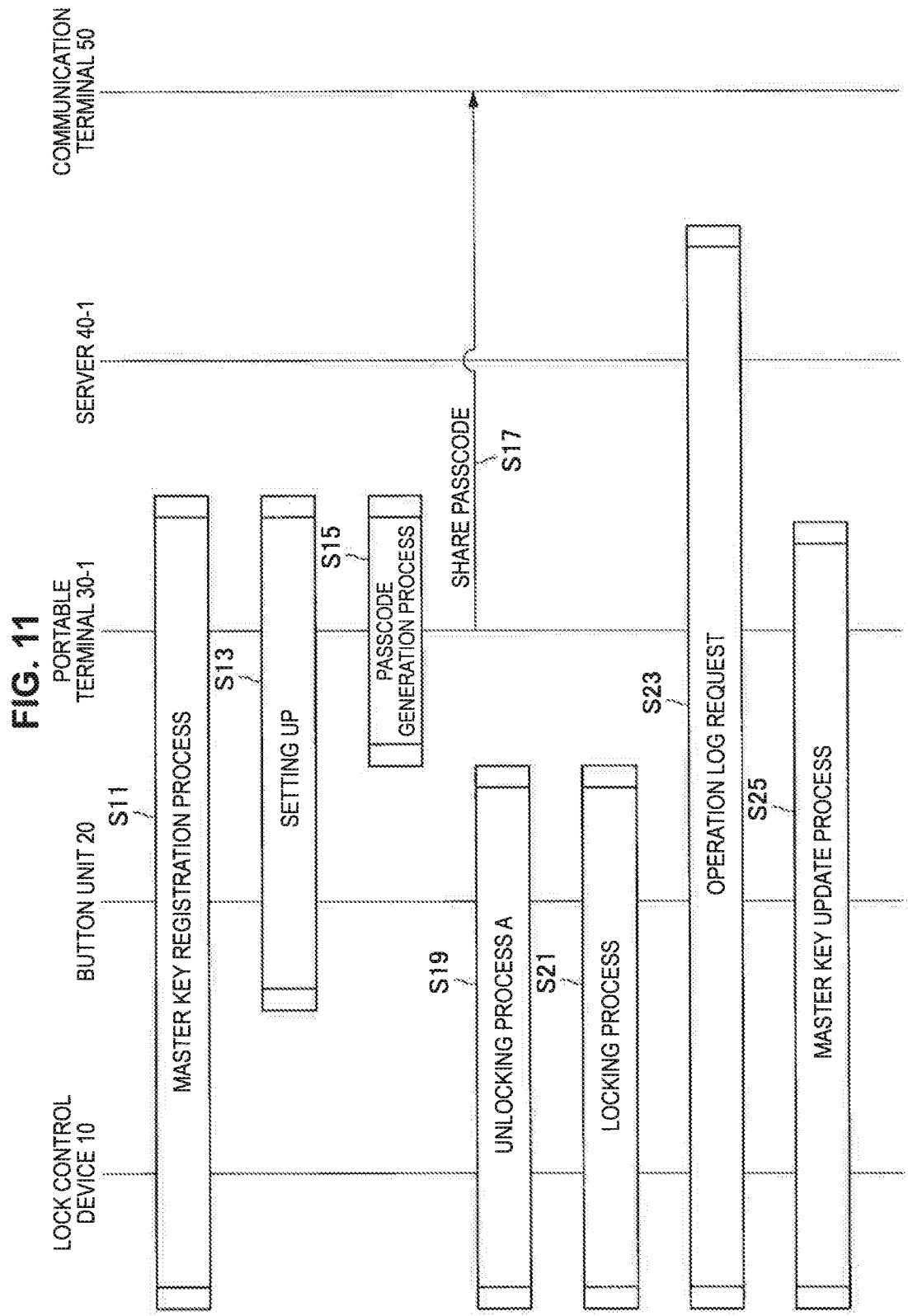
FIG. 11 is a sequence diagram illustrating an overview of an entire operation according to the embodiment.

FIG. 11 is a sequence diagram illustrating the "overview of the entire operation" according to the first embodiment. As illustrated in FIG. 11, the portable terminal 30-1 first performs a "master key registration process" described below on the basis of an operation of the owner user 2a to register a master key in the lock control device 10 (S11).

Afterward, the portable terminal 30-1 performs a "process of setting up the button unit 20" described below for the initial setting of the button unit 20 based on an operation of the owner user 2a (S13).

Afterward, the portable terminal 30-1 performs a "passcode generation process" described below on the basis of an operation of the owner user 2a to generate a passcode (S15).

Afterward, the owner user 2a operates the portable terminal 30-1, for example, to transmit electronic mail including the passcode generated in S15 to the communication terminal 50 or release the passcode in a social networking service (SNS), a homepage, or the like. Alternatively, the owner user 2a tells the unauthorized user 2b the passcode by telephone (S17). This allows the owner user 2a to tell the unauthorized user 2b (to whom the passcode is to be provided) the passcode, for example, even if the owner user 2a does not meet the unauthorized user 2b in person.

Afterward, the unauthorized user 2b visits the door where the button unit 20 is installed. The button unit 20 then performs an "unlocking process A" described below on the basis of an operation of the unauthorized user 2b to request the lock control device 10 to unlock (S19).

After S19, the unauthorized user 2b views, for example, the inside of the building, and then goes outside. Afterward, the button unit 20 performs a "locking process" described below on the basis of an operation of the unauthorized user 2b to request the lock control device 10 to lock (S21).

Afterward, in a case where the owner user 2a would like to confirm an operation log of the lock control device 10, the owner user 2a carries the portable terminal 30-1 and visits the door where the lock control device 10 is installed. The portable terminal 30-1 then performs an "operation log request process" described below on the basis of an operation of the owner user 2a to request the lock control device 10 to provide an operation log (S23).

Afterward, in a case where the owner user 2a would like to update the master key registered in S11, the owner user 2a carries the portable terminal 30-1 and visits the door where the lock control device 10 is installed. The portable terminal 30-1 then performs a "master key update process" described below on the basis of an operation of the owner user 2a to update the master key registered in the lock control device 10 (S25).

[1-3-2. Master Key Registration Process]

The overview of the entire operation has been described above. Next, the operation for the "master key registration process" in S11 will be described in detail with reference to FIG. 12. Additionally, this operation is performed when a user (i.e., owner user 2a) to whom an owner registration card is provided registers a master key in the lock control device 10. Further, it is assumed here that a security code is stored in the lock control device 10 in advance.

Figure 12:
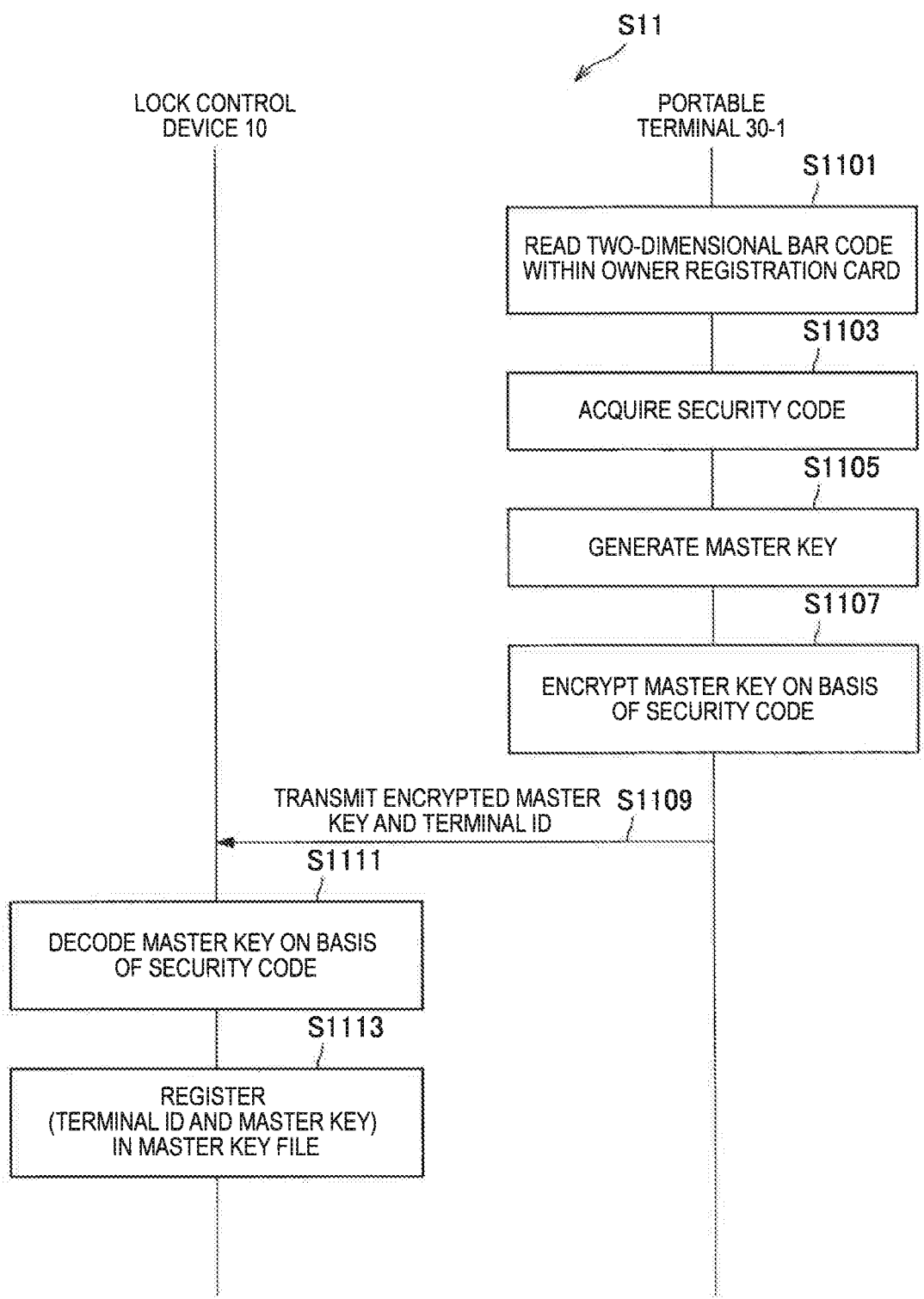
FIG. 12 is a sequence diagram illustrating an operation for a master key registration process according to the embodiment.

As illustrated in FIG. 12, the imaging section 324 of the portable terminal 30-1 first images a two-dimensional bar code printed within an owner registration card, for example, on the basis of an operation of a user on the operation display section 322 (S1101). The two-dimensional code reading section 304 then analyzes the captured image, thereby acquiring various kinds of information such as the security code stored in the two-dimensional code (S1103).

Next, the master key generation section 302 generates, for example, a master key that is a pseudorandom number. The master key generation section 302 then stores the generated master key in the storage section 326 (S1105).

Next, the key information processing section 306 encrypts the generated master key on the basis of the security code acquired in S1103 and a predetermined common key encryption algorithm (S1107). The communication section 320 then transmits the encrypted master key, and the terminal ID of the portable terminal 30-1 to the lock control device 10 in accordance with the control of the transmission control section 312 (S1109).

Afterward, the key information processing section 102 of the lock control device 10 decodes the encrypted master key received in S1109 on the basis of the security code stored in the storage section 124 and the predetermined common key encryption algorithm (S1111).

The key information processing section 102 then stores the decoded master key and the terminal ID of the portable terminal 30-1 received in S1109 in the master key file 128 in association with each other (S1113).

[1-3-3. Process of Setting Up Button Unit 20]

Next, the operation for the "process of setting up the button unit 20" in S13 (illustrated in FIG. 11) will be described in detail with reference to FIG. 13. Additionally, this operation is performed when the owner user 2a uses the portable terminal 30-1 to associate the button unit 20 with the specific lock control device 10.

Figure 13:
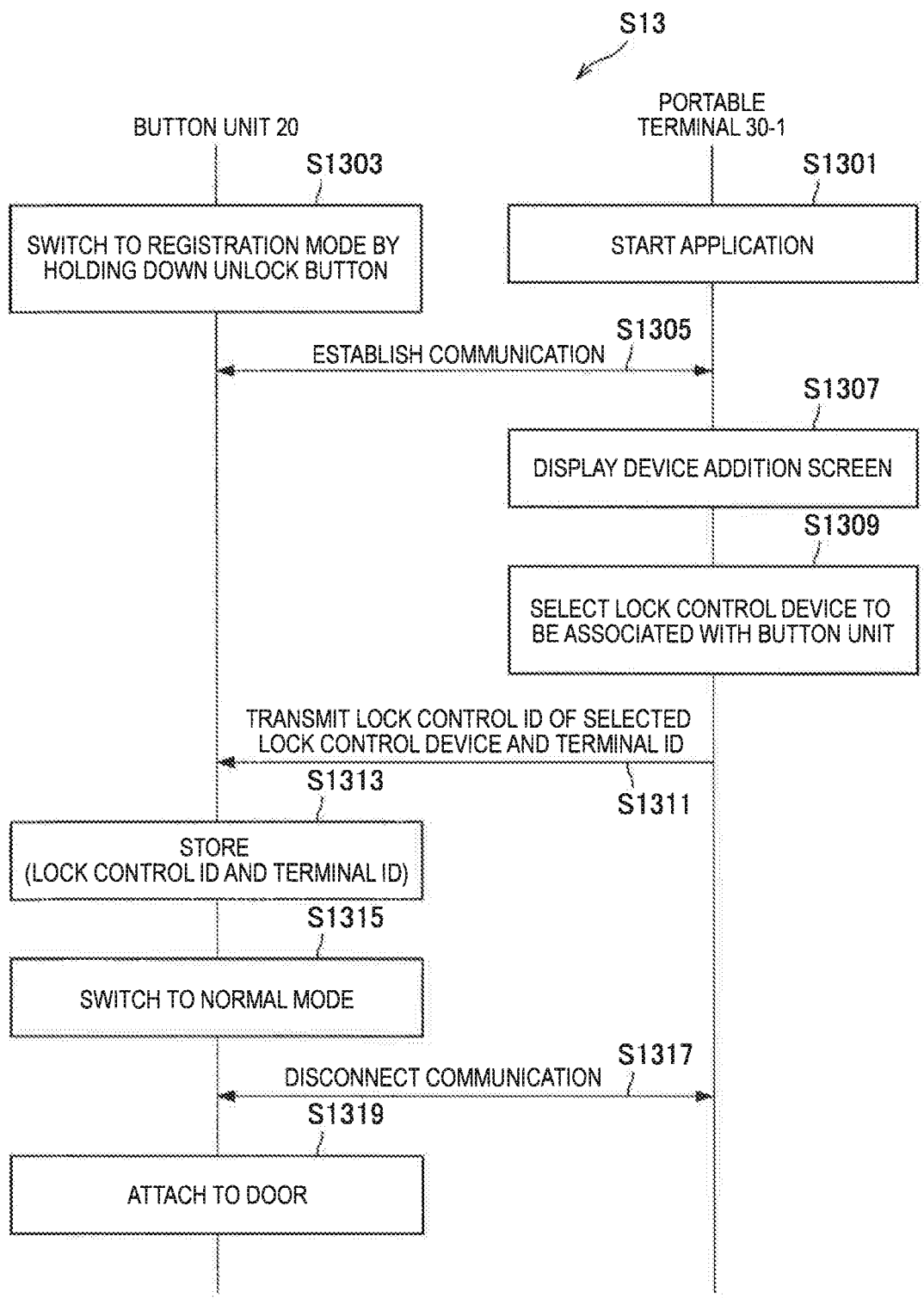
FIG. 13 is a sequence diagram illustrating an operation for a process of setting up the button unit 20 according to the embodiment.

As illustrated in FIG. 13, the control section 300-1 of the portable terminal 30-1 first starts a key sharing service application, for example, on the basis of an operation of the owner user 2a on the operation display section 322. The operation display section 322 then displays, for example, an account screen 70 as illustrated in FIG. 14 in the key sharing service application (S1301).

Additionally, this account screen 70 is a home screen dedicated to an account that is, for example, registered by the owner user 2a in advance. Further, as illustrated in FIG. 14, the account screen 70 includes, for example, a lock control device addition button 700 and a back button 702.

After S1301, the owner user 2a disposes the button unit 20 at a position (near the portable terminal 30-1) where it is possible to communicate with the portable terminal 30-1, and then holds down the unlock button 252 of the button unit 20. The control section 200 of the button unit 20 then switches the internal state of the button unit 20 from the normal mode to the registration mode (S1303). Wireless communication is then established between the button unit 20 and the portable terminal 30-1 (S1305).

Figure 14:
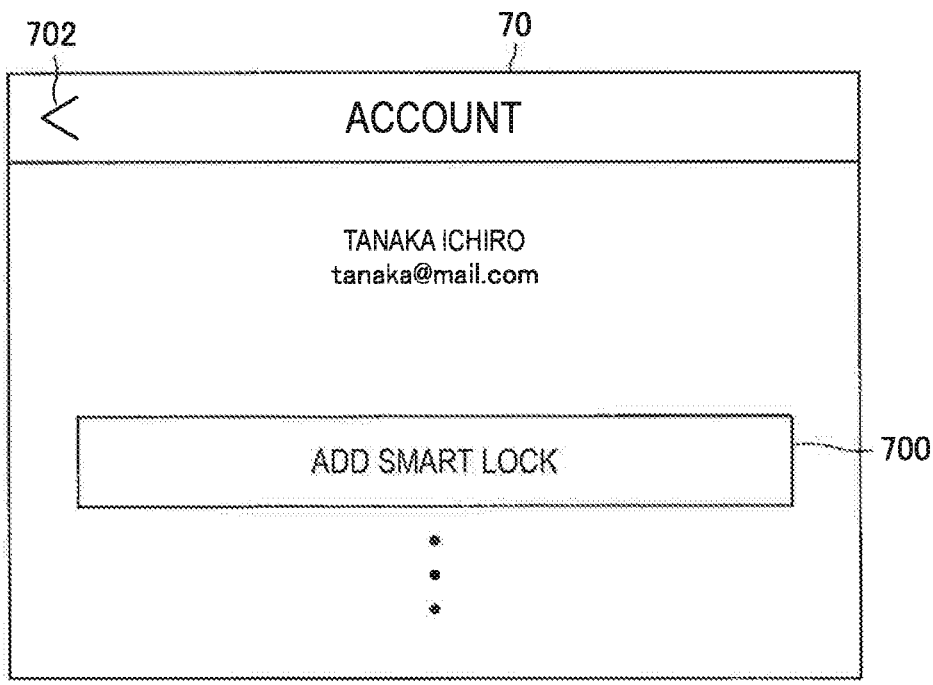
FIG. 14 is an explanatory diagram illustrating a display example of an account screen according to the embodiment.
Figure 15:
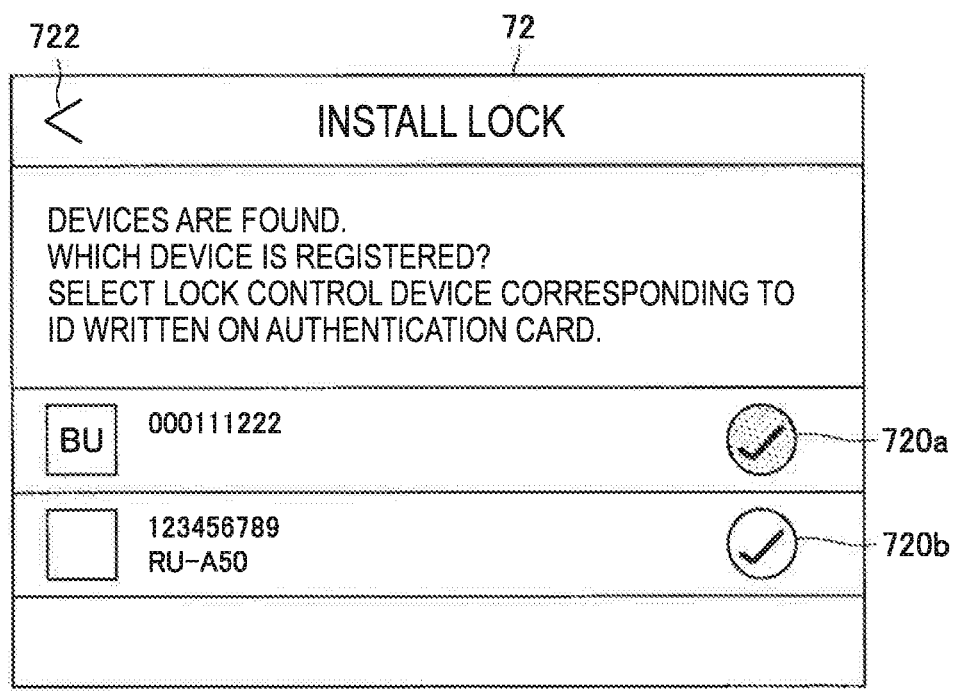
FIG. 15 is an explanatory diagram illustrating a display example of a device addition screen according to the embodiment.

Afterward, if the owner user 2a selects the lock control device addition button 700, for example, in the account screen 70 illustrated in FIG. 14, the operation display section 322 of the portable terminal 30-1 displays, for example, a device addition screen 72 as illustrated in FIG. 15 (S1307). Additionally, the device addition screen 72 is a screen used, for example, to add and register the button unit 20 and the lock control device 10 that can currently communicate with the portable terminal 30-1 as devices to be managed by the portable terminal 30-1. Further, as illustrated in FIG. 15, the device addition screen 72 includes, for example, select buttons 720 for devices to be added and a back button 722.

Figure 16:
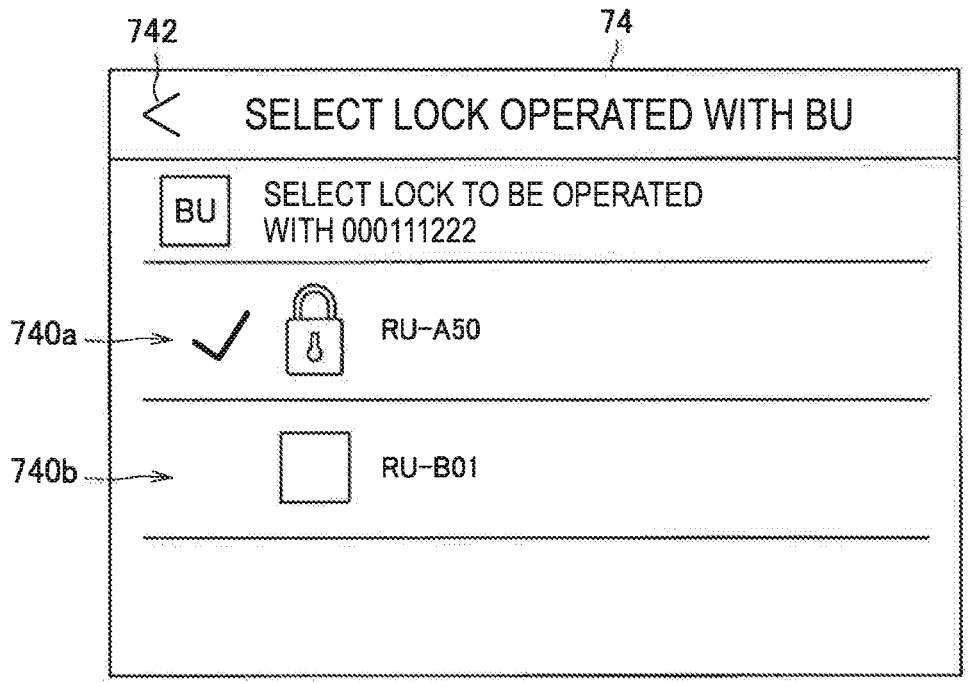
FIG. 16 is an explanatory diagram illustrating a display example of a lock selection screen according to the embodiment.

Afterward, the owner user 2a selects, for example, the select button 720 displaying the unit ID of the button unit 20 which corresponds to the button unit 20 from the select buttons 720 for one or more devices to be added which are displayed in the device addition screen 72. The operation display section 322 of the portable terminal 30-1 then displays, for example, a lock selection screen 74 as illustrated in FIG. 16. This lock selection screen 74 is a screen used to allow the owner user 2a to select the lock control device 10 to be associated with the button unit 20 selected in the device addition screen 72. Further, as illustrated in FIG. 16, the lock selection screen 74 includes, for example, selection columns 740 for the lock control devices 10 and a back button 742.

If the owner user 2a selects any of the selection columns 740 of the one or more lock control devices 10 displayed in this lock selection screen 74, the control section 300-1 of the portable terminal 30-1 associates the button unit 20 with the selected lock control device 10 (S1309).

The communication section 320 then transmits the lock control ID of the lock control device 10 selected in S1309, and the terminal ID of the portable terminal 30-1 to the button unit 20 in accordance with the control of the transmission control section 312 (S1311).

Afterward, the control section 200 of the button unit 20 stores the received lock control ID and terminal. ID in the storage section 224 in association with each other (S1313).

Afterward, for example, in a case where a predetermined time elapses with no operation from the owner user 2a, the control section 200 of the button unit 20 switches the internal state of the button unit 20 from the registration mode to the normal mode (S1315). The wireless communication between the button unit 20 and the portable terminal 30-1 is then disconnected (S1317).

Afterward, the owner user 2a carries the button unit 20 to the door where the lock control device 10 associated in S1309 is installed, and then attaches the button unit 20 onto the outdoor side (S1319).

[1-3-4. Passcode Generation Process]

Next, the operation for the "passcode generation process" in S15 (illustrated in FIG. 11) will be described in detail. Additionally, this operation is performed when the portable terminal 30-1 generates a passcode on the basis of an operation of the owner user 2a.

(1-3-4-1. UI)

Figure 17:
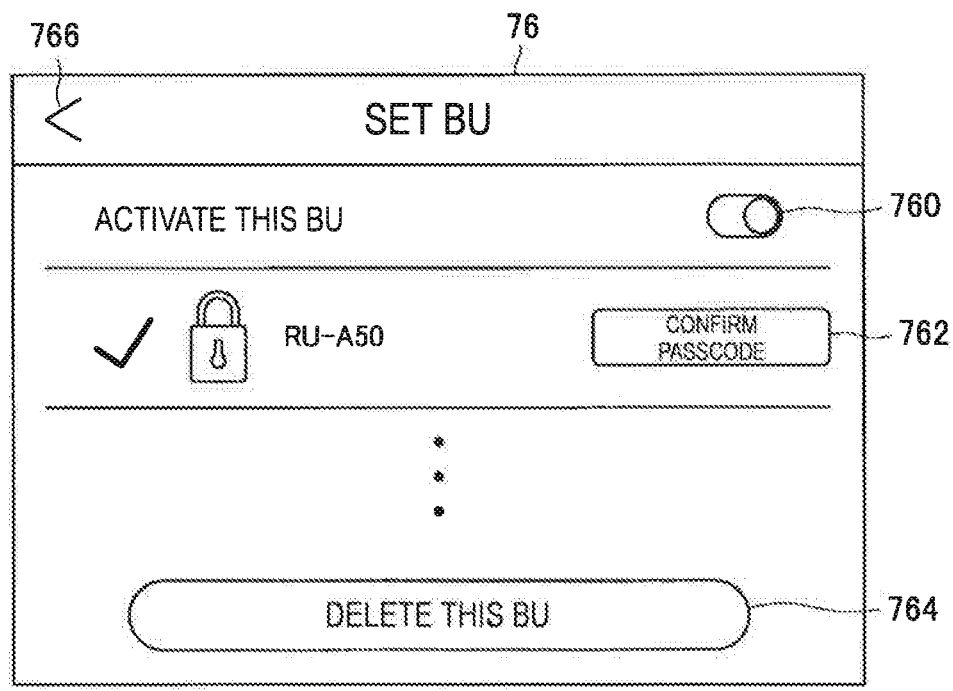
FIG. 17 is an explanatory diagram illustrating a display example of a button unit setting screen according to the embodiment.

First, the details of user interfaces (UIs) related to this "passcode generation process" will be described with reference to FIGS. 17 and 18 before the detailed operations are described. First, the owner user 2a starts the key sharing service application of the portable terminal 30-1, and then displays, for example, a button unit setting screen 76 as illustrated in FIG. 17. This button unit setting screen 76 is a screen for the setting of the button unit 20 that has been subjected to the "process of setting up the button unit 20" in S13. Further, as illustrated in FIG. 17, the button unit setting screen 76 includes, for example, an activation setting button 760 for the button unit 20, a passcode confirm button 762 for the associated lock control device 10, a register and delete button 764 for the button unit 20, and a back button 766.

Figure 18:
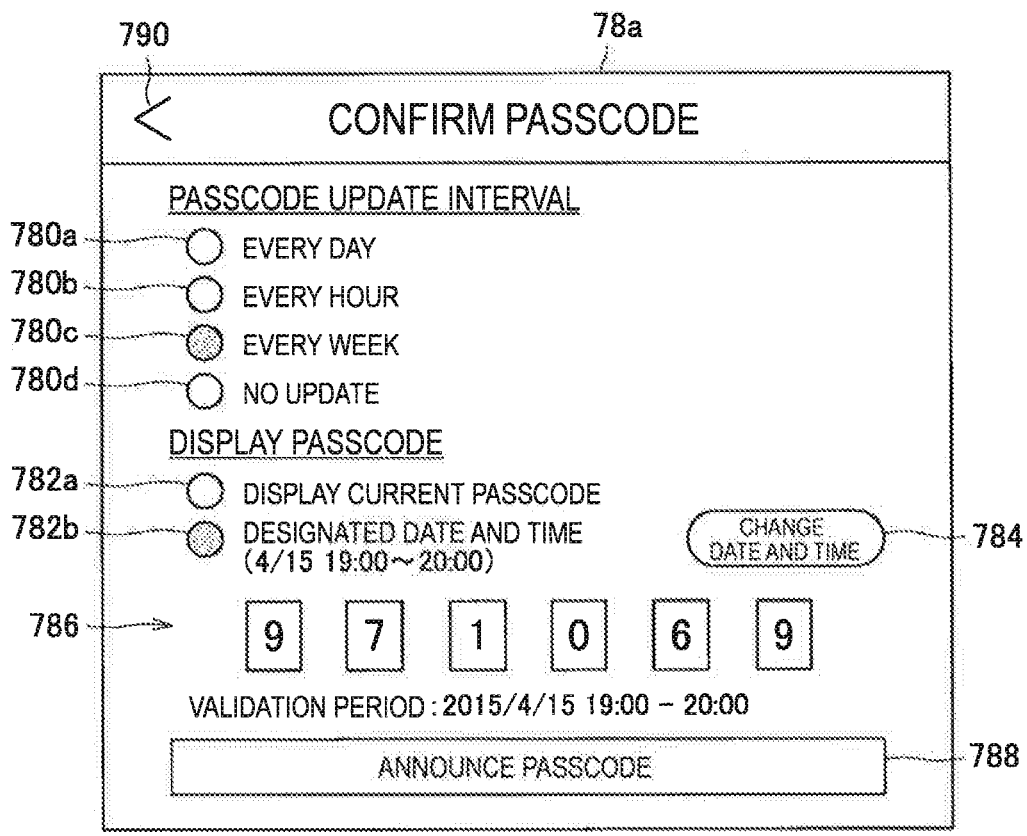
FIG. 18 is an explanatory diagram illustrating a display example of a passcode confirmation screen according to the embodiment.

If the owner user 2a selects the passcode confirm button 762 in the button unit setting screen 76, the operation display section 322 of the portable terminal 30-1 displays, for example, a passcode confirmation screen 78 as illustrated in FIG. 18. Additionally, the passcode confirmation screen 78 is a screen that allows the owner user 2a to set a passcode generation condition, or allows the owner user 2a to confirm a generated passcode. Further, as illustrated in FIG. 18, the passcode confirmation screen 78 includes, for example, an update interval select button 780 for a passcode, period designating information select buttons 782 for passcode generation, a designated date and time change button 784, a passcode display column 786, a passcode transfer button 788, and a back button 790.

Here, the update interval select button 780 for a passcode is a select button that allows the owner user 2a to select a passcode validity period type. For example, an update interval select button 780a is a select button for setting "one day" as a validity period. An update interval select button 780b is a select button for setting "one hour" as a validity period. An update interval select button 780c is a select button for setting "one week" as a validity period. Further, an update interval select button 780d is a select button for setting "permanent" as a validity period.

Further, the period designating information select buttons 782 for passcode generation are select buttons for setting period designating information regarding passcode validity period types selected with the update interval select buttons 780. For example, a period designating information select button 782a is a button for setting period designating information by designating the reference date and time of a validity period of a type selected with the update interval select button 780 as the current date and time. For example, in a case where the update interval select button 780a is selected, and the period designating information select button 782a is selected, the "current date and time" is set as period designating information. Further, in a case where the update interval select button 780c is selected, and the period designating information select button 782a is selected, the "date of a predetermined day of the week corresponding to the current date" is set as period designating information.

Further, a period designating information select button 782b is a select button for setting, period designating information, a designated date and time designated by the owner user 2a, for example, by selecting the designated date and time change button 784. For example, FIG. 18 illustrates an example in which a designated date and time designated by the owner user 2a is "9:00 to 20:00 on April 15."

Further, the passcode display column 786 is a display column on which a passcode generated in the "passcode generation process" described below is displayed. Further, the passcode transfer button 788 is a button for transmitting the generated passcode to the communication terminal 50, for example, as electronic mail.

(1-3-4-2. Operation)

Figure 19:
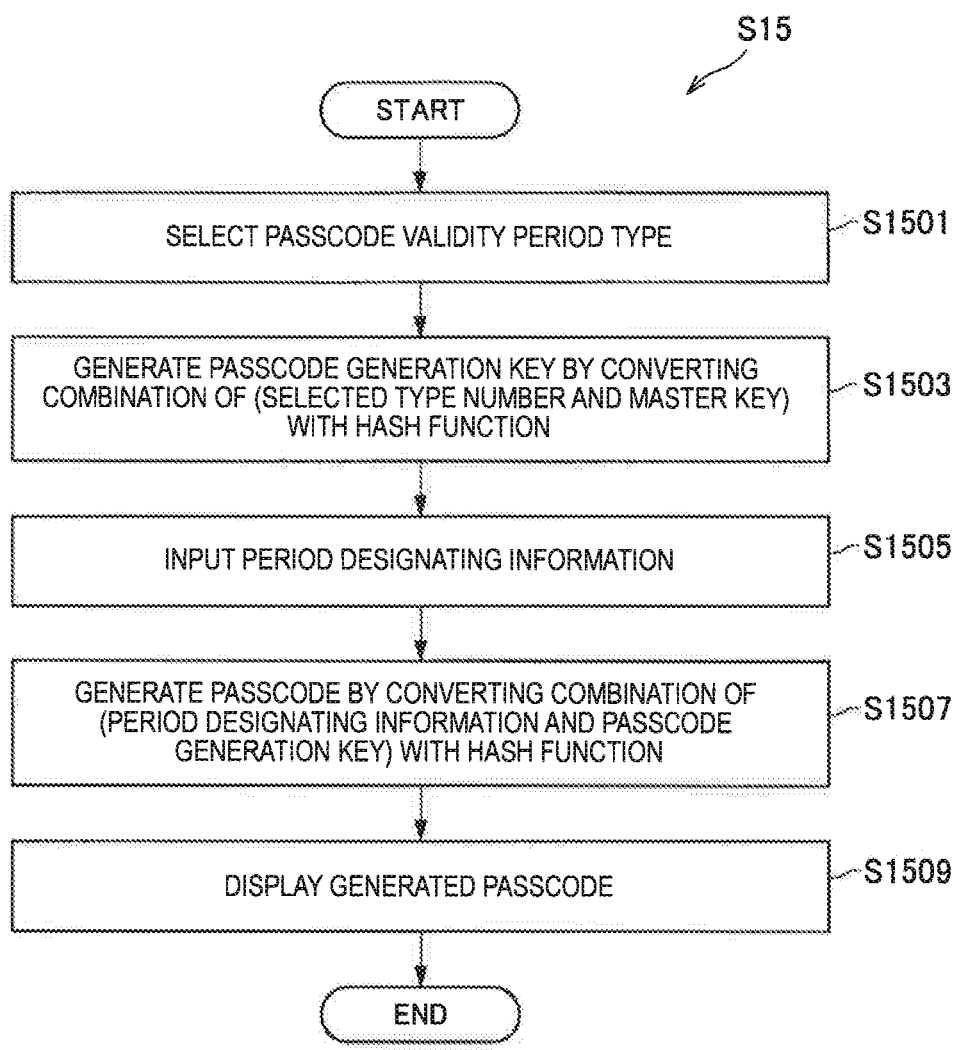
FIG. 19 is a flowchart illustrating an operation for a passcode generation process according to the embodiment.

Next, the operation for the "passcode generation process" will be described in detail with reference to FIG. 19. As illustrated in FIG. 19, the owner user 2a first selects a desired validity period type, for example, with the update interval select button 780 for a passcode which is illustrated in FIG. 18, thereby selecting a passcode validity period type to be generated (S1501).

Afterward, the passcode generation section 308 of the portable terminal 30-1 generates passcode generation key information by converting the combination of a validity period type number selected in S1501 and a master key stored in the storage section 326 with a predetermined hash function (S1503).

Afterward, the owner user 2a inputs period designating information, for example, by selecting a desired select button from the period designating information select buttons 782 for passcode generation which are illustrated in FIG. 18 (S1505).

Afterward, the passcode generation section 308 of the portable terminal 30-1 generates a passcode by converting the combination of the period designating information input in S1505 and the passcode generation key information generated in S1503 with a predetermined hash function (S1507).

The operation display section 322 then displays the passcode generated in S1507, for example, on the passcode display column 786 illustrated in FIG. 18 in accordance with the control of the display control section 310 (S1509).

[1-3-5. Unlocking Process A]

Next, the operation for the "unlocking process A" in S19 (illustrated in FIG. 11) will be described in detail with reference to FIG. 20. Additionally, this operation is performed when the unauthorized user 2b who is told a passcode in S17 operates the button unit 20 to transmit an unlocking request to the lock control device 10.

Figure 20:
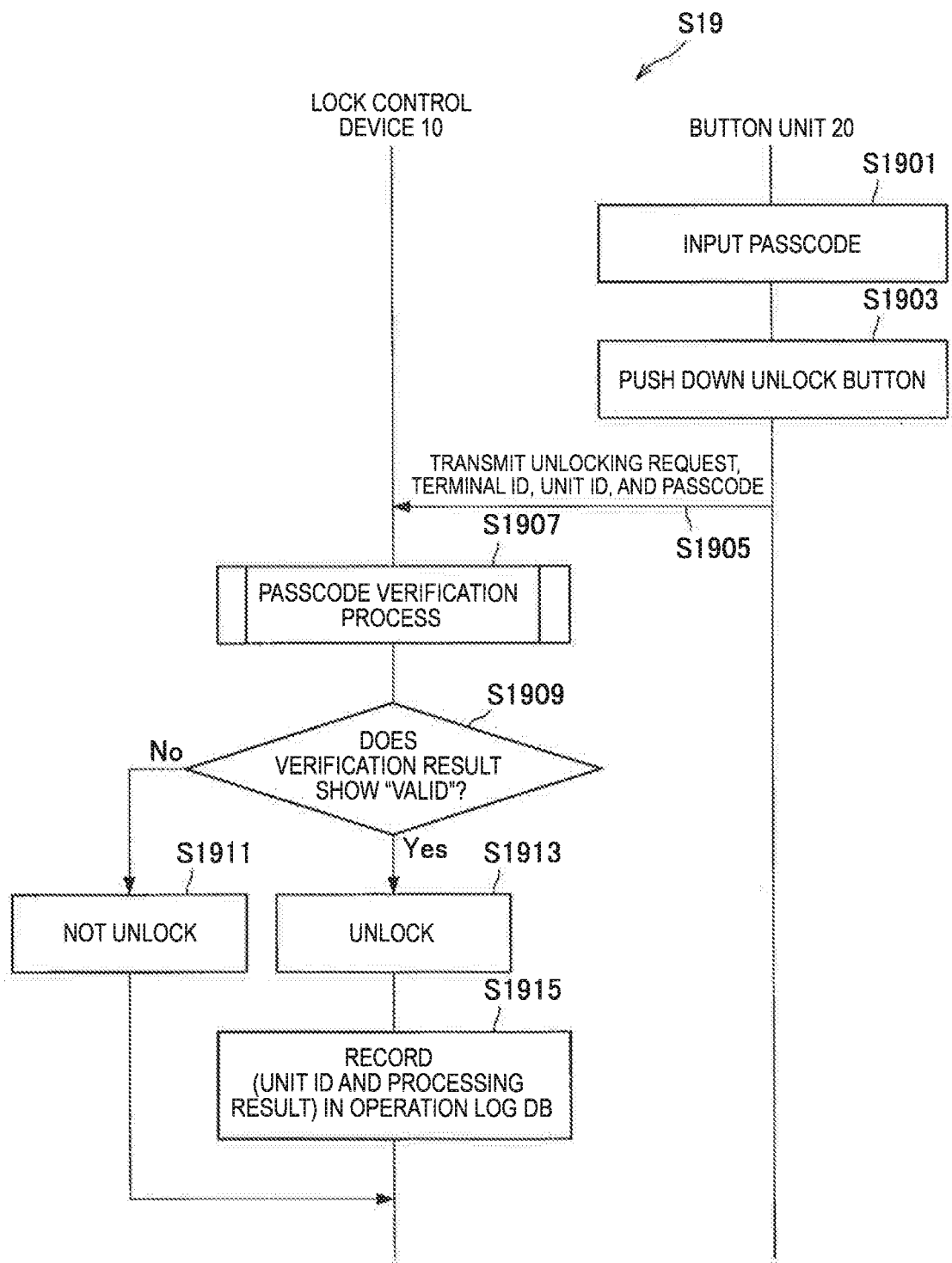
FIG. 20 is a sequence diagram illustrating an operation for an unlocking process A according to the embodiment.

As illustrated in FIG. 20, the unauthorized user 2b first inputs the passcode the unauthorized user 2b is told in S17 into the button unit 20 (S1901), and then pushes down the unlock button 252 of the button unit 20 (S1903).

Afterward, the control section 200 of the button unit 20 encrypts the unlocking request, the terminal ID of the portable terminal 30-1, the unit ID of the button unit 20, and the input passcode, for example, on the basis of a key sharing protocol. The communication section 220 then transmits the encrypted information to the lock control device 10 in accordance with the control of the control section 200 (S1905).

Afterward, the lock control device 10 decodes the information received in S1905, for example, on the basis of the key sharing protocol. The lock control device 10 then performs a "passcode verification process" described below on the decoded passcode (S1907).

In a case where a verification result in S1907 shows that the decoded passcode is not valid (S1909: No), the processing control section 108 then decides that the locking section 122 does not unlock (S1911). The lock control device 10 then terminates the "unlocking process A."

In contrast, in a case where a verification result in S1907 shows that the decoded passcode is valid (S1909: Yes), the processing control section 108 causes the locking section 122 to unlock (S1913). The control section 100 then stores the unit ID received in S1905 and the result of the unlocking process A in the operation log DB 130 in association with each other (S1915).

(1-3-5-1. Passcode Verification Process)

Figure 21:
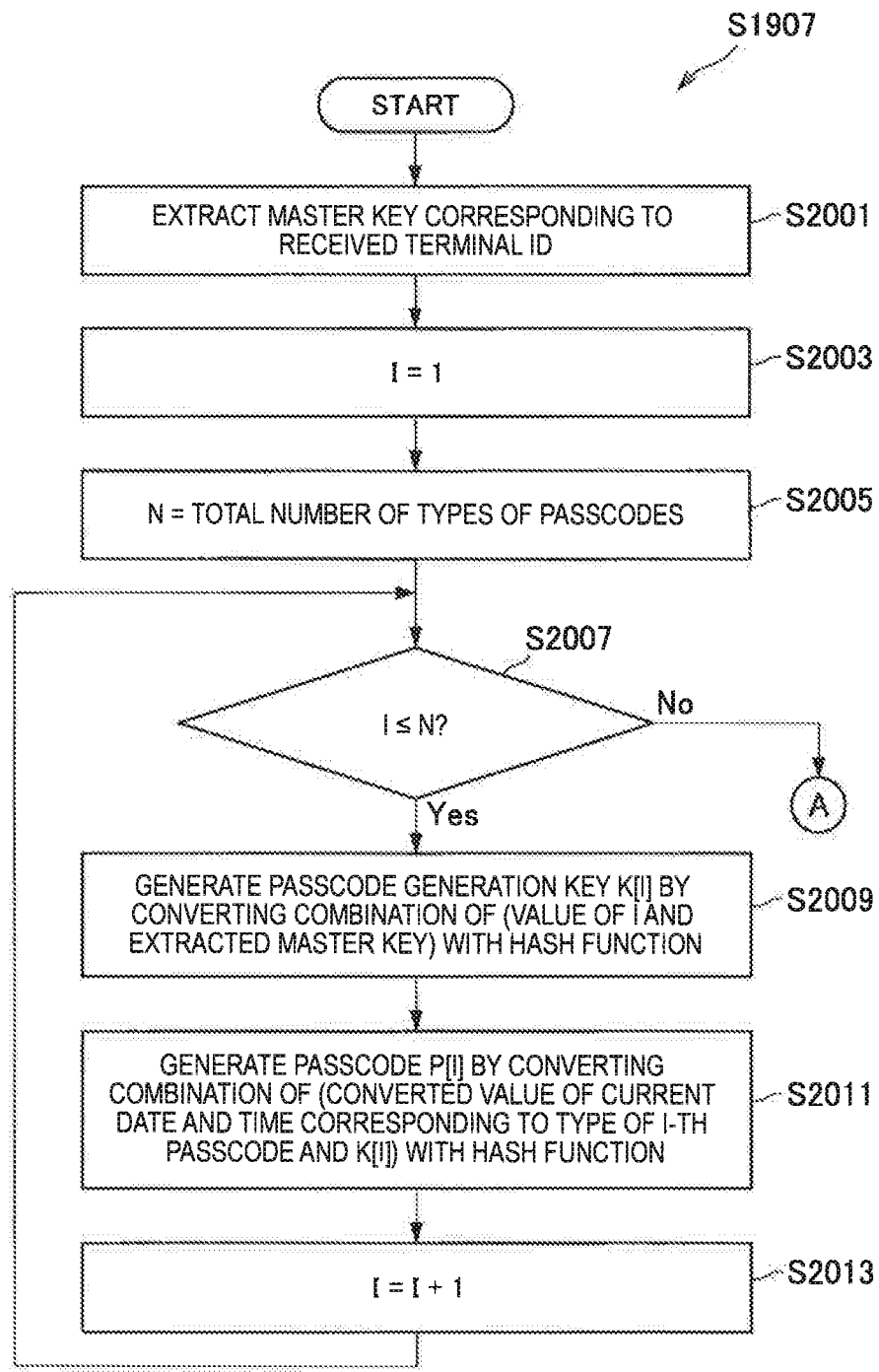
FIG. 21 is a flowchart illustrating a part of an operation for a passcode verification process according to the embodiment.

Here, the operation for the "passcode verification process" in S1907 will be described in detail with reference to FIG. 21. As illustrated in FIG. 21, the passcode generation section 104 of the lock control device 10 first extracts the master key corresponding to the terminal ID received in S1905 from the master key file 128 (S2001).

Next, the passcode generation section 104 sets "1" as a variable I representing the type number of a passcode to be generated (S2003). The passcode generation section 104 then sets N as the total number of types of passcodes decided in advance (S2005).

Next, the passcode generation section 104 determines whether the value of I is smaller than or equal to N (S2007). In a case where I is larger than N (S2007: No), the lock control device 10 performs the operation in S2051 described below.

In contrast, in a case where I is smaller than or equal to N (S2007: Yes), the passcode generation section 104 generates passcode generation key information K[I] by converting the value obtained by combining the value of I with the master key extracted in S2001 with a predetermined hash function (S2009).

The passcode generation section 104 then converts the value obtained by combining the converted value of the current date and time corresponding to the type of the I-th passcode with generated K[I] with a predetermined hash function, thereby generating a passcode P[I] (S2011).

Next, the passcode generation section 104 adds "1" to I (S2013). The passcode generation section 104 then performs the operation in S2007 again.

Figure 22:
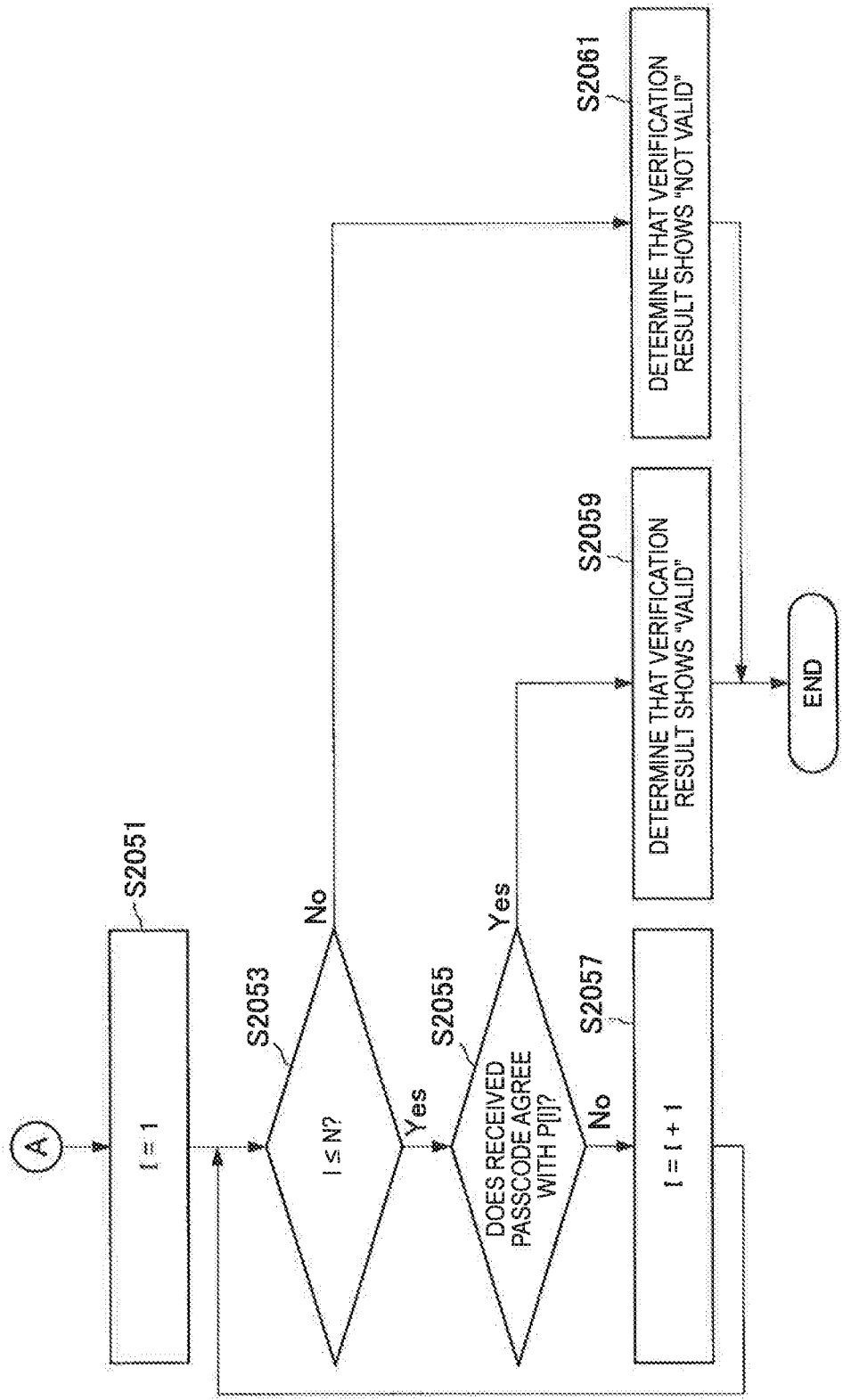
FIG. 22 is a flowchart illustrating a part of operation for the passcode verification process according to the embodiment.

Here, the operations from S2051 onward will be described with reference to FIG. 22. As illustrated in FIG. 22, the passcode verifying section 106 first sets "1" as I (S2051).

Next, the passcode verifying section 106 determines whether the value of is smaller than or equal to N (S2053). In a case where I is larger than N (S2053: No), the passcode verifying section 106 determines that a verification result shows "not valid" (S2061). The lock control device 10 then terminates the "passcode verification process."

In contrast, in a case where I is smaller than or equal to N (S2053: Yes), the passcode verifying section 106 next determines whether the passcode received in S1905 agrees with P[I] generated in S2011 (S2055). In a case where the received passcode agrees with P[I] (S2055: Yes), the passcode verifying section 106 determines that a verification result shows "valid" (S2059). The lock control device 10 then terminates the "passcode verification process."

In contrast, in a case where the received passcode does not agree with P[I] (S2055: No), the passcode verifying section 106 adds "1" to I (S2057). The passcode verifying section 106 then performs the operation in S2053 again.

[1-3-6. Locking Process]

Next, the operation for the "unlocking process A" in S21 (illustrated in FIG. 11) will be described in detail with reference to FIG. 23. Additionally, this operation is performed when the unauthorized user 2b operates the button unit 20 to transmit a locking request to the lock control device 10 after the door is unlocked in S19, and the unauthorized user 2b then views the inside of the building.

Figure 23:
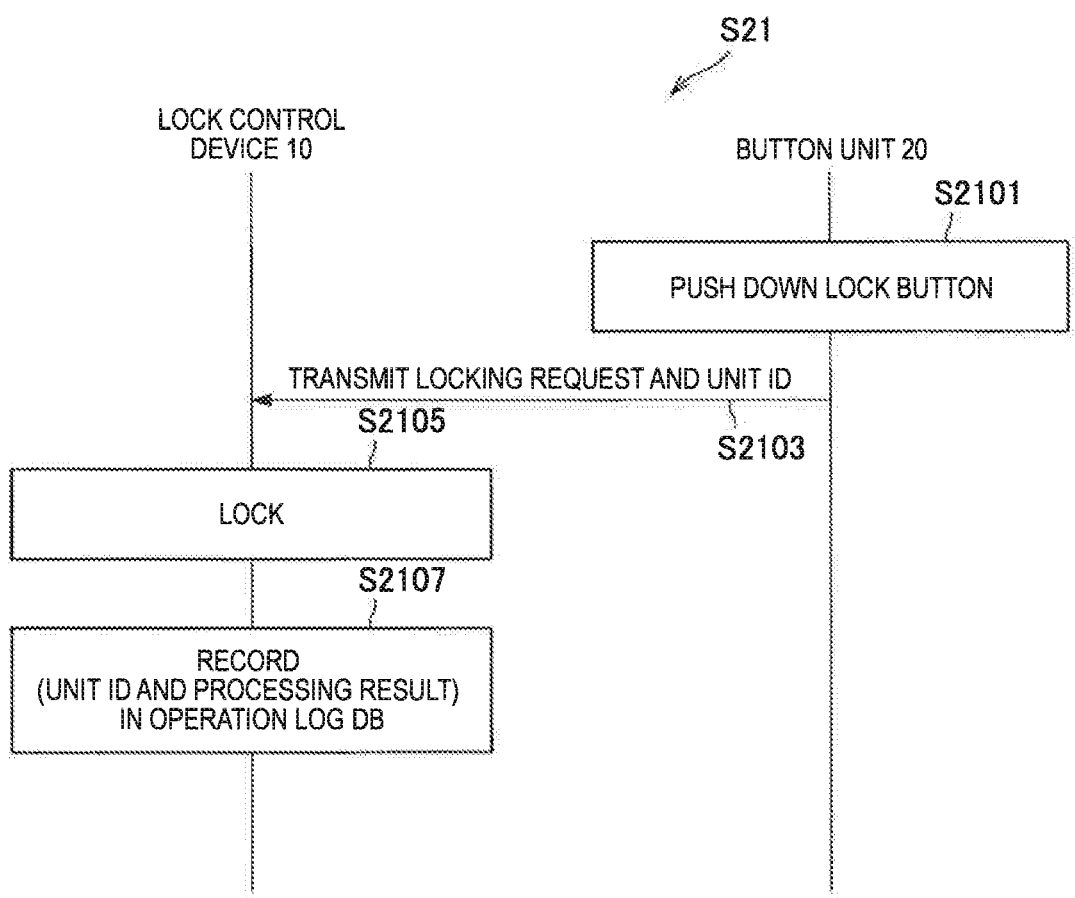
FIG. 23 is a sequence diagram illustrating an operation for a locking process according to the embodiment.

As illustrated in FIG. 23, the unauthorized user 2b first pushes down the lock button 254 of the button unit 20 (S2101). The button unit 20 then transmits the locking request and the unit ID of the button unit 20 to the lock control device 10 (S2103).

Afterward, the processing control section 108 of the lock control device 10 causes the locking section 122 to lock on the basis of the received locking request (S2105). The control section 100 then stores the unit ID received in S2103 and the result of the locking process in the operation log DB 130 in association with each other (S2107).

(1-3-6-1. Modification)

Additionally, as a modification of the "locking process," even in a case where the lock control device 10 receives no locking request from the button unit 20 (i.e., in a case where the operations in S2101 to S2103 are not performed), the lock control device 10 may also cause the locking section 122 to automatically lock, for example, with an automatic lock function. For example, as a modification of S2105, (the processing control section 108 of) the lock control device 10 may cause the locking section 122 to automatically lock whenever the door of the building is closed by the unauthorized user 2b.

[1-3-7. Operation Log Request Process]

Next, the operation for the "operation log request process" in S23 (illustrated in FIG. 11) will be described in detail with reference to FIG. 24. Additionally, this operation is performed when the owner user 2a carries the portable terminal 30-1 and visits the door at desired timing where the lock control device 10 is installed, and then acquires an operation log stored in the lock control device 10.

Figure 24:
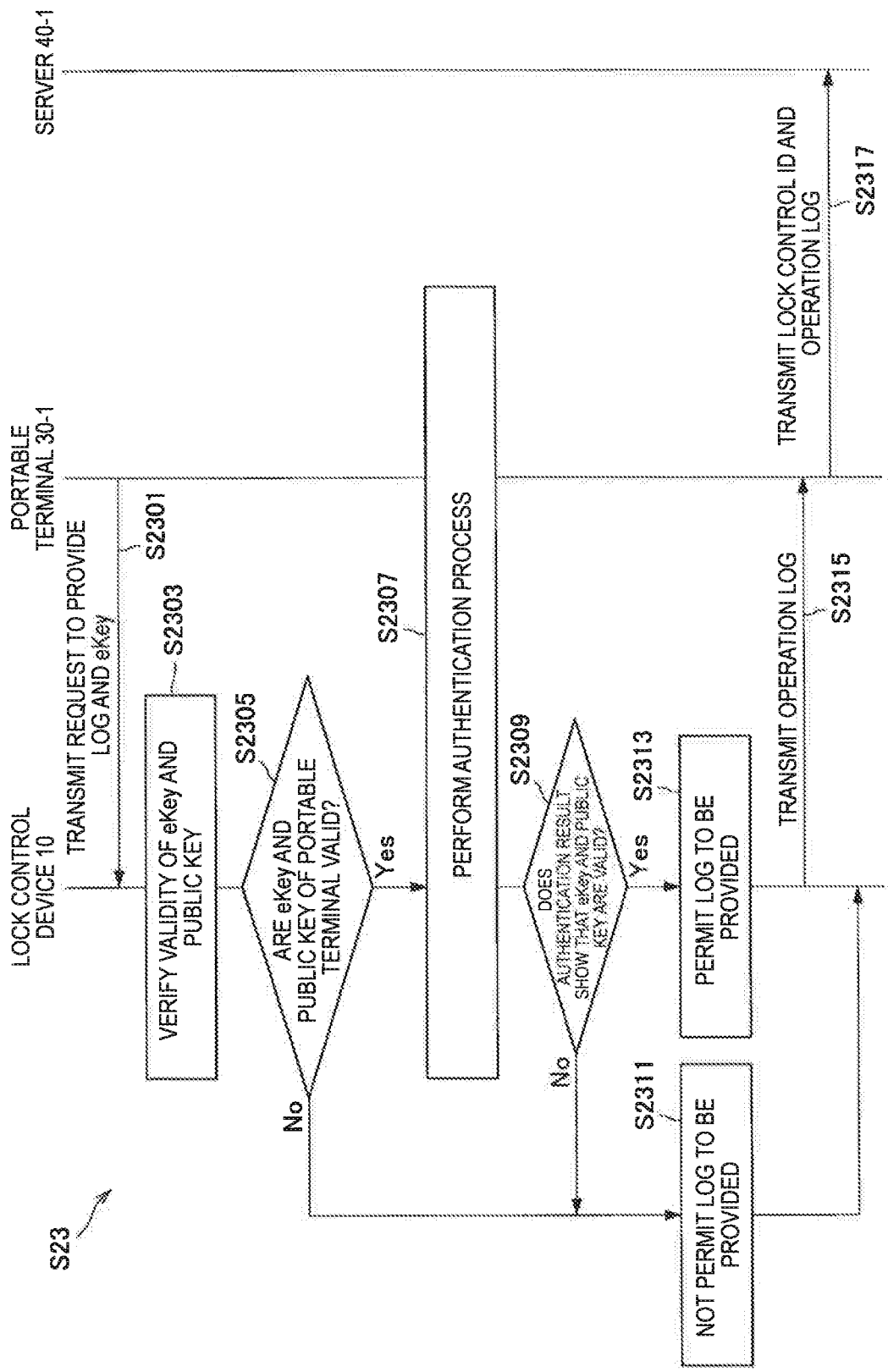
FIG. 24 is a sequence diagram illustrating an operation for an operation log request process according to the embodiment.

As illustrated in FIG. 24, the transmission control section 312 of the portable terminal 30-1 first causes the communication section 320 to transmit a request to provide the operation log and the eKey stored in the storage section 326 to the lock control device 10, for example, on the basis of an input made by the owner user 2a into the operation display section 322 (S2301).

Afterward, the authentication processing section 110 of the lock control device 10, for example, confirms the validity period of the eKey received in S2301, thereby verifying the validity of the eKey.

Next, the authentication processing section 110 uses the public key of the owner terminal stored in the storage section 124 to decode the certificate of the public key included in the eKey received in S2301. The authentication processing section 110 then verifies the validity of the public key of the portable terminal 30-1 included in the eKey received in S2301 on the basis of a decoding result (S2303). In a case where it is determined that one or more of the eKey and the public key of the portable terminal 30-1 are not valid (S2305: No), the lock control device 10 then performs the operation in S2311 described below.

In contrast, in a case where it is determined that the eKey and the public key of the portable terminal 30-1 are both valid (S2305: Yes), the authentication processing section 110 next performs challenge/response authentication with the portable terminal 30-1 by using the public key of the portable terminal 30-1 and a predetermined public key authentication algorithm (S2307). In a case where an authentication result shows that the eKey and the public key of the portable terminal 30-1 are not valid (S2309: No), the authentication processing section 110 does not permit the operation log to be provided (S2311). The lock control device 10 then terminates the "operation log request process."

In contrast, in a case where an authentication result shows that the eKey and the public key of the portable terminal 30-1 are valid (S2309: Yes), the authentication processing section 110 permits the operation log to be provided (S2313). The processing control section 108 then extracts the operation log stored in the operation log DB 130, and then causes the communication section 120 to transmit the extracted operation log to the portable terminal 30-1 (S2315).

Afterward, the transmission control section 312 of the portable terminal 30-1 causes the communication section 320 to (automatically) transmit the operation log received in S2315, and the lock control ID of the lock control device 10 to the server 40-1. Afterward, the control section 400-1 of the server 40-1 stores the received lock control ID and operation log in the storage section 422 in association with each other (S2317).

[1-3-8. Master Key Update Process]

Next, the operation for the "master key update process" in S25 (illustrated in FIG. 11) will be described in detail with reference to FIG. 25. Additionally, this operation is performed when the owner user 2a carries the portable terminal 30-1 and visits the door where the lock control device 10 is installed, and then updates the master key stored in the lock control device 10 in a case where the owner user 2a would like to update the master key registered in S11.

Figure 25:
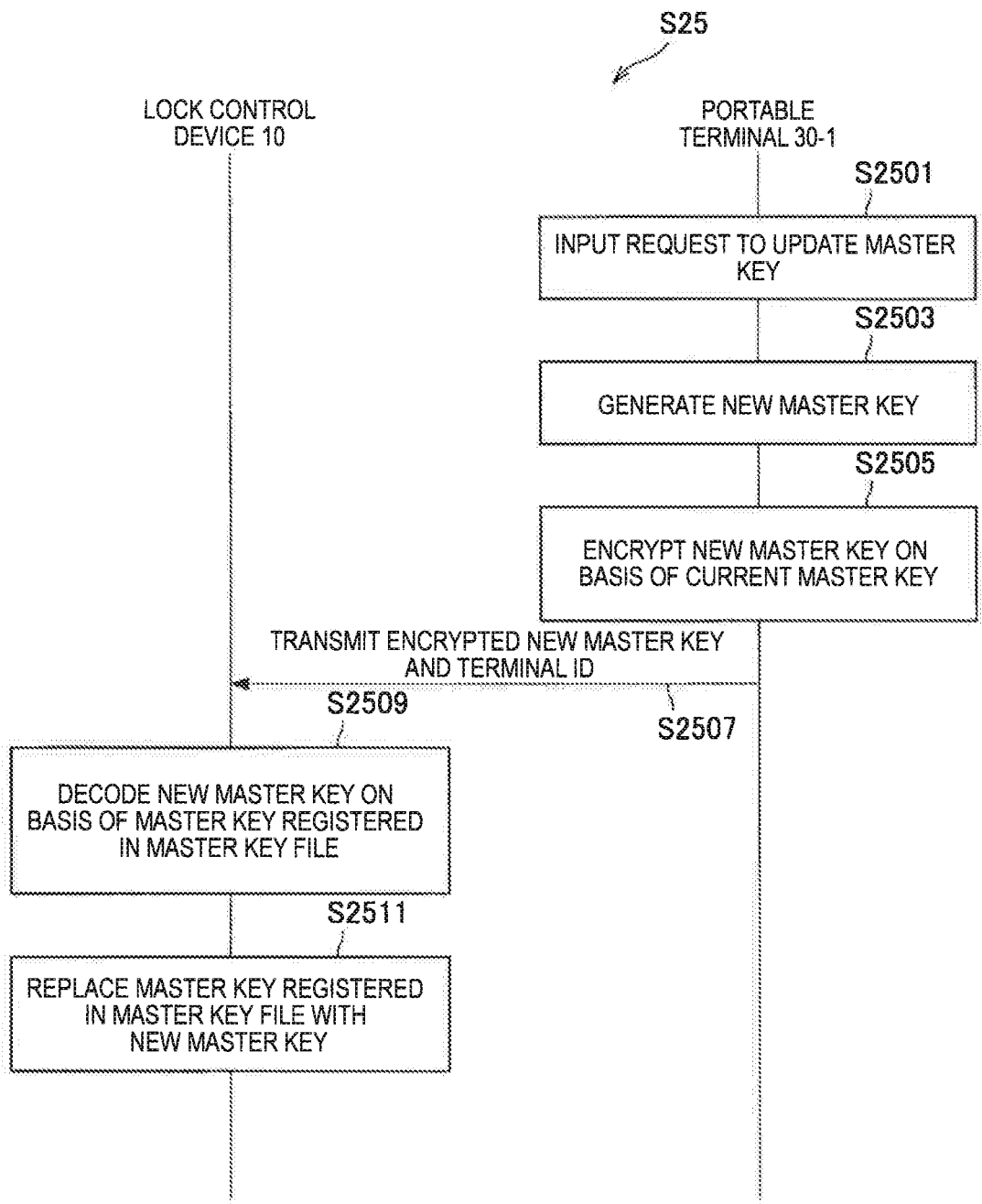
FIG. 25 is a sequence diagram illustrating an operation for a master key update process according to the embodiment.

As illustrated in FIG. 25, the owner user 2a first inputs a request to update the master key into the operation display section 322 of the portable terminal 30-1. (S2501). The master key generation section 302 of the portable terminal 30-1 then generates a new master key that is, for example, a pseudorandom number (S2503).

Next, the key information processing section 306 encrypts the master key generated in S2503 on the basis of the current master key stored in the storage section 326 and a predetermined common key encryption algorithm (S2505). The communication section 320 then transmits the new master key encrypted in S2505, and the terminal ID of the portable terminal 30-1 to the lock control device 10 in accordance with the control of the transmission control section 312 (S2507).

Afterward, the key information processing section 102 of the lock control device 10 decodes the encrypted new master key received in S1109 on the basis of the master key stored in the master key file 128 and the predetermined common key encryption algorithm (S2509).

The key information processing section 102 then updates the current master key stored in the master key file 128 in association with the terminal ID of the portable terminal 30-1 received in S2507 by replacing the current master key with the new master key decoded in S2509 (S2511).

<1-4. Advantageous Effects>

[1-4-1. Advantageous Effect 1]

As described above, for example, with reference to FIGS. 4, 11 to 25, and the like, the lock control device 10 according to the first embodiment receives a passcode and an unlocking request from the button unit 20, generates a passcode on the basis of a master key associated with portable terminal 30-1, and then executes an unlocking process on the basis of a comparison between the received passcode and the generated passcode. The lock control device 10 can therefore perform authentication without storing any passcode for authentication. Even if the lock control device 10 is illegally accessed, there are thus few risks that authentication safety is compromised.

[1-4-2. Advantageous Effect 2]

Further, in a case where a passcode is received from the button unit 20, the lock control device 10 generates a passcode with a logic that is substantially the same as a passcode generation logic of the portable terminal 30-1, and then compares the generated passcode with the received passcode. According to the first embodiment, the lock control device 10 can therefore perform accurate authentication without storing any passcode for authentication.

[1-4-3. Advantageous Effect 3]

Further, the lock control device 10 first generates passcode generation key information for each validity period type, and then generates a passcode for each validity period type (as many passcodes as the validity period types) on the basis of the generated passcode generation key information. In this way, the lock control device 10 distinguishes passcode generation key information for generating a passcode for each validity period type, so that the patterns of generated passcode strings considerably differ depending on validity period types. Accordingly, compared, for example, with a method that uses the same key information for different types of validity periods, the lock control device 10 can more accurately verify the validity of a received passcode.

[1-4-4. Advantageous Effect 4]

Further, the portable terminal 30-1 generates a passcode that is valid only in a period designated by the owner user 2a. The issued passcode is therefore invalid in other periods than the validity period, so that it is possible to prevent the door from unlocking at a date and time that is not intended by the owner user 2a.

[1-4-5. Advantageous Effect 5]

Further, according to the first embodiment, even the unauthorized user 2b (i.e., user who does not have the portable terminal 30-2 for which the eKey is issued, or the physical key) can easily unlock the door with the button unit 20 if the unauthorized user 2b is told the passcode by the owner user 2a in advance.

Further, for example, the owner user 2a can allow the unauthorized user 2b to view the inside of real estate even without offering the physical key to the unauthorized user 2b. it is thus possible to prevent the malicious unauthorized user 2b from duplicating the physical key.

[1-4-6. Advantageous Effect 6]

Further, according to the first embodiment, only a passcode is used for authentication between the button unit 20 and the lock control device 10, so that the button unit 20 only has to include the numeric keypad 250 and the unlock button 252. It is therefore possible to simply configure the button unit 20 at low cost.

[1-4-7. Advantageous Effect 7]

Further, there is an advantageous effect that the lock control device 10 shares a master key with the portable terminal 30-1 on the basis of a security code, thereby preventing the master key from being shared with the portable terminal 30-1b used by a user other than the owner user 2a (rightful owner of the lock control device 10). If even the portable terminal 30-1b used by an unauthorized user other than the owner user 2a can share a master key with the lock control device 10, the unauthorized user would issue a passcode with no permission. It is thus important in terms of security to limit authority to share a master key like the first embodiment.

<1-5. Modification>

Additionally, the first embodiment is not limited to the description above. The description above has described the example in which the lock control device 10 and the portable terminal 30-1 generate passcode generation key information, and then generate passcodes on the basis of the generated passcode generation key information.

According to a modification described below, the lock control device 10 and the portable terminal 30-1 can generate passcodes on the basis of a reset counter indicating the number of times passcodes are reset instead of generating passcode generation key information.

[1-5-1. Configuration]

First, the configuration according to the present modification will be described in detail. Additionally, the content overlapping with what has been described above will not be described.

(1-5-1-1. Lock Control Device 10)

Key Information Processing Section 102

The key information processing section 102 according to the present modification generates a master key on the basis of a reset counter received from the portable terminal 30-1 and a security code stored in the storage section 124. Additionally, the key information processing section 102 stores the generated master key in a master key file 128.

Further, the key information processing section 102 according to the present modification updates the master key on the basis of a reset counter received from the portable terminal 30-1 and a security code stored in the storage section 124. For example, in a case where a new reset counter is received from the portable terminal 30-1, the key information processing section 102 generates a new master key on the basis of the received reset counter and a security code stored in the storage section 124. The key information processing section 102 then updates the current master key stored in the master key file 128 by replacing the current master key with the new master key that is generated.

Passcode Generation Section 104

The passcode generation section 104 according to the present modification generates a predetermined number of passcodes on the basis of a master key generated by the key information processing section 102. For example, the passcode generation section 104 generates passcodes (as many passcodes as validity period types) on the basis of the generated master key, each of a predetermined number of types of validity periods based on the current date and time, and a predetermined hash function.

Here, the above-described function will be described in more detail with reference to FILE. 26. Additionally, FIG. 26 illustrates an example in which four types including "permanent," "one week," "one day," and "one hour" are decided in advance as validity periods. The passcode generation section 104 first uses a SHA to convert, for each validity period, each of the values obtained by combining the converted value of the current date and time corresponding to the validity period type with the master keys in the example illustrated in FIG. 26. For example, in a case where the validity period is "permanent," the passcode generation section 104 converts the value obtained by combining "0" with a master key by using a SRA. Similarly, in a case where the validity period is "one week," the passcode generation section 104 converts the value obtained by combining the "date of a predetermined day of the week corresponding to the current date" with a master key by using a SHA, In a case where the validity period is "one day," the passcode generation section 104 converts the value obtained by combining the "current date" with a master key by using a SHA. In a case where the validity period is "one week," the passcode generation section 104 converts the value obtained by combining the "current date and time period" with a master key by using a SHA.

The passcode generation section 104 then applies mod in a manner that the four converted values are each converted into the value of the number of digits the passcode has, and generates four passcodes (EP, WP, DP, and HP).

Additionally, what has been described above can be applied to the other components included in the lock control device 10.

(1-5-1-2. Portable Terminal 30-1)
Master Key Generation Section 302

Further, the master key generation section 302 according to the present modification generates a master key on the basis of a reset counter stored in the storage section 326, and a security code acquired by the two-dimensional code reading section 304.

Figure 27:
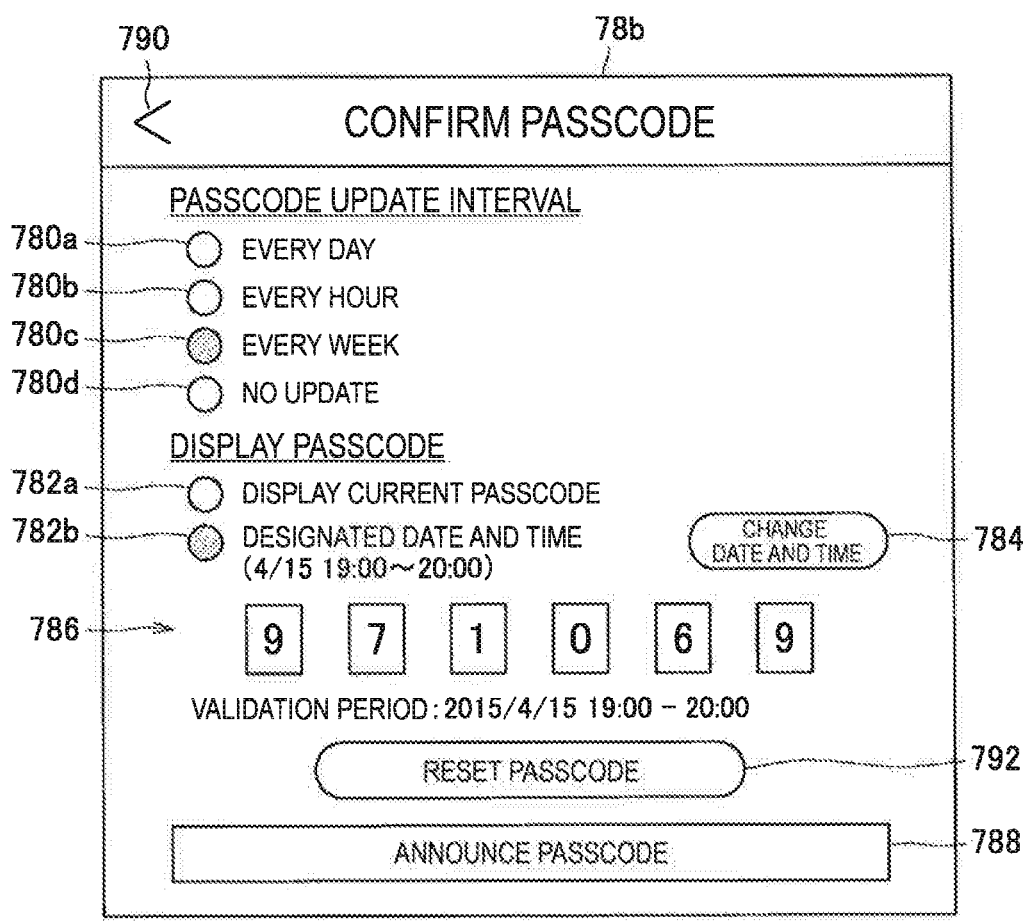
FIG. 27 is an explanatory diagram illustrating a display example of a passcode confirmation screen according to the modification.

FIG. 27 is an explanatory diagram illustrating a display example (passcode confirmation screen 78b) of a passcode confirmation screen according to the present modification. As illustrated in FIG. 27, the passcode confirmation screen 78b further includes a passcode reset button 792 as compared with the passcode confirmation screen 78a illustrated in FIG. 18. When this passcode reset button 792 is selected by the owner user 2a, the control section 300-1 increments the value of the reset counter by a predetermined number such as "1." The control section 300-1 then replaces the value of the reset counter stored in the storage section 326 with the incremented value. Additionally, whenever the value of the reset counter is updated, the master key generation section 302 generates a new master key on the basis of the incremented reset counter and the security code.

Passcode Generation Section 308

Further, the passcode generation section 308 according to the present modification generates a passcode on the basis of a master key generated by the master key generation section 302, and the type of validity period designated by a user from a predetermined number of types of validity periods. For example, in a case where a user designates a specific date and time, the passcode generation section 308 converts the value obtained by combining a master key with the designated date and time with a predetermined hash function, thereby generating a passcode. In contrast, in a case where a user does not designate a specific date or time, the passcode generation section 308 converts the value obtained by combining the converted value of the current date and time corresponding to a validity period type designated by the user with a master key with a predetermined hash function, thereby generating a passcode.

Additionally, what has been described above can be applied to the other components included in the portable terminal 30-1. Further, what has been described above can be applied to the configurations of the button unit 20 and the server 40-1.

[1-5-2. Operation]

Next, the operation according to the present modification will be described in the following order with reference to FIGS. 28 to 32. Additionally, the other types of operations are similar to what have been described above, and will not be described.
1. Master Key Registration Process
2. Passcode Generation Process
3. Passcode Verification Process
4. Reset Counter Update Process (1-5-2-1. Master Key Registration Process)

First, the operation for a "master key registration process" according to the present modification will be described with reference to FIGS. 28 to 29. Additionally, this operation is an operation that is executed instead of the operation in S11 illustrated in FIG. 12.

Figure 28:
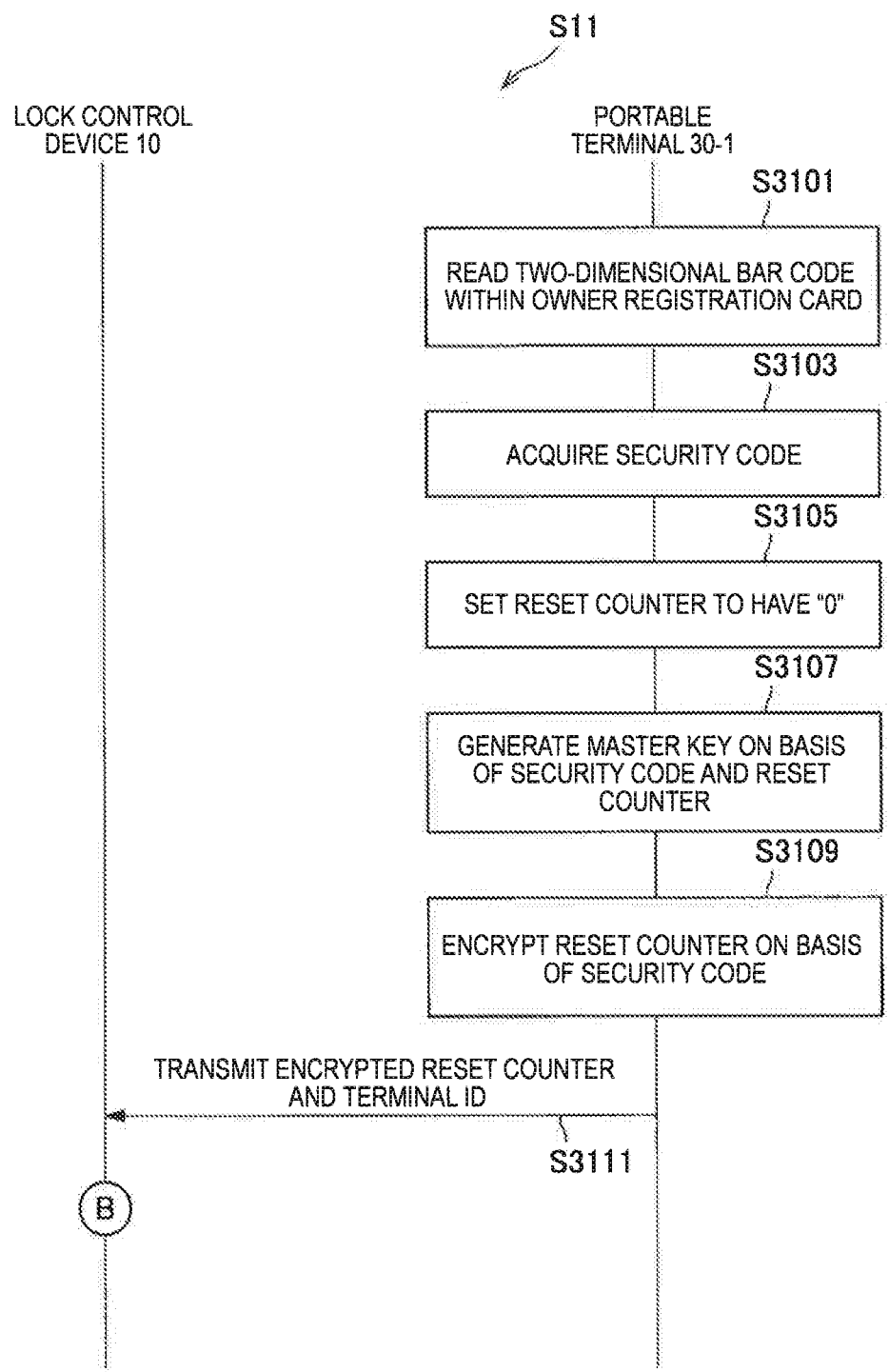
FIG. 28 is a sequence diagram illustrating a part of an operation for a master key registration process according to the modification.
Figure 29:
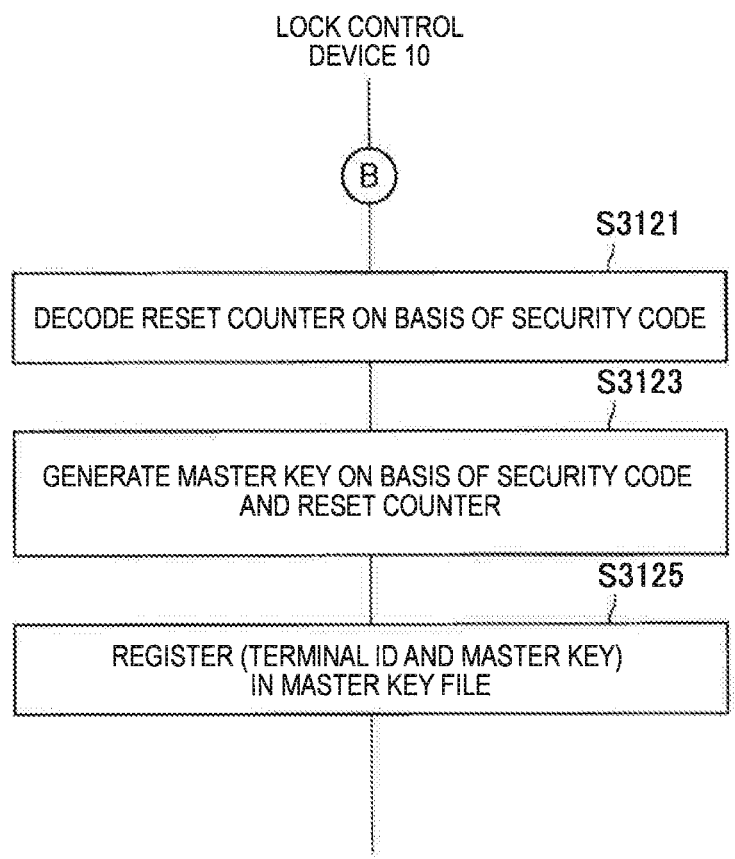
FIG. 29 is a sequence diagram illustrating a part of the operation for the master key registration process according to the modification.

Additionally, the operations in S3101 to S3103 illustrated in FIG. 28 are similar to those in S1101 to S1103 illustrated in FIG. 12.

After S3103, the control section 300-1 of the portable terminal 30-1 generates a reset counter that is set to have an initial value of "0." The control section 300-1 then stores the generated reset counter in the storage section 326 (S3105).

Next, the master key generation section 302 generates a master key on the basis of the security code acquired in S3103 and the reset counter generated in S3105. The master key generation section 302 then stores the generated master key in the storage section 326 (S3107).

Next, the key information processing section 306 encrypts the reset counter in S3105 on the basis of the security code and a predetermined common key encryption algorithm (S3109).

The communication section 320 then transmits the reset counter encrypted in S3109, and the terminal ID of the portable terminal 30-1 to the lock control device 10 in accordance with the control of the transmission control section 312 (S3111).

Here, the operations from S3111 onward will be described with reference to FIG. 29. As illustrated in FIG. 29, after S3111, the key information processing section 102 of the lock control device 10 decodes the encrypted reset counter received in S3111 on the basis of the security code stored in the storage section 326 and the predetermined common key encryption algorithm (S3121).

Next, the key information processing section 102 generates a master key on the basis of a reset counter received in. S3111 and a security code stored in the storage section 124 (S3123).

The key information processing section 102 then stores the generated master key and the terminal ID received in S3111 in the master key file 128 in association with each other (S3125).

(1-5-2-2. Passcode Generation Process)

Next, the operation for a "passcode generation process" according to the present modification will be described with reference to FIG. 30. Additionally, this operation is an operation that is executed instead of the operation in S15 illustrated in FIG. 19.

Figure 30:
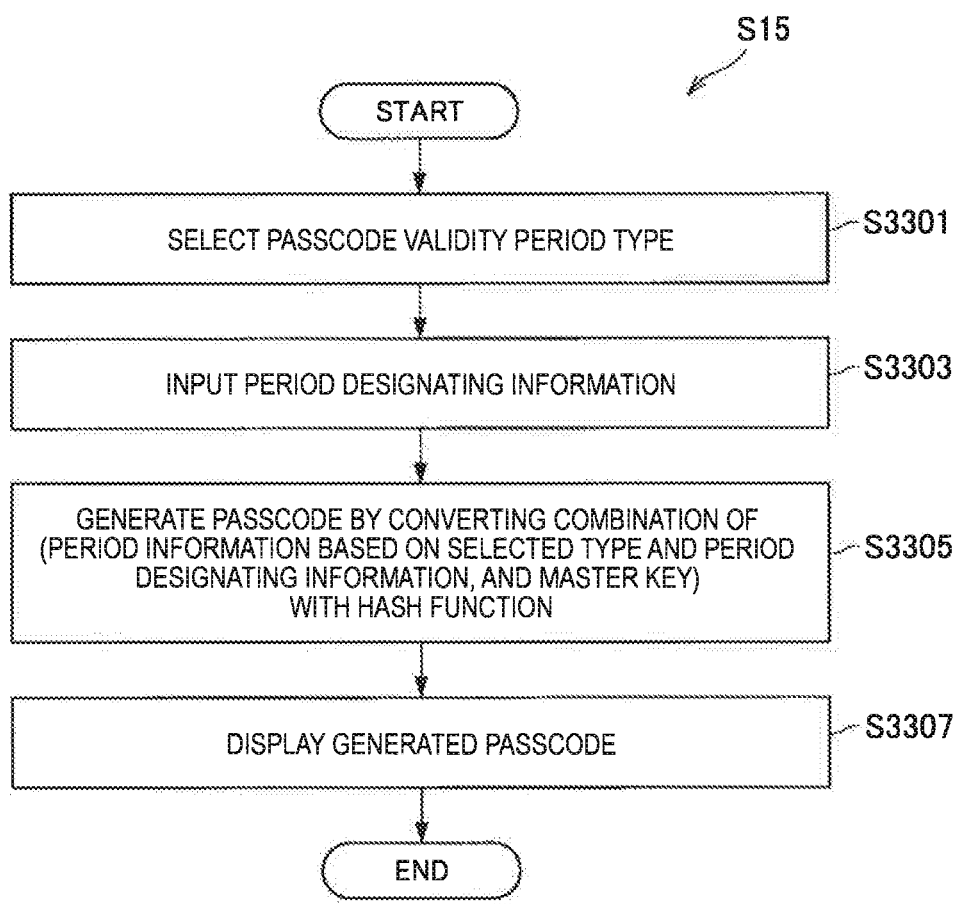
FIG. 30 is a flowchart illustrating an operation for a passcode generation process according to the modification.

Additionally, the operation in S3301 illustrated in FIG. 30 is similar to that in S1501 illustrated in FIG. 19. Further, the operation in S3303 illustrated in FIG. 30 is similar to that in S1505 illustrated in FIG. 19.

After S3303, the passcode generation section 308 of the portable terminal 30-1 generates a passcode by converting the combination of the period information based on the validity period type number selected in S3301 and the period designating information input in S3303, and the master key stored in the storage section 326 with a predetermined hash function (S3305), Additionally, the operation in S3307 illustrated in FIG. 30 is similar to that in S1509 illustrated in FIG. 19, (1-5-2-3. Passcode Verification Process)

Next, the operation for a "passcode verification process" according to the present modification will be described with reference to FIG. 31. Additionally, this operation is an operation that is executed instead of the operation in S1907 illustrated in FIG. 21.

Figure 31:
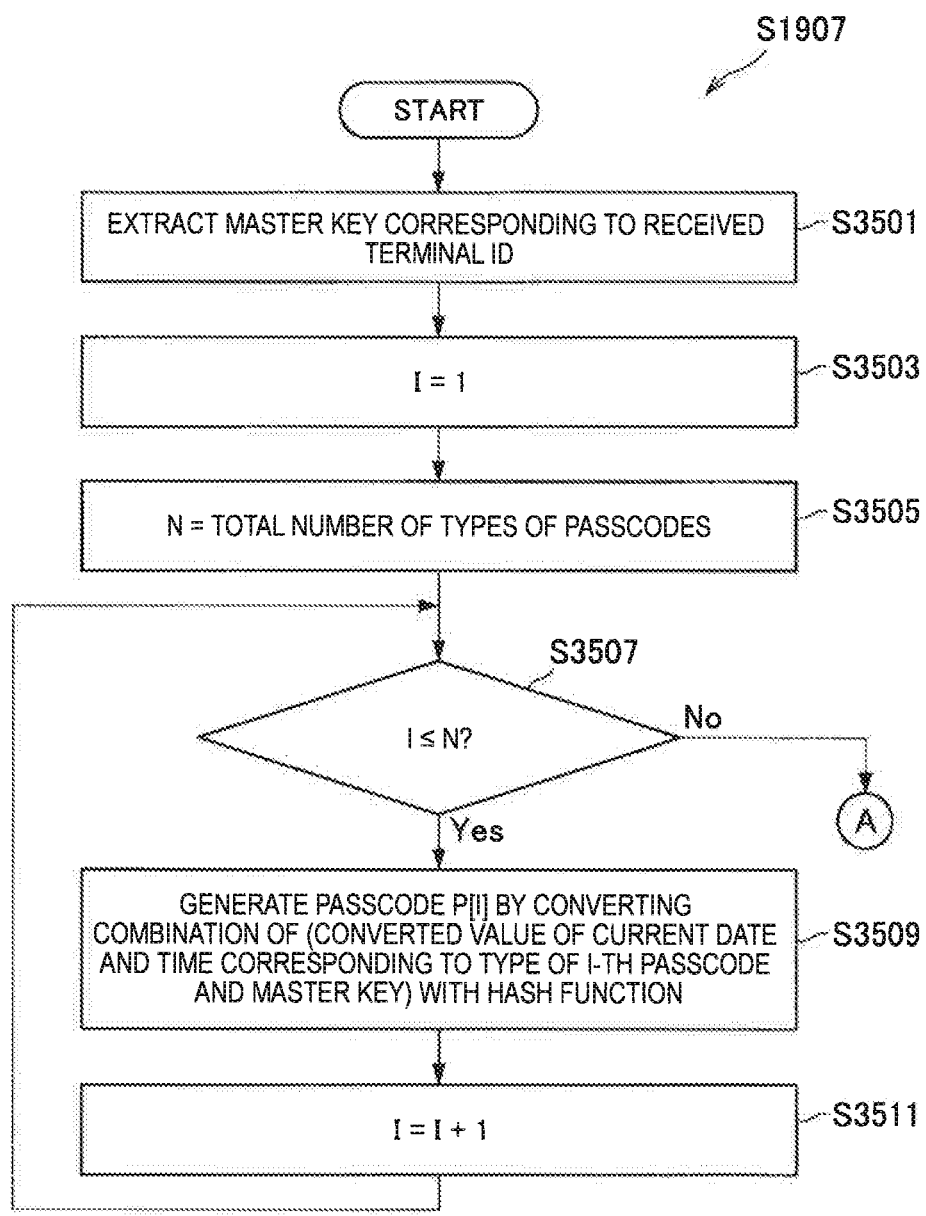
FIG. 31 is a sequence diagram illustrating part of an operation for a passcode verification process according to the modification.

Additionally, the operations in S3501 to S3505 illustrated in FIG. 31 are similar to those in S2001 to S2005 illustrated in FIG. 21.

After S3505, the passcode generation section 104 determines whether the value of I is smaller than or equal to N (S3507). In a case where I is larger than N (S3507: No), the lock control device 10 performs the operations similar to the operations (S2051 to S2061) illustrated in FIG. 22.

In contrast, in a case where I is smaller than or equal to N (S3507: Yes), the passcode generation section 104 then converts the value obtained by combining the converted value of the current date and time corresponding to the type of the I-th passcode with the master key extracted in S3501 with a predetermined hash function, thereby generating a passcode P[I] (S3509).

Next, the passcode generation section 104 adds "1" to I (S3511). The passcode generation section 104 then performs the operation in S3507 again.

(1-5-2-4. Reset Counter Update Process)

Next, the operation for a "reset counter update process" according to the present modification will be described with reference to FIG. 32. Additionally, this operation is executed when the owner user 2a updates the value of a reset counter on the basis of an input made into the portable terminal 30-1 in a case where the owner user 2a would like to reset the issued passcode.

Figure 32:
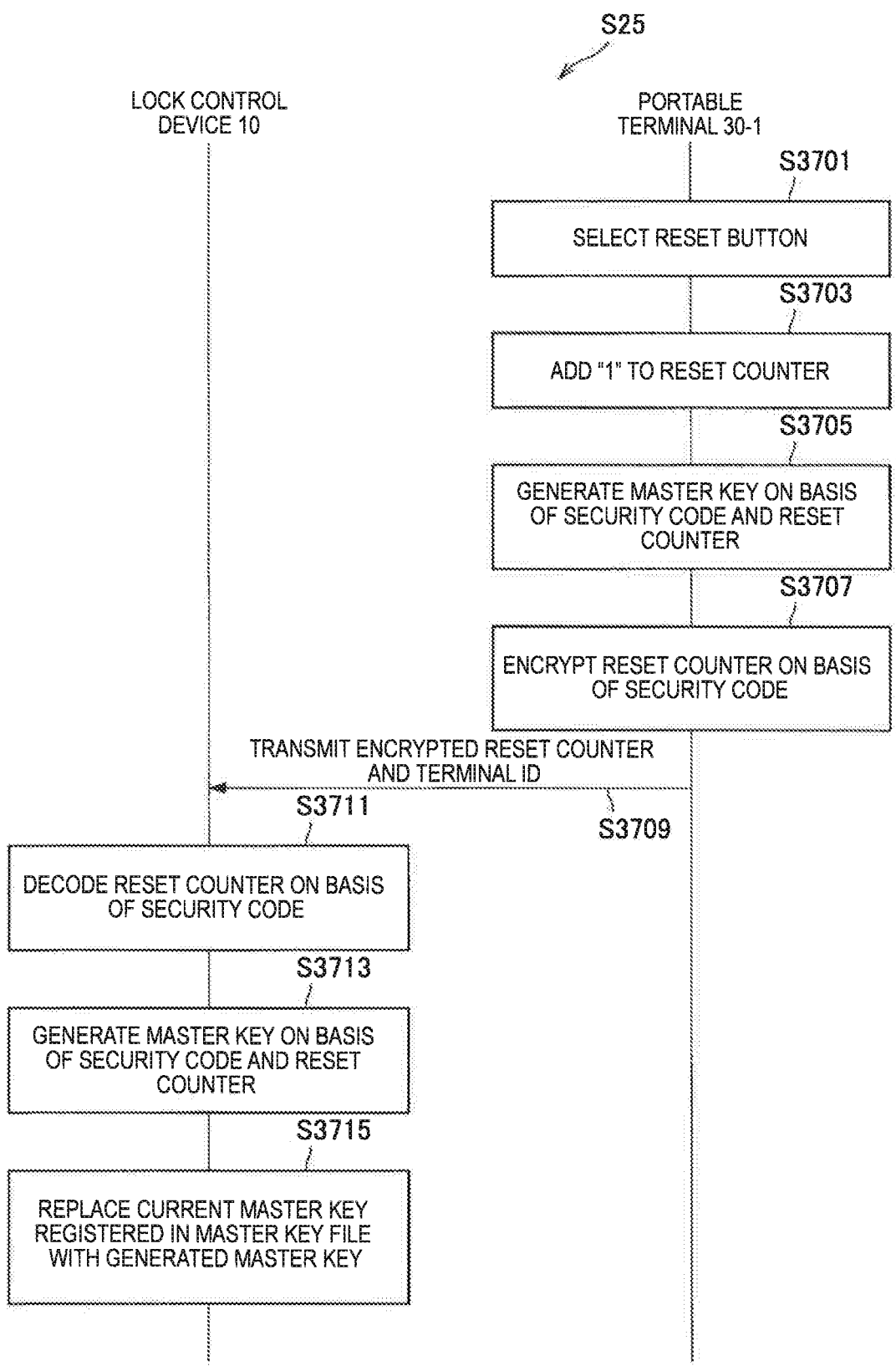
FIG. 32 is a sequence diagram illustrating an operation for a reset counter update process according to the modification.

As illustrated in FIG. 32, the owner user 2a first makes a passcode reset input by selecting the passcode reset button 792, for example, in the passcode confirmation screen 78b illustrated in FIG. 27 which is displayed on the operation display section 322 of the portable terminal 30-1 (S3701).

The control section 300-1 of the portable terminal 30-1 then extracts the reset counter stored in the storage section 326, and then increments the value of the reset counter by a predetermined number such as "1." The control section 300-1 then replaces the reset counter stored in the storage section 326 with the incremented reset counter (S3703).

Next, the master key generation section 302 generates a new master key on the basis of the incremented reset counter and the security code stored in the storage section 326. The master key generation section 302 replaces the current master key stored in the storage section 326 with the generated new master key, thereby updating the current master key (S3705).

Next, the key information processing section 306 encrypts the reset counter incremented in S3703 on the basis of the security code stored in the storage section 326 and a predetermined common key encryption algorithm (S3707). The communication section 320 then transmits the reset counter encrypted in S3707, and the terminal ID of the portable terminal 30-1 in accordance with the control of the transmission control section 312 (S3709).

Afterward, the key information processing section 102 of the lock control device 10 decodes the encrypted reset counter received in S3709 on the basis of the security code stored in the storage section 124 and the predetermined common key encryption algorithm (S3711). At this moment, the key information processing section 102 can also verify whether the decoded value is valid. For example, the key information processing section 102 verifies whether the value obtained by incrementing the value of the current reset counter stored in the storage section 124 by a predetermined value agrees with the decoded value.

Next, the key information processing section 102 generates a new master key on the basis of the security code stored in the storage section 124 and the decoded reset counter (S3713).

Afterward, the key information processing section 102 updates the current master key stored in the master key file 128 in association with the terminal ID of the portable terminal 30-1 received in S3709 by replacing the current master key with the new master key generated in S3713 (S3715).

Modification

Additionally, the "reset counter update process" according to the present modification is not limited the above-described operation. First, for example, the portable terminal 30-1 may also transmit the reset counter to the lock control device 10 without encrypting the reset counter as modifications of S3707 to S3711. The lock control device 10 may then verify the validity of the reset counter received from the portable terminal 30-1 on the basis of a message authentication code (MAC). For example, the lock control device 10 verifies on the basis of the MAC whether the reset counter received from the portable terminal 30-1 is manipulated.

2. Second Embodiment

The first embodiment has been described above. As described above, the portable terminal 30-1 generates and issues a passcode on the basis of an input made by the owner user 2a into the key sharing service application implemented in the portable terminal 30-1 in the first embodiment, Next, a second embodiment will be described. As described below, according to the second embodiment, the server 40-2 can generate a passcode on the basis of a passcode generation condition designated by the owner user 2a in the portable terminal 30-2. Further, in a case where the server 40-2 receives a request to provide a passcode from the communication terminal 50, the server 40-2 can cause the communication terminal 50 to display the generated passcode.

<2-1. System Configuration>

The information processing system according to the second embodiment includes the portable terminal 30-2 and the server 40-2 instead of the portable terminal 30-1 and the server 40-1 as compared with the first embodiment (illustrated in FIG. 2). Additionally, the other components are similar to those of the first embodiment.

<2-2. Configuration>

Next, the configuration according to the second embodiment will be described in detail. Additionally, the following does not describe what overlaps with the first embodiment.

[2-2-1. Portable Terminal 30-2]

Figure 33:
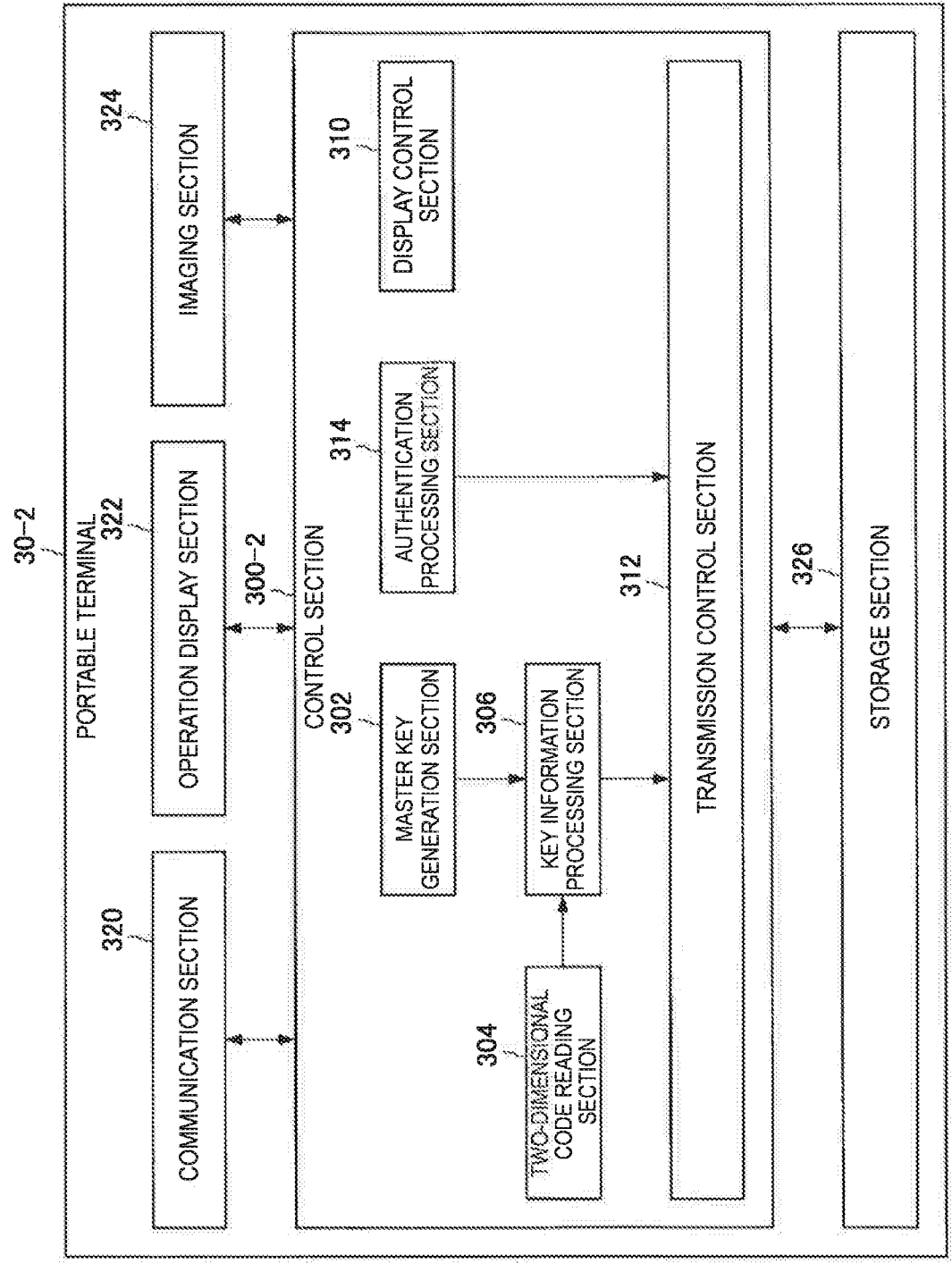
FIG. 33 is a functional block diagram illustrating a configuration example of a portable terminal 30-2 according to a second embodiment of the present disclosure.

FIG. 33 is a functional block diagram illustrating the configuration of the portable terminal 30-2 according to the second embodiment. As illustrated in FIG. 33, the portable terminal 30-2 includes a control section 300-2 instead of the control section 300-1 as compared with the portable terminal 30-1 illustrated in FIG. 9. Further, the control section 300-2 does not include the passcode generation section 308 as compared with the control section 300-1.

Additionally, the other components included in the portable terminal 30-2 are substantially similar to those of the first embodiment.

[2-2-2. Server 40-2]

Figure 34:
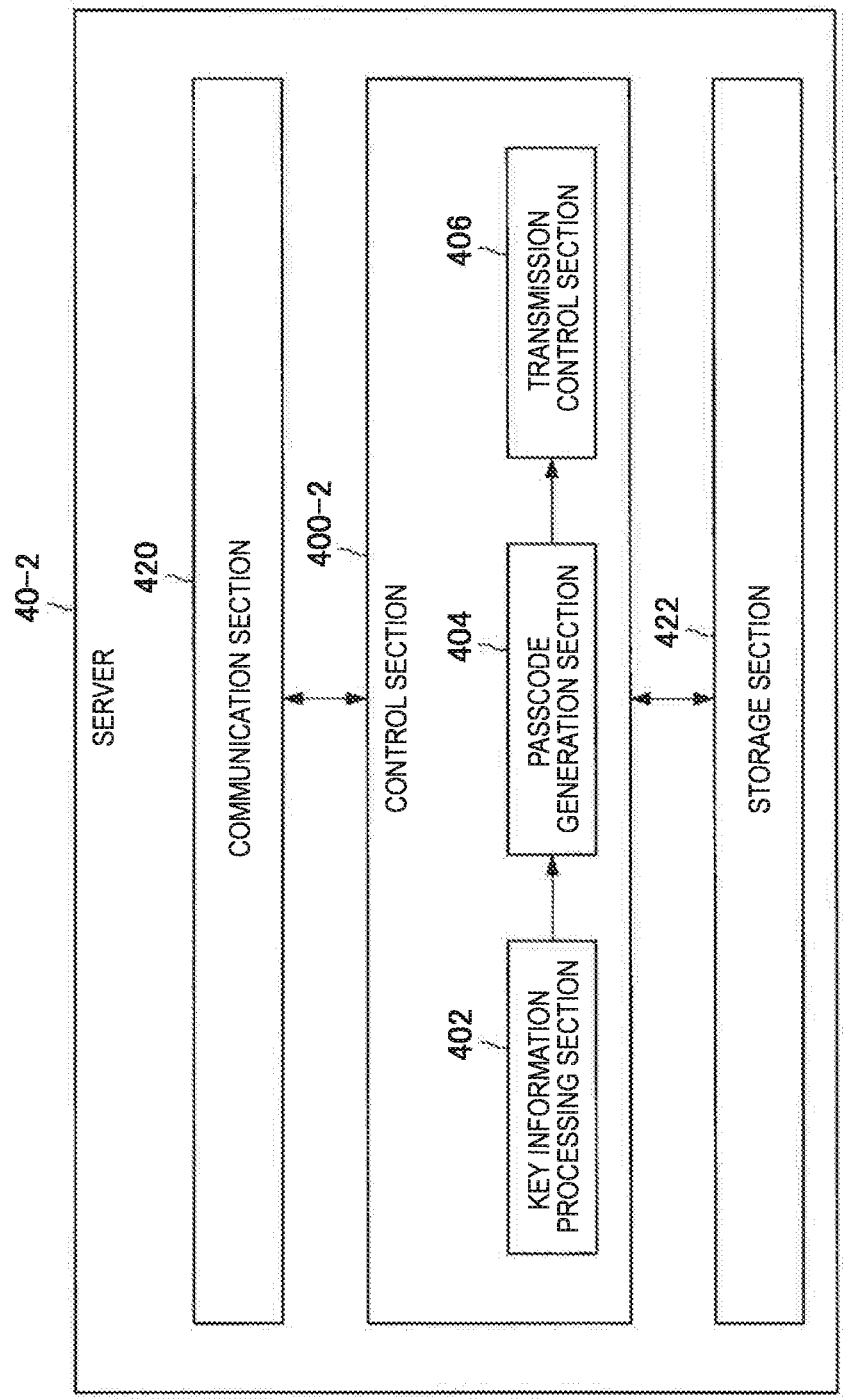
FIG. 34 is a functional block diagram illustrating a configuration example of a server 40-2 according to the embodiment.

FIG. 34 is a functional block diagram illustrating the configuration of the server 40-2 according to the second embodiment. As illustrated in FIG. 34, the server 40-2 includes a control section 400-2 instead of the control section 400-1 as compared with the server 40-1 illustrated in FIG. 10.

(2-2-2-1. Control Section 400-2)

The control section 400-2 further includes a key information processing section 402, a passcode generation section 404, and a transmission control section 406 as compared with the control section 400-1.

(2-2-2-2. Key Information Processing Section 402)

The key information processing section 402 acquires a master key on the basis of information received from the portable terminal 30-2. For example, the key information processing section 402 decodes the master key encrypted, for example, on the basis of the key sharing protocol, thereby acquiring a master key.

Additionally, the key information processing section 402 stores the decoded master key in the storage section 422.

(2-2-2-3. Passcode Generation Section 404)

The passcode generation section 404 is an example of the second authentication information generation section in the present disclosure. The passcode generation section 404 generates a passcode on the basis of the master key decoded by the key information processing section 402.

For example, the passcode generation section 404 first generates passcode generation key information on the basis of the master key decoded by the key information processing section 402, the type of validity period that is received from the portable terminal 30-2 among a predetermined number of types of validity periods decided in advance and, for example, designated by the owner user 2a, and a predetermined hash function. The passcode generation section 404 then generates a passcode on the basis of the generated passcode generation key information, the period designating information that is received from the portable terminal 30-2 and, for example, designated by the owner user 2a, and a predetermined hash function.

(2-2-2-4. Transmission Control Section 406)

The transmission control section 406 is an example of the display control section in the present disclosure. For example, in a case where a request to provide a passcode is received from the communication terminal 50, the transmission control section 406 causes the communication section 420 to transmit the passcode generated by the passcode generation section 404 to the communication terminal 50.

Additionally, the other components included in the server 40-2 are similar to those of the first embodiment. Further, the configurations of the lock control device 10 and the button unit 20 are similar to the configuration described in the first embodiment.

<2-3. Operation>

The configuration according to the second embodiment has been described above. Next, the operation according to the second embodiment will be described in the following order with reference to FIGS. 35 to 39. Additionally, the other types of operations are similar to those of the first embodiment, and will not be described.

1. Overview of Entire Operation
2. Master Key Registration Process
3. Passcode Generation Process
4. Passcode Providing Process
5. Master Key Update Process

[2-3-1. Overview of Entire Operation]

Figure 35:
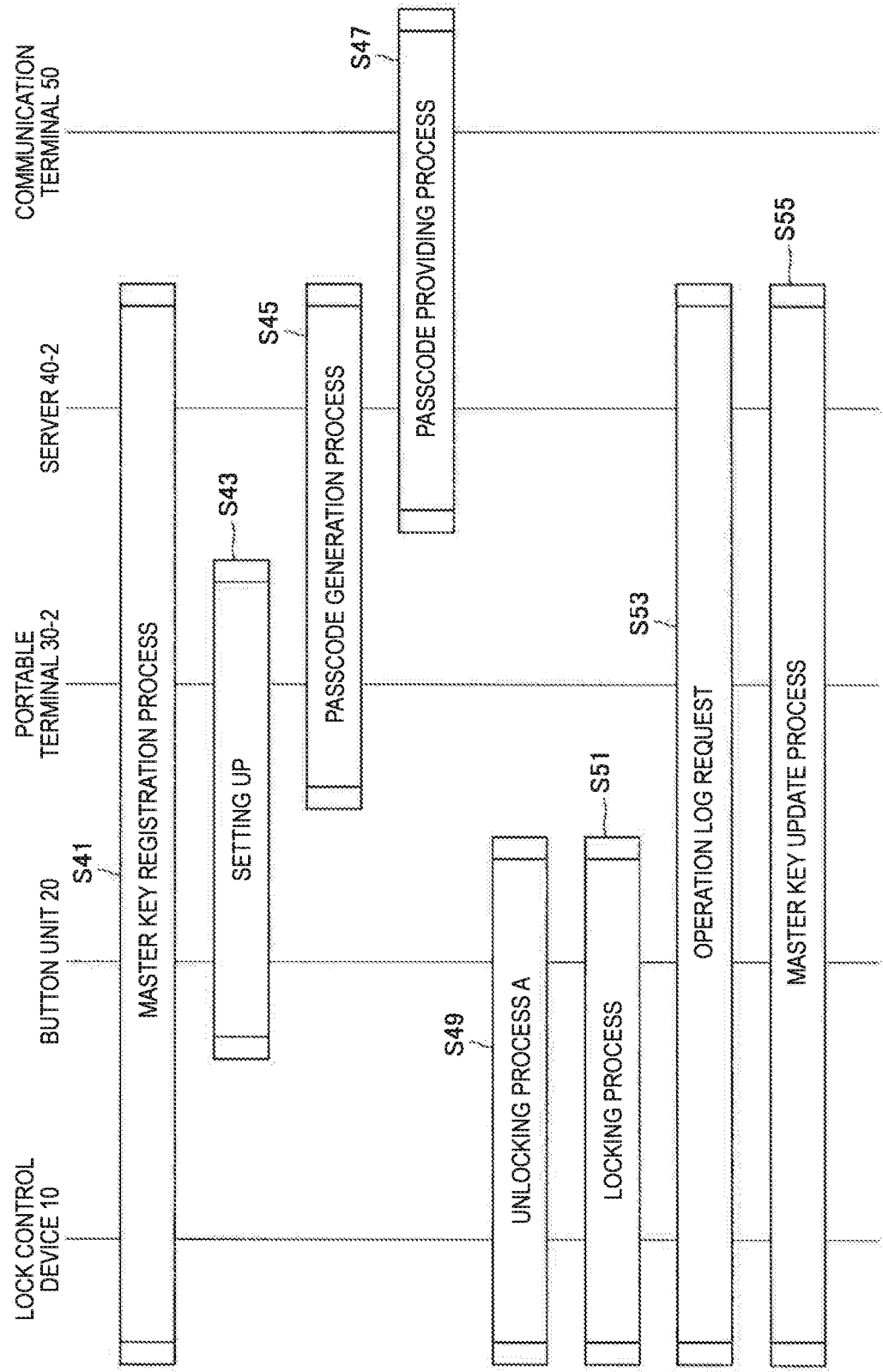
FIG. 35 is a sequence diagram illustrating an overview of an entire operation according to the embodiment.

FIG. 35 is a sequence diagram illustrating the overview of the entire operation according to the second embodiment. As illustrated in FIG. 35, the portable terminal 30-2 first performs a "master key registration process" described below on the basis of an operation of the owner user 2a to register a master key in the lock control device 10 and the server 40-2 (S41).

Afterward, the portable terminal 30-2 performs a "process of setting up the button unit 20" substantially similar to that of S13 in the first embodiment (S43).

Afterward, in a case where a request to issue a passcode which is based on an input made by the owner user 2a is received from the portable terminal 30-2, the server 40-2 performs a "passcode generation process" described below (S45).

Afterward, in a case where a request to provide a passcode which is based on an input made by the owner user 2a is received from the communication terminal 50, the server 40-2 performs a "passcode providing process" described below (S47).

Afterward, the button unit 20 performs an "unlocking process A" substantially similar to that of S19 in the first embodiment on the basis of an operation of the unauthorized user 2b (S49).

Afterward, the button unit 20 performs a "locking process" substantially similar to that of S21 in the first embodiment on the basis of an operation of the unauthorized user 2b (S51).

Afterward, the portable terminal 30-2 performs an "operation log request process" substantially similar to that of S23 in the first embodiment on the basis of an operation of the owner user 2a (S53).

Afterward, in a case where the owner user 2a would like to update the master key registered in S41, the owner user 2a carries the portable terminal 30-2 and visits the door where the lock control device 10 is installed. The portable terminal 30-2 then performs a "master key update process" described below on the basis of an operation of the owner user 2a to update the master key registered in the lock control device 10 (S55).

[2-3-2. Master Key Registration Process]

The overview of the entire operation according to the second embodiment has been described above. Next, the operation for the "master key registration process" in S41 will be described in detail with reference to FIG. 36. Additionally, this operation is an operation that is executed instead of the operation in S11 according to the first embodiment illustrated in FIG. 12.

Figure 36:
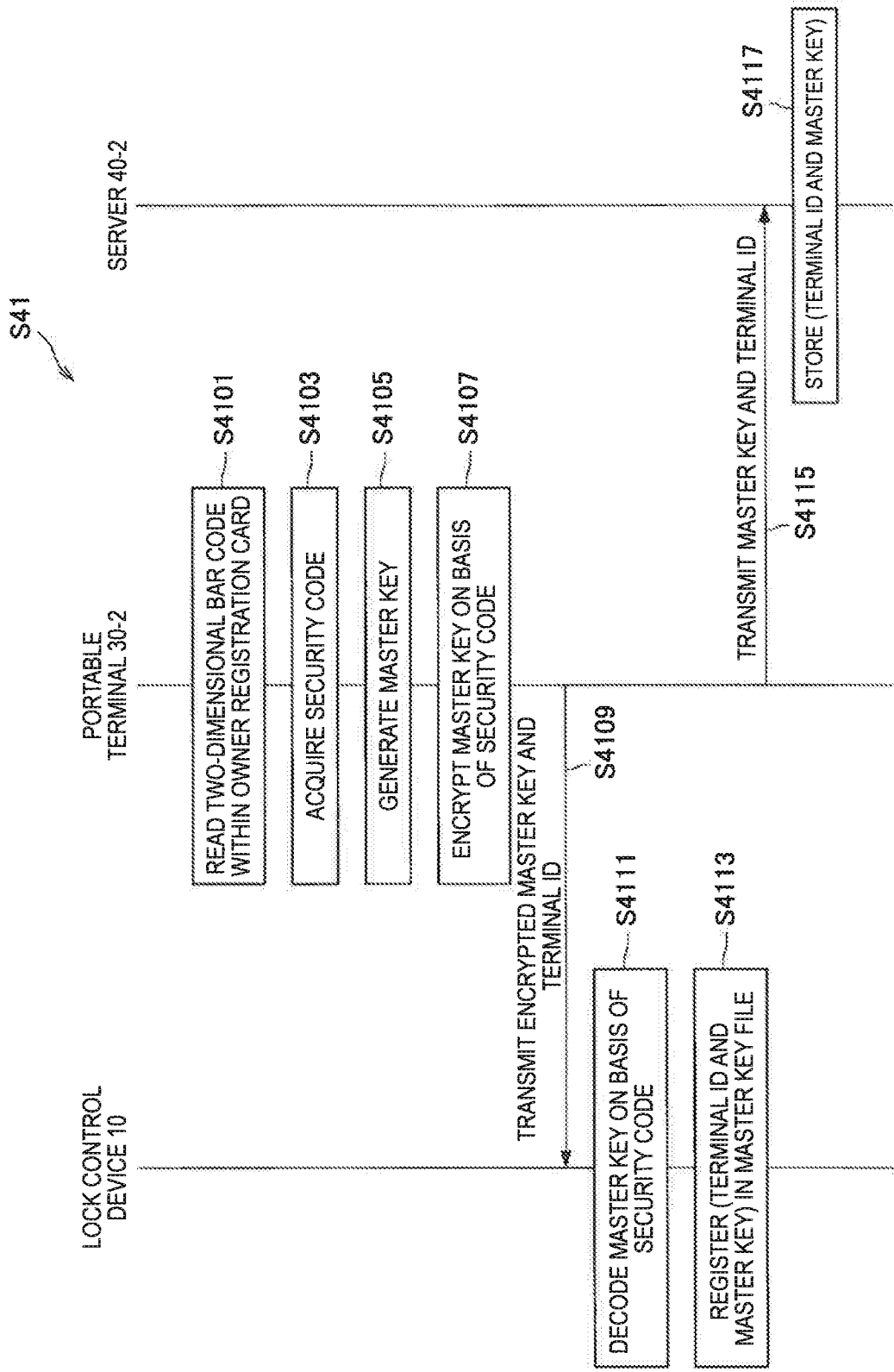
FIG. 36 is a sequence diagram illustrating a master key registration process according to the embodiment.

Additionally, the operations S4101 to S4113 illustrated in FIG. 36 are similar to those in S1101 to S1113 according to the first embodiment.

As illustrated in FIG. 36, the key information processing section 306 of the portable terminal 30-2 encrypts the master key generated in S4105 and the terminal ID of the portable terminal 30-2, for example, on the basis of the key sharing protocol after S4109. The communication section 320 then transmits the encrypted master key, and the terminal ID of the portable terminal 30-2 to the server 40-2 in accordance with the control of the transmission control section 312 (S4115).

Afterward, the key information processing section 402 of the server 40-2 decodes the received information, for example, on the basis of the key sharing protocol. The key information processing section 402 then stores the decoded master key and terminal ID of the portable terminal 30-2 in the storage section 422 in association with each other (S4117).

[2-3-3. Passcode Generation Process]

Next, the operation for the "passcode generation process" in S45 will be described in detail with reference to FIG. 37. Additionally, this operation is performed when the server 40-2 receives a generation condition input by the owner user 2a into the portable terminal 30-2 from the portable terminal 30-2 to generate a passcode.

Figure 37:
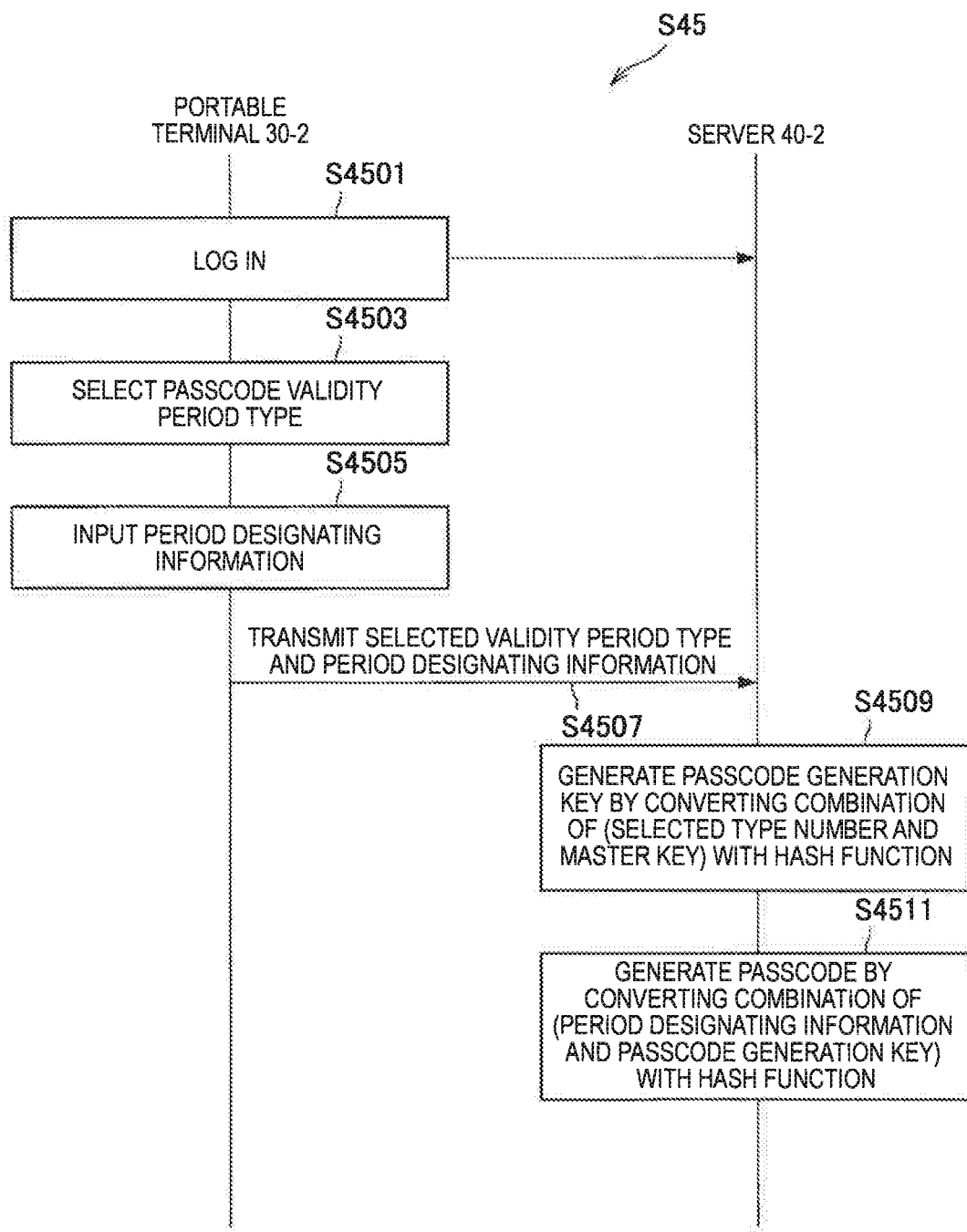
FIG. 37 is a sequence diagram illustrating an operation for a passcode generation process according to the embodiment.

As illustrated in FIG. 37, the portable terminal 30-2 first logs in a web site for issuing a passcode which is, for example, provided from the server 40-2, on the basis of an input made by the owner user 2a (S4501). The portable terminal 30-2 then receives a generation condition setting screen for a passcode from the server 40-2. Additionally, this generation condition setting screen may be a screen that is similar, for example, to the passcode confirmation screen 78 illustrated in FIG. 18.

Afterward, the owner user 2a selects a passcode validity period type to be generated in this generation condition setting screen (S4503). Moreover, the owner user 2a inputs period designating information of a passcode in the generation condition setting screen (S4505).

The communication section 320 of the portable terminal 30-2 then transmits the validity period type selected in S4503, and the period designating information input in S4505 to the server 40-2 in accordance with the control of the transmission control section 312 (S4507).

Afterward, the passcode generation section 404 of the server 40-2 generates passcode generation key information by converting the combination of a validity period type number received in S4507 and a master key stored in the storage section 422 with a predetermined hash function (S4509).

Next, the passcode generation section 404 generates a passcode by converting the combination of the period designating information received in S4507 and the passcode generation key information generated in S4509 with a predetermined hash function (S4511).

[2-3-4. Passcode Providing Process]

Next, the operation of the "passcode providing process" in S47 will be described in detail with reference to FIG. 38. Additionally, this operation is performed when the server 40-2 transmits a generated passcode to the communication terminal 50 in a case where the unauthorized user 2b inputs a request to provide a passcode into the communication terminal 50.

Figure 38:
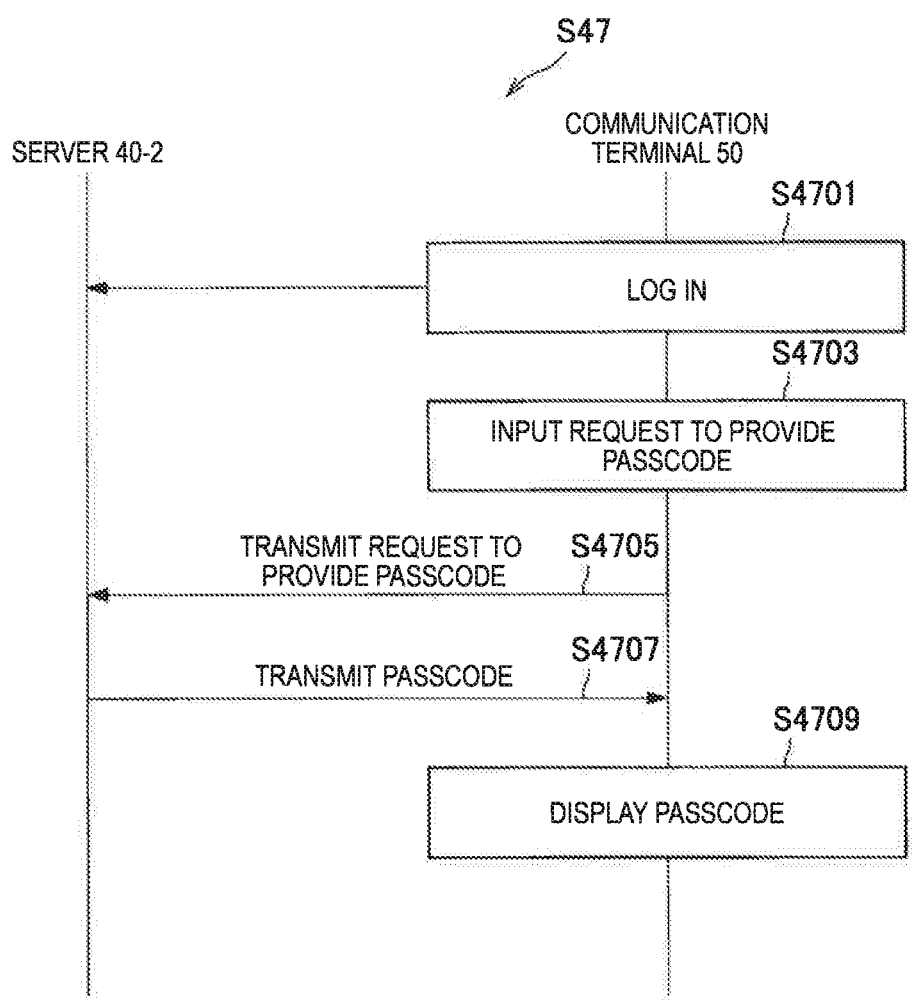
FIG. 38 is a sequence diagram illustrating an operation for a passcode providing process according to the embodiment.

As illustrated in FIG. 38, the communication terminal 50 first logs in a web site for confirming a passcode which is, for example, provided from the server 40-2, on the basis of an input made by the unauthorized user 2b (S4701).

Afterward, the unauthorized user 2b inputs a request to provide a passcode into the communication terminal 50 (S4703). The communication terminal 50 then transmits the input request to provide a passcode to the server 40-2 (S4705).

Afterward, the communication section 420 of the server 40-2 transmits the passcode generated in S45 to the communication terminal 50 in accordance with the control of the transmission control section 406 (S4707).

Afterward, the communication terminal 50 displays the received passcode on a display screen (S4709). This allows the unauthorized user 2b to confirm the passcode generated in S45.

[2-3-5. Master Key Update Process]

Next, the operation of the "master key update process" in S55 will be described in detail with reference to FIG. 39. Additionally, this operation is an operation that is executed instead of the operation in S25 according to the first embodiment illustrated in FIG. 25.

Figure 39:
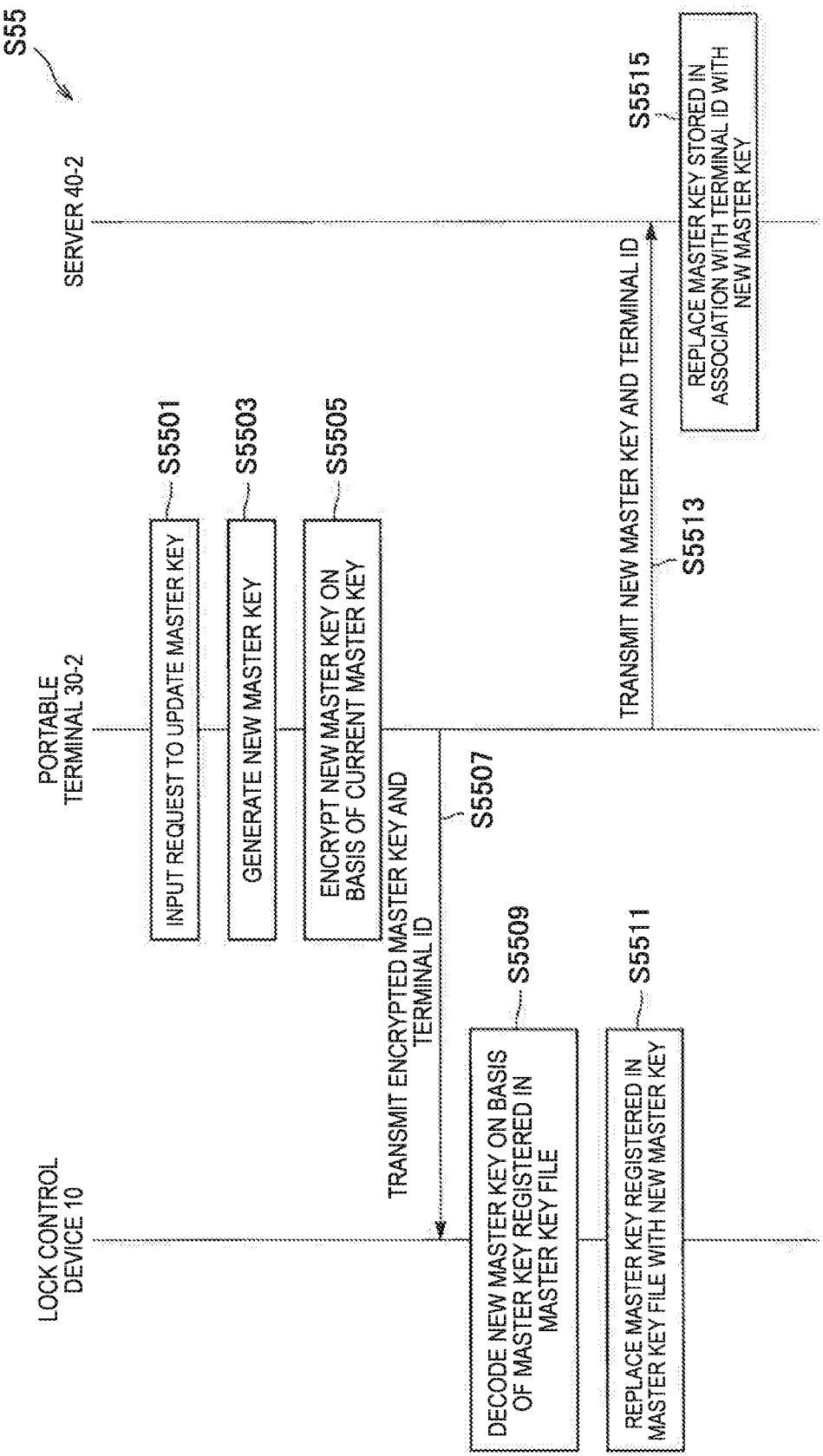
FIG. 39 is a sequence diagram illustrating an operation for a master key update process according to the embodiment.

Additionally, the operations in S5501 to S5511 illustrated in FIG. 39 are similar to the operations in S2501 to S2511 according to the first embodiment (illustrated in FIG. 25).

The key information processing section 306 of the portable terminal 30-2 encrypts the master key generated in S5503 and the terminal ID of the portable terminal 30-2, for example, on the basis of the key sharing protocol after S5507. The communication section 320 then transmits the encrypted master key, and the terminal ID of the portable terminal 30-2 to the server 40-2 in accordance with the control of the transmission control section 312 (S5513).

Afterward, the key information processing section 402 of the server 40-2 decodes the information received in S5513, for example, on the basis of the key sharing protocol. The key information processing section 402 then updates the current master key stored in the storage section 422 in association with the received terminal ID of the portable terminal 30-2 by replacing the current master key with the decoded new master key (S5515).

<2-4. Advantageous Effects>

[2-4-1. Advantageous Effect 1]

As described above, for example, with reference to FIGS. 34 to 39 and the like, the server 40-2 according to the second embodiment generates passcode generation key information on the basis of a master key received from the portable terminal 30-2 and a validity period type received from the portable terminal 30-2, and then generates a passcode on the basis of the generated passcode generation key information and period designating information received from the portable terminal 30-2. The server 40-2 then transmits the generated passcode to the communication terminal 50 in a case where a request to provide a passcode is received from the communication terminal 50.

According to the second embodiment, this allows the server 40-2 to generate a passcode instead of the portable terminal 30-2, and further provide the generated passcode to the unauthorized user 2b.

[2-4-2. Advantageous Effect 2]

Further, the other configurations according to the second embodiment are substantially similar to the configurations of the first embodiment, and will attain the substantially similar advantageous effects to the advantageous effects of the first embodiment.

<2-5. Modification>

Additionally, the second embodiment is not limited to the description above. For example, the modification of the first embodiment described in Section 1-5 can also be applied to the second embodiment. That is, the server 40-2 (and the lock control device 10) can generate a passcode on the basis of a security code and a reset counter instead of generating passcode generation key information in a modification of the second embodiment. Additionally, the specific processing details are substantially similar to what has been described in Section 1-5, and will not be described.

3. Third Embodiment

The second embodiment has been described above. As described above, it is necessary to associate the button unit 20 with the lock control device 10 in advance in the first embodiment and the second embodiment.

Figure 40:
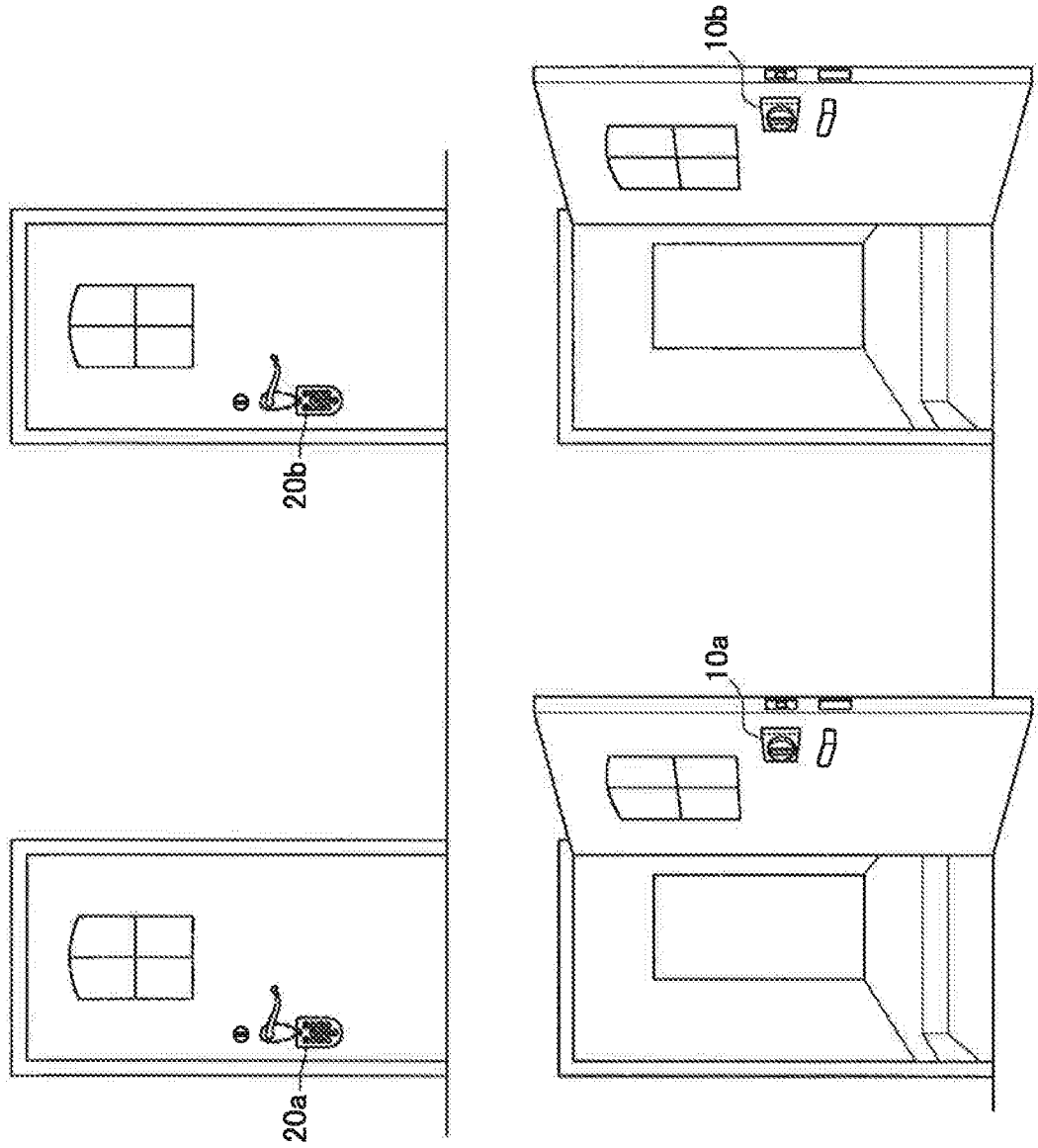
FIG. 40 is an explanatory diagram illustrating an example in which the lock control device 10 and the button unit 20 according to a third embodiment of the present disclosure are attached to a door.

Incidentally, it is also assumed, for example, as illustrated in FIG. 40 that the lock control device 10 and the button unit 20 are installed in each of rooms. In such a case, it is necessary as described with reference to FIGS. 13 to 16 to associate the lock control device 10 with each button unit 20, which imposes heavy load.

Next, a third embodiment will be described. As described below, according to the third embodiment, it is possible to cause the lock control device 10 to unlock simply by operating the button unit 20 even if the button unit 20 is not associated with the lock control device 10 in advance.

<3-1. System Configuration>

The configuration of an information processing system according to the third embodiment is substantially similar to that of the first embodiment (illustrated in FIG. 2).

<3-2. Configuration>

Next, the configuration according to the third embodiment will be described in detail. Additionally, the following does not describe what overlaps with the first embodiment.

[3-2-1. Button Unit 20]

The components included in the button unit 20 according to the third embodiment are similar to the components in the first embodiment (illustrated in FIG. 8). The following describes only components having the function different from that of the first embodiment.

(3-2-1-1. Control Section 200)

The control section 200 according to the third embodiment scans for a nearby BLE device on the basis of an input made into the input section 222. For example, when a valid key (such as a number key) is first pushed down, the control section 200 begins to scan for a nearby BLE device. According to this control example, it is possible to shorten the processing time by some seconds by beginning to scan at the time when the first digit is input as compared, for example, with a case where scanning is not begun until all the digits are input.

(3-2-1-2. Transmission Control Section 202)

Transmission of Unlocking Request

In a case where a passcode is input into the input section 222, and an unlock button is pushed down, the transmission control section 202 according to the third embodiment controls the transmission of the input passcode and unlocking request in accordance with whether the ID of the lock control device 10 is registered in the storage section 224. For example, in a case where the ID of the lock control device 10 is registered in the storage section 224, the transmission control section 202 causes the communication section 220 to transmit the input passcode and unlocking request to the lock control device 10 corresponding to the ID. In contrast, in a case where the ID of the lock control device 10 is not registered in the storage section 224, the transmission control section 202 causes the communication section 220 to transmit the input passcode and unlocking request to the respective nearby BLE devices found through scanning in descending order of RSSI values acquired from the BLE devices. For example, in the above-described case, the transmission control section 202 causes the communication section 220 to consecutively transmit the input passcode and unlocking request to the respective BLE devices in descending order of RSSI values until any of the BLE devices (technically, the lock control device 10) succeeds in authentication.

Additionally, the "RSSI value" means the strength of a signal (such as a scan signal) at which a BLE device receives the signal, for example, when the button unit 20 transmits the signal to the BLE device.

Transmission of Locking Request

Further, in a case where a lock button is pushed down, the transmission control section 202 controls the transmission of a locking request in accordance with whether the ID of the lock control device 10 is registered in the storage section 224. For example, in a case where the ID of the lock control device 10 is registered in the storage section 224, the transmission control section 202 causes the communication section 220 to transmit a locking request to the lock control device 10 corresponding to the ID. In contrast, in a case where the ID of the lock control device 10 is not registered in the storage section 224, the transmission control section 202 causes the communication section 220 to transmit a locking request to the lock control device 10 that has unlocked immediately before (i.e., the lock control device 10 to which an unlocking request is transmitted last).

Modification

Additionally, as a modification, in a case where a lock button is pushed down, the transmission control section 202 may also cause the communication section 220 to transmit a locking request to all the nearby lock control devices 10.

Additionally, the configurations of the lock control device 10, the portable terminal 30-1, and the server 40-1 according to the third embodiment are substantially similar to the configurations in the first embodiment.

<3-3. Operation>

The configuration according to the third embodiment has been described above. Next, the operation according to the third embodiment will be described in the following order with reference to FIGS. 41 to 43. Additionally, the other types of operations are similar to those of the first embodiment, and will not be described.

1. Overview of Entire Operation
2. Unlocking Process B

[3-3-1. Overview of Entire Operation]

Figure 41:
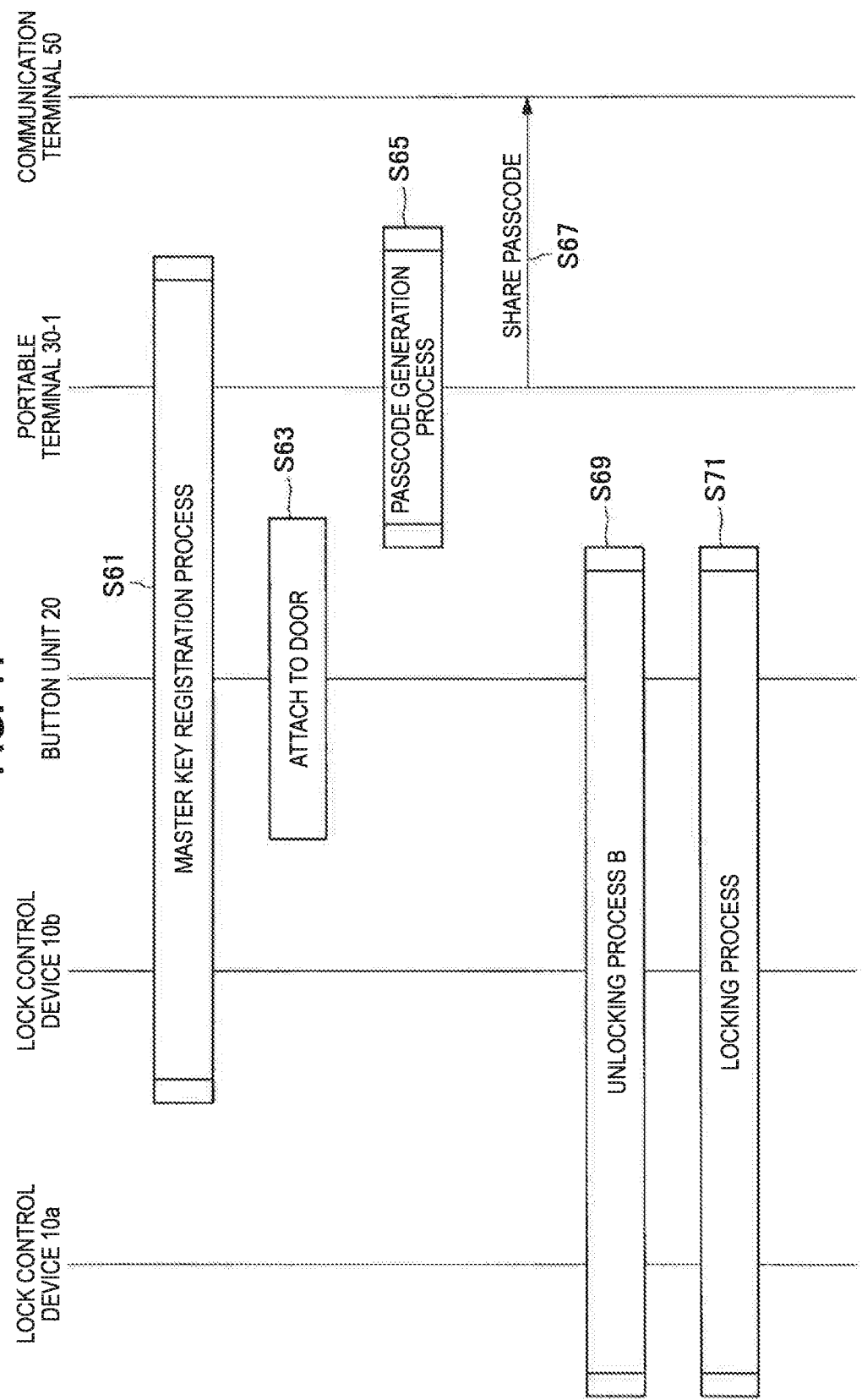
FIG. 41 is a sequence diagram illustrating an overview of an entire operation according to the embodiment.

FIG. 41 is a sequence diagram illustrating the overview of the entire operation according to the third embodiment. Additionally, S61, S65, S67, and S71 illustrated in FIG. 41 are substantially similar to S11, S15, S17, and S21 according to the first embodiment (illustrated in FIG. 11), respectively.

As illustrated in FIG. 41, the "setting-up process" (S13) will be omitted in the third embodiment, which is different from the first embodiment. Instead, the button unit 20 (in the initial state) is attached to a door, for example, by a contractor or the like after S61 (S63).

Further, the "unlocking process B" is performed after S67 (instead of the "unlocking process A") in the third embodiment, which is different from the first embodiment.

[3-3-2. Unlocking Process B]

Here, the operation for the "unlocking process B" in S69 will be described in detail with reference to FIGS. 42 to 43. Additionally, this operation is performed when the unauthorized user 2b who is told a passcode in S67 operates the button unit 20 to transmit an unlocking request to the lock control device 10.

Figure 42:
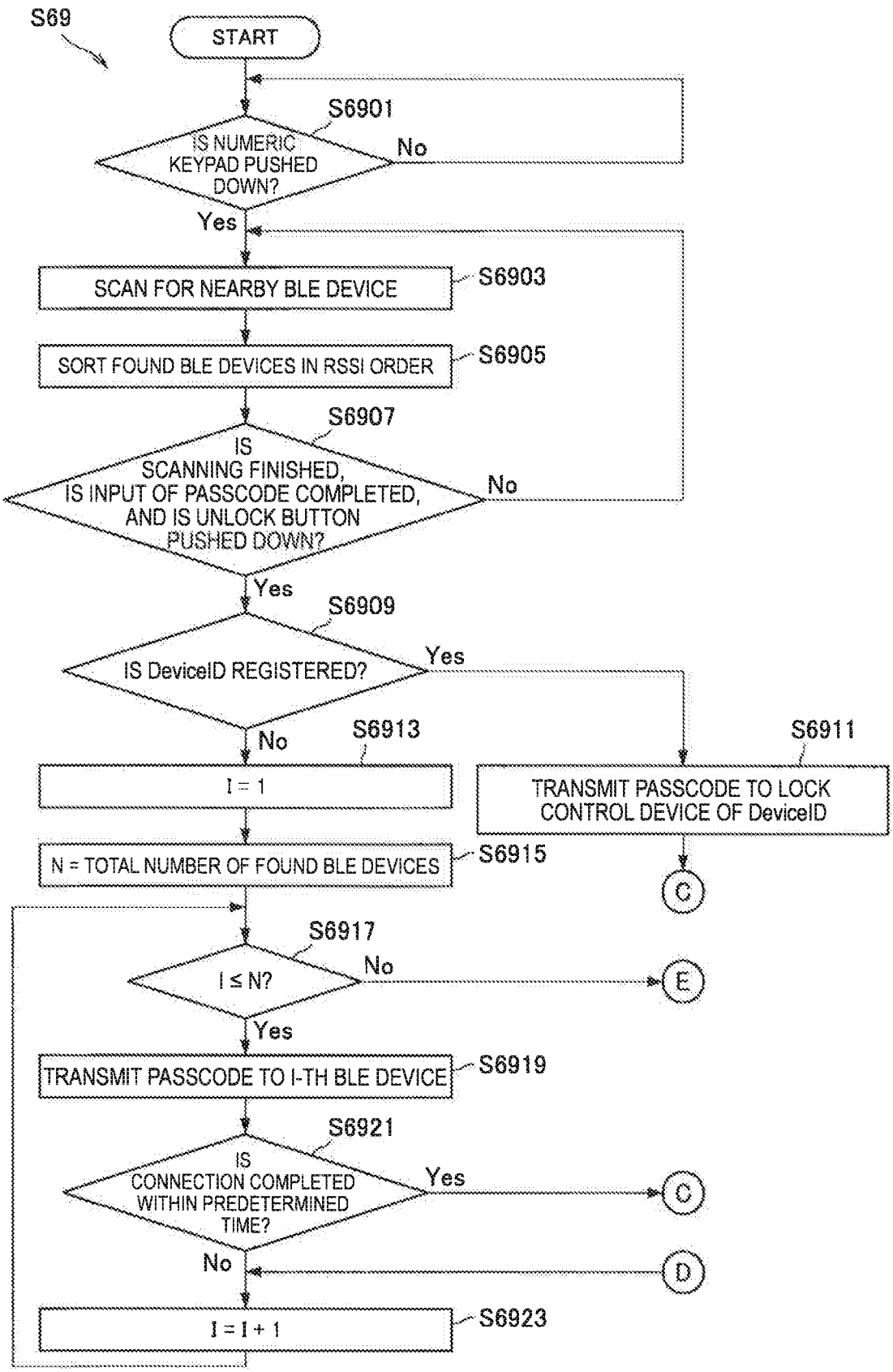
FIG. 42 is a flowchart illustrating a part of an operation for an unlocking process B according to the embodiment.

As illustrated in FIG. 42, the control section 200 of the button unit 20 first waits until the numeric keypad is pushed down for the first time, that is, the first digit of a passcode is pushed down (S6901). In a case where the numeric keypad is pushed down for the first time (S6901: Yes), the control section 200 begins to scan for a nearby BLE device (S6903). Additionally, the scanning continues for a predetermined time.

Whenever BLE devices are found, the control section 200 consecutively sorts the found BLE devices in descending order of RSSI values acquired from the BLE devices (S6905).

Afterward, the control section 200 determines whether the scanning is finished, all the digits of the passcode are input, and the unlock button is pushed down (S6907). In a case where the scanning is being performed or the digits of the passcode are being input (S6907: No), the control section 200 repeats the processes from S6903 onward.

In contrast, in a case where the scanning is finished, all the digits of the passcode are input, and the unlock button is pushed down (S6907: Yes), the control section 200 next determines whether the ID of the lock control device 10 is registered in the storage section 224 (S6909). In a case where the ID of the lock control device 10 is registered in the storage section 224 (S6909: Yes), the control section 200 encrypts the input passcode and unlocking request, for example, on the basis of a key sharing protocol. Additionally, the control section 200 can further encrypt the terminal ID of the portable terminal 30-1 and the unit ID of the button unit 20 at this moment. The communication section 220 then transmits the encrypted information to the lock control device 10 corresponding to the ID registered in the storage section 224 in accordance with the control of the transmission control section 202 (S6911). Thereafter, the lock control device 10 performs the process in S16931 which will be described below.

In contrast, in a case where the ID of the lock control device 10 is not registered (S6909: No), the control section 200 sets "1" as the variable I representing the number of a BLE device to which the passcode is transmitted (S6913), and then sets N as the total number of BLE devices found in S6905 (S6915).

Afterward, the control section 200 determines whether 1 is smaller than or equal to N (S6917). In a case where I is larger than N, that is, in a case where the connection or authentication between all the found BLE devices and the lock control device 10 results in failure (S6917: No), the "unlocking process B" terminates.

In contrast, in a case where I is smaller than or equal to N (S6917: Yes), the control section 200 encrypts the input passcode and unlocking request, for example, on the basis of a key sharing protocol. Additionally, the control section 200 can further encrypt the terminal ID of the portable terminal 30-1 and the unit ID of the button unit 20 at this moment. The communication section 220 then transmits the encrypted information to the BLE device ranking I-th in the sort order in accordance with the control of the transmission control section 202 (S6919).

Afterward, the control section 200 determines whether the connection to the I-th BLE device is completed within a predetermined time (S6921). For example, the control section 200 determines whether a bond process is completed within a predetermined time.

In a case where the connection to the I-th BLE device is completed within the predetermined time (S6921: Yes), the BLE device (lock control device 10) then performs the process in S6931 described below.

In contrast, in a case where the connection to the I-th BLE device is not completed within the predetermined time (S6921: No), the control section 200 adds "1" to I (S6923). That is, the control section 200 sets the BLE device ranking next thereto in the sort order as a target to which the passcode is transmitted. The control section 200 then performs the process in S6917 again.

Here, the operations from S6931 onward will be described with reference to FIG. 43. Additionally, the processes in S6931 to S6939 illustrated in FIG. 43 are substantially similar to the processes in S1907 to S1915 according to the first embodiment (illustrated in FIG. 20).

Figure 43:
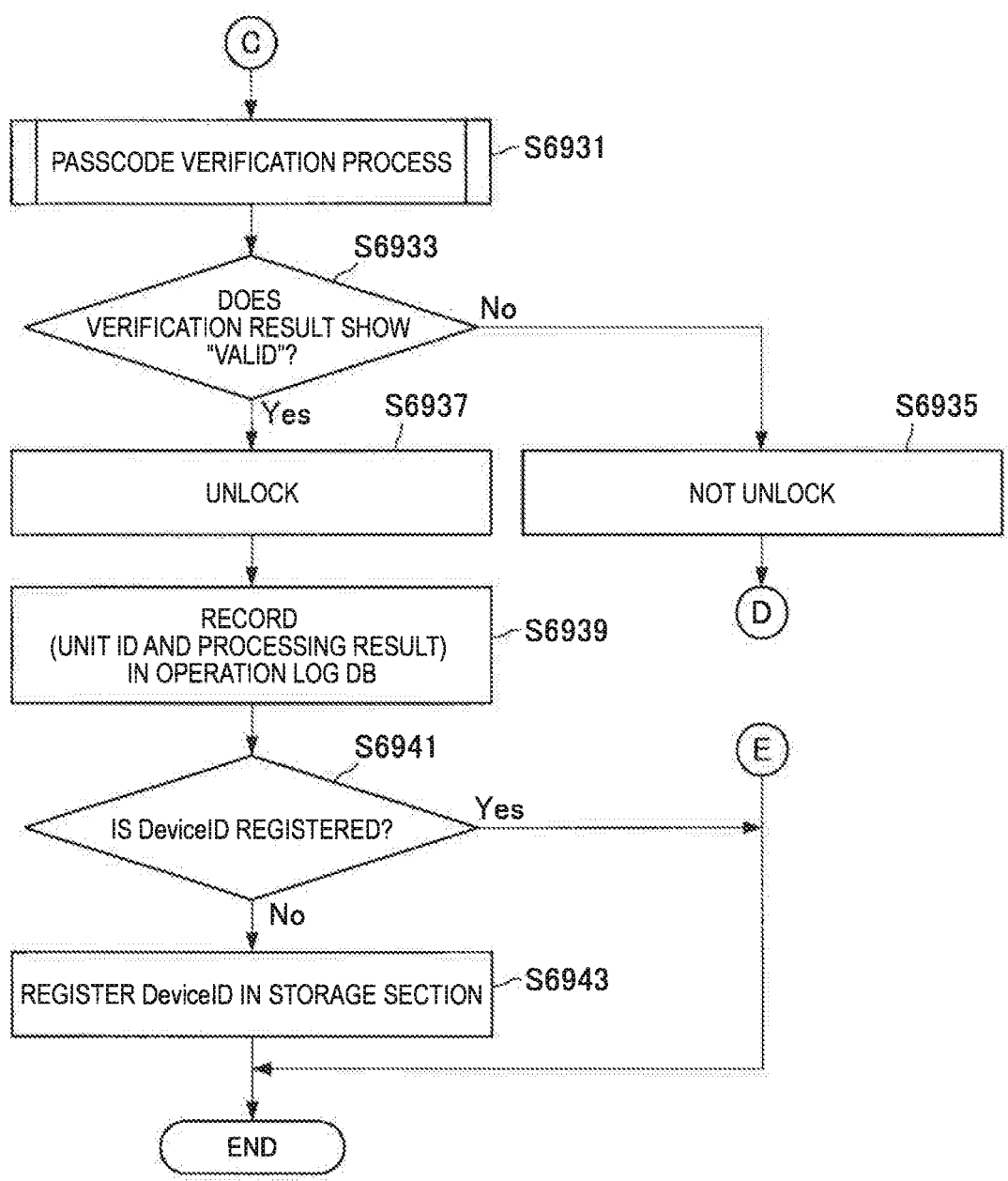
FIG. 43 is a flowchart illustrating a part of the operation for the unlocking process B according to the embodiment.

As illustrated in FIG. 43, the button unit 20 performs the process in S6923 again after S6935. That is, the control section 200 sets the BLE device ranking next thereto in the sort order as a target to which the passcode is transmitted.

Further, the control section 200 of the button unit 20 determines after S6939 whether the ID of the lock control device 10 is registered in the storage section 224 (S6941). In a case where the ID of the lock control device 10 is registered in the storage section 224 (S6941: Yes), the "unlocking process B" terminates. In contrast, in a case where the ID of the lock control device 10 is not registered in the storage section 224 (S6941: No), the control section 200 registers the ID of the lock control device 10, that is, the ID of the lock control device 10 that succeeds in unlocking in the storage section 224 (S6943). The "unlocking process B" then terminates.

(3-3-2-1. Modification)

Additionally, the operation for the "unlocking process B" is not limited to the above-described example. For example, the button unit 20 may ring a buzzer once a second in the middle of the "unlocking process B" (between S6901 and S6943). This can inform a user that the process continues.

Further, in a case where the connection or authentication between all the found BEE devices and the lock control device 10 results in failure (S6917: No), the button unit 20 may also ring a buzzer having predetermined sound. This can notify a user that the unlocking results in failure.

<3-4. Advantageous Effects>

[3-4-1. Advantageous Effect 1]

As described above, for example, with reference to FIGS. 41 to 43, according to the third embodiment, in a case where the ID of the lock control device 10 is not registered, the button unit 20 transmits the input passcode and unlocking request to each of the respective nearby BLE devices found through scanning in descending order of RSSI values acquired from the BLE devices.

Normally, the button unit 20 is installed in the area near the lock control device 10 to be unlocked (e.g., the opposite side of the same door). Even in a case where a large number of BLE devices are found, the above-described method thus makes it possible to efficiently transmit a passcode to the lock control device 10 to be unlocked.

[3-4-2. Advantageous Effect 2]

Further, in a case where the ID of the lock control device 10 is registered, that is, in a case where the second or later unlocking operation is performed, the button unit 20 transmits an input passcode and unlocking request to the lock control device 10 corresponding to the registered ID. It is therefore possible to more efficiently authenticate the passcode and unlock in the second or later unlocking operation.

[3-4-3. Advantageous Effect 3]

Further, according to the third embodiment, there is no need for the procedure (setting-up procedure) of associating the individual button units 20 with the specific lock control device 10 in advance. The procedure of installing the button unit 20 is thus easier. As a result, for example, it can be expected that the button units 20 are installed in a larger number of vacant rooms, and it is easier to view the insides of the vacant rooms.

4. Modifications

The preferred embodiments) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<4-1. Modification 1>

For example, the example in which the one portable terminal 30-1 basically generates a passcode on the basis of a generation condition input by the owner user 2a who has the portable terminal 30-1 has been described in each of the above-described embodiments, but each of the above-described embodiments is not limited to this example. In a case where the multiple portable terminals 30-1 are registered in the lock control device 10 as owner terminals, all the portable terminals 30-1 registered as owner terminals can also generate passcodes on the basis of generation conditions input by the respective owner users 2a who have the portable terminals 30-1. Even in a case where it is not possible to perform an operation of issuing a passcode because of the absence of the owner user 2a who has the certain portable terminal 30-1a or the like, another owner user 2a who has another portable terminal 30-1b performs an operation of issuing a passcode for the portable terminal 30-1b in this configuration, thereby making it possible to issue a passcode for the unauthorized user 2b.

<4-2. Modification 2>

Further, the example in which the button unit 20 is an input apparatus for transmitting a passcode to the lock control device 10 has been chiefly described in each of the above-described embodiments, but each of the above-described embodiments is not limited to this example. For example, the button unit 20 may be an apparatus for storing some object which includes a housing door that can be electrically locked, and can unlock the housing door on the basis of a passcode input into the input section 222. According to this modification 2, the owner user 2a can lend a physical key of real estate to the unauthorized user 2b by storing the physical key in the housing of the of the button unit 20, asking the unauthorized user 2b to input the passcode into the input section 222, and then unlocking the housing door.

Additionally, the button unit 20 according to this modification 2 can also further transmit an unlocking request to the lock control device 10 on the basis of a passcode input into the input section 222 similarly to each of the above-described embodiments.

<4-3. Modification 3>

Further, the example in which the information processing apparatus according to the present disclosure is the lock control device 10 that is, for example, installed on a door of a building or the like has been chiefly described in each of the above-described embodiments, but each of the above-described embodiments is not limited to this example. For example, the information processing apparatus according to the present disclosure may be a locking apparatus installed at each of various doors such as the doors of lockers installed in air ports, stations or the like, the doors of safes, or doors of automobiles, or a locking apparatus of a bicycle or the like. Moreover, the button unit 20 may be an input apparatus for allowing the information processing apparatus to unlock and lock in this modification. For example, in a case where the information processing apparatus is a locking apparatus of the doors of an automobile, the button unit 20 may be a remote control key of the doors of the automobile.

Alternatively, the information processing apparatus is, for example, a personal computer (PC), a server, a smartphone, a tablet terminal or the like, and it is possible to use a passcode to authenticate a user who uses the information processing apparatus. For example, the information processing apparatus may be a PC installed in a public facility or the like. When a user inputs a passcode, the PC may verify the validity of the input password by generating passcodes having a predetermined number of types of validity periods, and then comparing the input passcode with the generated passcodes. According to this modification, only a user who is notified of the passcode among users having no authority to use the PC can be allowed to use the PC only in the validity period of the passcode.

<4-4. Modification 4>

Further, the steps of the operation according to each of the above-described embodiments do not necessarily have to be executed in the described order. For example, the order in which the steps are executed may be changed as appropriate. Further, the steps may be partially executed in parallel or individually instead of being executed in chronological order.

<4-5. Modification 5>

Further, according to each of the above-described embodiments, it is possible to provide a computer program for causing a processor such as a CPU and hardware such as a RAM to execute a function equivalent to that of each component of the above-described lock control device 10. Further, there is also provided a recording medium having the computer program recorded thereon.

Additionally, the present technology may also be configured as below.

(1)

An information processing apparatus including:

a communication section configured to receive authentication information and a processing request from a first communication apparatus;

an authentication information generation section configured to generate authentication information on the basis of first key information associated with a second communication apparatus; and a processing control section configured to control execution of a process corresponding to the processing request on the basis of the authentication information received by the communication section and the authentication information generated by the authentication information generation section.

(2)

The information processing apparatus according to (1), in which in a case where the authentication information received by the communication section agrees with the authentication information generated by the authentication information generation section, the processing control section executes the process corresponding to the processing request.

(3)

The information processing apparatus according to (1) or (2), in which the authentication information generation section generates authentication information generation key information on the basis of the first key information, and generates the authentication information on the basis of the generated authentication information generation key information.

(4)

The information processing apparatus according to (3), in which the authentication information generation section generates a predetermined number of pieces of authentication information generation key information on the basis of the first key information, and generates the predetermined number of pieces of authentication information on the basis of each of the predetermined number of pieces of authentication information generation key information that are generated, the predetermined number of pieces of authentication information generation key information being different from each other, and the processing control section controls the execution of the process corresponding to the processing request on the basis of a comparison between the authentication information received by the communication section and each of the predetermined number of pieces of authentication information generated by the authentication information generation section.

(5)

The information processing apparatus according to (4), in which the authentication information generation section generates the predetermined number of pieces of authentication information generation key information on the basis of the first key information and each of the predetermined number of types of validity periods decided in advance, and generates the predetermined number of pieces of authentication information on the basis of each of the predetermined number of pieces of authentication information generation key information that are generated, and each of the predetermined number of types of validity periods based on a current date and time.

(6)

The information processing apparatus according to (5), in which the authentication information generation section generates the predetermined number of pieces of authentication information generation key information on the basis of the first key information, each of the predetermined number of types of validity periods, and a predetermined hash function, and generates the predetermined number of pieces of authentication information on the basis of each of the predetermined number of pieces of authentication information generation key information that are generated, each of the predetermined number of types of validity periods, and the predetermined hash function.

(7)

The information processing apparatus according to (1) or (2), in which the first key information is information generated on the basis of third key information associated with the information processing apparatus, and a reset counter that indicates a number of times authentication information is reset, the authentication information generation section generates a predetermined number of pieces of authentication information on the basis of the first key information, and the processing control section controls the execution of the process corresponding to the processing request on the basis of a comparison between the authentication information received by the communication section and each of the predetermined number of pieces of authentication information generated by the authentication information generation section.

(8)

The information processing apparatus according to (7), in which the predetermined number of types of validity periods are decided in advance, and the authentication information generation section generates the predetermined number of pieces of authentication information on the basis of the first key information, and each of the predetermined number of types of validity periods based on a current date and time.

(9)

The information processing apparatus according to any one of (4) to (8), in which in a case where the authentication information received by the communication section agrees with any of the predetermined number of pieces of authentication information generated by the authentication information generation section, the processing control section executes the process corresponding to the processing request, and in a case where the authentication information received by the communication section does not agree with any of the predetermined number of pieces of authentication information generated by the authentication information generation section, the processing control section does not execute the process corresponding to the processing request.

(10)

The information processing apparatus according to any one of (1) to (9), in which the communication section further receives the first key information that is encrypted from the second communication apparatus, and the information processing apparatus further includes
a key information processing section configured to decode the first key information that is encrypted, and
a storage section configured to store the first key information that is decoded by the key information processing section.

(11)

The information processing apparatus according to any one of (4) to (9), in which the communication section further receives second key information from the second communication apparatus, the second key information being encrypted and associated with the second communication apparatus, the information processing apparatus further includes a key information processing section configured to decode the second key information that is encrypted, in a case where the second key information that is encrypted is received, the authentication information generation section generates the predetermined number of pieces of authentication information on the basis of the second key information that is decoded by the key information processing section, and the processing control section controls the execution of the process corresponding to the processing request on the basis of a comparison between the authentication information received by the communication section and each of the predetermined number of pieces of authentication information generated by the authentication information generation section on the basis of the second key information.

(12)

The information processing apparatus according to any one of (1) to (11), in which the authentication information is a passcode.

(13)

The information processing apparatus according to any one of (1) to (12), in which the information processing apparatus is a lock control device, the information processing apparatus further includes a locking section, the processing request is an unlocking request to the locking section, and the processing control section controls unlocking of the locking section on the basis of a comparison between the authentication information received by the communication section and the authentication information generated by the authentication information generation section.

(14)

An information processing method including:

receiving authentication information and a processing request from a first communication apparatus;

generating authentication information on the basis of first key information associated with a second communication apparatus; and controlling, by a processor, execution of a process corresponding to the processing request on the basis of the received authentication information and the generated authentication information.

(15)

A program for causing a computer to function as:

a communication section configured to receive authentication information and a processing request from a first communication apparatus;

an authentication information generation section configured to generate authentication information on the basis of first key information associated with a second communication apparatus; and a processing control section configured to control execution of a process corresponding to the processing request on the basis of the authentication information received by the communication section and the authentication information generated by the authentication information generation section.

(16)

An information processing system including:

an information processing apparatus;

a first communication apparatus; and a second communication apparatus, in which the information processing apparatus includes a communication section configured to receive authentication information and a processing request from the first communication apparatus, a storage section configured to store first key information associated with the second communication apparatus, an authentication information generation section configured to generate authentication information on the basis of the first key information stored in the storage section, and a processing control section configured to control execution of a process corresponding to the processing request on the basis of the authentication information received by the communication section and the authentication information generated by the authentication information generation section.

(17)

The information processing system according to (16), in which the second communication apparatus includes a second authentication information generation section configured to generate authentication information on the basis of the first key information, and a display control section configured to cause the authentication information generated by the second authentication information generation section to be displayed on a display screen, and the first communication apparatus includes an input section configured to receive an input made by a user, and a transmission control section configured to control transmission of input authentication information and processing request to the information processing apparatus.

(18)

The information processing system according to (17), in which the second authentication information generation section generates authentication information generation key information on the basis of the first key information, and a validity period designated by a user from a predetermined number of types of validity periods decided in advance, and generates authentication information on the basis of the generated authentication information generation key information and the validity period designated by the user, the authentication information generation section generates the predetermined number of pieces of authentication information generation key information on the basis of the first key information stored in the storage section, and each of the predetermined number of types of validity periods, and generates the predetermined number of pieces of authentication information on the basis of each of the predetermined number of pieces of authentication information generation key information that are generated, and each of the predetermined number of types of validity periods based on a current date and time, and the processing control section controls the execution of the process corresponding to the processing request on the basis of a comparison between the authentication information received by the communication section and each of the predetermined number of pieces of authentication information generated by the authentication information generation section.

(19)

A communication apparatus including:

an input section configured to receive inputs of authentication information and a processing request;

a transmission control section configured to control transmission of signals to information processing apparatuses; and an acquisition section configured to acquire strength values of the signals received by the respective information processing apparatuses, in which the transmission control section causes a communication section to transmit the input authentication information and processing request to the respective information processing apparatuses in order from the information processing apparatus whose acquired strength value of the signal is largest.

(20)

The communication apparatus according to (19), further including:

a storage section configured to, in a case where the authentication information is authenticated by any of the information processing apparatuses, store identification information of the information processing apparatus, in which in a case where second authentication information and a second processing request are input, and identification information of any of the information processing apparatuses is stored in the storage section, the transmission control section causes the communication section to transmit the second authentication information and the second processing request to an information processing apparatus corresponding to the identification information stored in the storage section.

REFERENCE SIGNS LIST

10 lock control device
20 button unit
30-1, 30-2 portable terminal
32 communication network
40-1, 40-2 server
50 communication terminal
100, 200, 300-1, 300-2, 400-1, 400-2 control section
102, 306, 402 key information processing section
104, 308, 404 passcode generation section
106 passcode verifying section
108 processing control section
110, 314 authentication processing section
120, 220, 320, 420 communication section
122 locking section
124, 224, 326, 422 storage section
126 lock control key file 128 master key file
130 operation log DB
202, 312, 406 transmission control section
222 input section
302 master key generation section
304 two-dimensional code reading section
310 display control section
314 authentication processing section
322 operation display section
324 imaging section

The invention claimed is:

1. An information processing apparatus comprising:
a communication section configured to receive authentication information and a processing request from a first communication apparatus;
an authentication information generation section configured to generate authentication information on the basis of first key information associated with a second communication apparatus; and
a processing control section configured to control execution of a process corresponding to the processing request on the basis of the authentication information received by the communication section and the authentication information generated by the authentication information generation section,
wherein the first key information comprises a master key generated based on a security code and a reset counter,
wherein the reset counter indicates a number of times authentication information is reset, and
wherein the communication section, the authentication information generation section, and the processing control section are each implemented via at least one processor.

2. The information processing apparatus according to claim 1, wherein
in a case where the authentication information received by the communication section agrees with the authentication information generated by the authentication information generation section, the processing control section executes the process corresponding to the processing request.

3. The information processing apparatus according to claim 1, wherein
the authentication information generation section generates authentication information generation key information on the basis of the first key information, and generates the authentication information on the basis of the generated authentication information generation key information.

4. The information processing apparatus according to claim 3, wherein
the authentication information generation section generates a predetermined number of pieces of authentication information generation key information on the basis of the first key information, and generates the predetermined number of pieces of authentication information on the basis of each of the predetermined number of pieces of authentication information generation key information that are generated, the predetermined number of pieces of authentication information generation key information being different from each other, and
the processing control section controls the execution of the process corresponding to the processing request on the basis of a comparison between the authentication information received by the communication section and each of the predetermined number of pieces of authentication information generated by the authentication information generation section.

5. The information processing apparatus according to claim 4, wherein
the authentication information generation section generates the predetermined number of pieces of authentication information generation key information on the basis of the first key information and each of the predetermined number of types of validity periods decided in advance, and generates the predetermined number of pieces of authentication information on the basis of each of the predetermined number of pieces of authentication information generation key information that are generated, and each of the predetermined number of types of validity periods based on a current date and time.

6. The information processing apparatus according to claim 5, wherein
the authentication information generation section generates the predetermined number of pieces of authentication information generation key information on the basis of the first key information, each of the predetermined number of types of validity periods, and a predetermined hash function, and generates the predetermined number of pieces of authentication information on the basis of each of the predetermined number of pieces of authentication information generation key information that are generated, each of the predetermined number of types of validity periods, and the predetermined hash function.

7. The information processing apparatus according to claim 1, wherein
the first key information is information further generated on the basis of third key information associated with the information processing apparatus,
the authentication information generation section generates a predetermined number of pieces of authentication information on the basis of the first key information, and
the processing control section controls the execution of the process corresponding to the processing request on the basis of a comparison between the authentication information received by the communication section and each of the predetermined number of pieces of authentication information generated by the authentication information generation section.

8. The information processing apparatus according to claim 7, wherein
the predetermined number of types of validity periods are decided in advance, and
the authentication information generation section generates the predetermined number of pieces of authentication information on the basis of the first key information, and each of the predetermined number of types of validity periods based on a current date and time.

9. The information processing apparatus according to claim 4, wherein
in a case where the authentication information received by the communication section agrees with any of the predetermined number of pieces of authentication information generated by the authentication information generation section, the processing control section executes the process corresponding to the processing request, and
in a case where the authentication information received by the communication section does not agree with any of the predetermined number of pieces of authentication information generated by the authentication information generation section, the processing control section does not execute the process corresponding to the processing request.

10. The information processing apparatus according to claim 1,
wherein the communication section further receives the first key information that is encrypted from the second communication apparatus,
wherein the information processing apparatus further includes
a key information processing section configured to decode the first key information that is encrypted, and
a computer-readable storage medium configured to store the first key information that is decoded by the key information processing section, and
wherein the key information processing section is implemented via at least one processor.

11. The information processing apparatus according to claim 4, wherein
the communication section further receives second key information from the second communication apparatus, the second key information being encrypted and associated with the second communication apparatus,
the information processing apparatus further includes a key information processing section configured to decode the second key information that is encrypted,
in a case where the second key information that is encrypted is received, the authentication information generation section generates the predetermined number of pieces of authentication information on the basis of the second key information that is decoded by the key information processing section, and
the processing control section controls the execution of the process corresponding to the processing request on the basis of a comparison between the authentication information received by the communication section and each of the predetermined number of pieces of authentication information generated by the authentication information generation section on the basis of the second key information.

12. The information processing apparatus according to claim 1, wherein
the authentication information is a passcode.

13. The information processing apparatus according to claim 1, wherein
the information processing apparatus is a lock control device,
the information processing apparatus further includes a locking section implemented via at least one processor,
the processing request is an unlocking request to the locking section, and
the processing control section controls unlocking of the locking section on the basis of a comparison between the authentication information received by the communication section and the authentication information generated by the authentication information generation section.

14. An information processing method comprising:
receiving authentication information and a processing request from a first communication apparatus;
generating authentication information on the basis of first key information associated with a second communication apparatus; and
controlling, by a processor, execution of a process corresponding to the processing request on the basis of the received authentication information and the generated authentication information,
wherein the first key information comprises a master key generated based on a security code and a reset counter, and
wherein the reset counter indicates a number of times authentication information is reset.

15. A non-transitory computer-readable storage medium having embodied thereon a program, which when executed by a computer causes the computer to execute a method, the method comprising:
receiving authentication information and a processing request from a first communication apparatus;
generating authentication information on the basis of first key information associated with a second communication apparatus; and
controlling execution of a process corresponding to the processing request on the basis of the received authentication information and the generated authentication information,
wherein the first key information comprises a master key generated based on a security code and a reset counter, and
wherein the reset counter indicates a number of times authentication information is reset.

16. An information processing system comprising:
an information processing apparatus;
a first communication apparatus; and
a second communication apparatus,
wherein the information processing apparatus includes
a communication section configured to receive authentication information and a processing request from the first communication apparatus,
a computer-readable storage medium configured to store first key information associated with the second communication apparatus,
an authentication information generation section configured to generate authentication information on the basis of the first key information stored in the computer-readable storage medium, and
a processing control section configured to control execution of a process corresponding to the processing request on the basis of the authentication information received by the communication section and the authentication information generated by the authentication information generation section,
wherein the first key information comprises a master key generated based on a security code and a reset counter,
wherein the reset counter indicates a number of times authentication information is reset, and
wherein the communication section the authentication information generation section, and the processing control section are each implemented via at least one processor.

17. The information processing system according to claim 16,
wherein the second communication apparatus includes
a second authentication information generation section configured to generate authentication information on the basis of the first key information, and a display control section configured to cause the authentication information generated by the second authentication information generation section to be displayed on a display screen, wherein the first communication apparatus includes
an input section configured to receive an input made by a user, and
a transmission control section configured to control transmission of input authentication information and processing request to the information processing apparatus, and wherein the second authentication information generation section, the display control section, the input section, and the transmission control section are each implemented via at least one processor.

18. The information processing system according to claim 17, wherein
the second authentication information generation section generates authentication information generation key information on the basis of the first key information, and a validity period designated by a user from a predetermined number of types of validity periods decided in advance, and generates authentication information on the basis of the generated authentication information generation key information and the validity period designated by the user,
the authentication information generation section generates the predetermined number of pieces of authentication information generation key information on the basis of the first key information stored in the computer-readable storage medium, and each of the predetermined number of types of validity periods, and generates the predetermined number of pieces of authentication information on the basis of each of the predetermined number of pieces of authentication information generation key information that are generated, and each of the predetermined number of types of validity periods based on a current date and time, and
the processing control section controls the execution of the process corresponding to the processing request on the basis of a comparison between the authentication information received by the communication section and each of the predetermined number of pieces of authentication information generated by the authentication information generation section.

19. A communication apparatus comprising:
an input section configured to receive inputs of authentication information and a processing request;
a transmission control section configured to control transmission of signals to information processing apparatuses on the basis of first key information; and
an acquisition section configured to acquire strength values of the signals received by the respective information processing apparatuses,
wherein the transmission control section causes a communication section to transmit the input authentication information and processing request to the respective information processing apparatuses in order from an information processing apparatus whose acquired strength value of the signal is largest,
wherein the first key information comprises a master key generated based on a security code and a reset counter,
wherein the reset counter indicates a number of times authentication information is reset, and
wherein the input section, the transmission control section, the acquisition section, and the transmission control section are each implemented via at least one processor.

20. The communication apparatus according to claim 19, further comprising:
a computer-readable storage medium configured to, in a case where the authentication information is authenticated by any of the information processing apparatuses, store identification information of the information processing apparatus,
wherein in a case where second authentication information and a second processing request are input, and identification information of any of the information processing apparatuses is stored in the computer-readable storage medium, the transmission control section causes the communication section to transmit the second authentication information and the second processing request to an information processing apparatus corresponding to the identification information stored in the computer-readable storage medium.

21. The information processing apparatus according to claim 1, wherein
the security code is acquired based on analysis of a captured image.

* * * * *